United States Patent
Stevens et al.

(10) Patent No.: US 7,148,305 B2
(45) Date of Patent: Dec. 12, 2006

(54) METHOD OF MAKING INTERPOLYMERS AND PRODUCTS MADE THEREFROM

(75) Inventors: James C. Stevens, Richmond, TX (US); Daniel D. VanderLende, SugarLand, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 11/085,793

(22) Filed: Mar. 21, 2005

(65) Prior Publication Data

US 2005/0187351 A1    Aug. 25, 2005

Related U.S. Application Data

(62) Division of application No. 10/100,557, filed on Mar. 15, 2002, now Pat. No. 6,924,342.

(60) Provisional application No. 60/276,719, filed on Mar. 16, 2001.

(51) Int. Cl.
*C08F 4/44* (2006.01)
*C08F 210/02* (2006.01)
*B01J 31/38* (2006.01)

(52) U.S. Cl. ............... 526/352; 526/348; 526/113; 526/116; 526/117; 526/119; 526/160; 526/161; 526/943; 502/152; 502/155

(58) Field of Classification Search ............... 526/113, 526/116, 117, 119, 160, 161, 943, 348, 352; 502/152, 155
See application file for complete search history.

(56) References Cited

U.S. PATENT DOCUMENTS

| | | | |
|---|---|---|---|
| 3,984,610 A | 10/1976 | Elston | |
| 4,500,648 A | 2/1985 | Malpass | |
| 4,530,914 A | 7/1985 | Ewen et al. | |
| 4,752,597 A | 6/1988 | Turner | |
| 4,851,489 A | 7/1989 | Malpass | |
| 4,935,474 A | 6/1990 | Ewen et al. | |
| 4,937,299 A * | 6/1990 | Ewen et al. | 526/119 |
| 5,047,485 A | 9/1991 | DeNicola, Jr. | |
| 5,055,438 A | 10/1991 | Canich | |
| 5,057,475 A | 10/1991 | Canich et al. | |
| 5,064,802 A | 11/1991 | Stevens et al. | |
| 5,096,867 A | 3/1992 | Canich | |
| 5,132,380 A | 7/1992 | Stevens et al. | |
| 5,272,236 A | 12/1993 | Lai et al. | |
| 5,324,800 A | 6/1994 | Welborn, Jr. et al. | |
| 5,470,811 A | 11/1995 | Jejelowo et al. | |
| 5,530,072 A | 6/1996 | Shirodkar | |
| 5,556,928 A | 9/1996 | Devore et al. | |
| 5,665,800 A | 9/1997 | Lai et al. | |
| 5,685,128 A | 11/1997 | Chum et al. | |
| 5,703,180 A | 12/1997 | Tsutsui et al. | |
| 5,703,187 A | 12/1997 | Timmers | |
| 5,783,638 A | 7/1998 | Lai et al. | |
| 5,852,152 A | 12/1998 | Walton et al. | |
| 5,965,756 A * | 10/1999 | McAdon et al. | 556/11 |
| 6,001,941 A | 12/1999 | Tsutsui et al. | |
| 6,015,868 A | 1/2000 | Nickias et al. | |
| 6,034,021 A | 3/2000 | Wilson et al. | |
| 6,107,147 A | 8/2000 | Kim et al. | |
| 6,114,457 A | 9/2000 | Markel et al. | |
| 6,114,486 A | 9/2000 | Rowland et al. | |
| 6,143,854 A | 11/2000 | Bamberger et al. | |
| 6,147,180 A | 11/2000 | Markel et al. | |
| 6,197,910 B1 | 3/2001 | Weng et al. | |
| 6,207,606 B1 | 3/2001 | Lue et al. | |
| 6,277,931 B1 | 8/2001 | Jaber et al. | |
| 6,346,575 B1 | 2/2002 | Debras et al. | |
| 6,369,176 B1 | 4/2002 | Laughner et al. | |
| 6,492,473 B1 * | 12/2002 | Canich et al. | 526/117 |

FOREIGN PATENT DOCUMENTS

| | | |
|---|---|---|
| EP | 0 321 964 A2 | 6/1989 |
| EP | 0 773 257 A2 | 5/1997 |
| WO | WO 96/07478 A | 3/1996 |
| WO | WO 97/48735 A | 12/1997 |
| WO | WO 00/49059 A | 8/2000 |
| WO | WO 00/50466 A | 8/2000 |
| WO | WO 01/14434 A | 3/2001 |
| WO | WO 01/42315 A | 6/2001 |
| WO | WO 01/92403 A2 | 12/2001 |

* cited by examiner

*Primary Examiner*—Robert D. Harlan

(57) ABSTRACT

Olefin polymers having a comb-like structure with at least 0.3 long-chain branches per 1000 carbon atoms are disclosed. Some compositions have a melt strength of about 5 cN at 190° C., and when made into a film have a CD shrink of at least 20%. Some compositions described herein include a high molecular weight fraction and a low molecular weight fraction wherein the ratio of the molecular weight of the high molecular weight fraction to the molecular weight of the low molecular weight fraction is greater than about 1.3.

14 Claims, 7 Drawing Sheets

Catalyst A

Catalyst B

Catalyst C

Catalyst D

Catalyst E

Catalyst F

Bis(n-butylcyclopentadienyl)zirconium dimethyl

Catalyst G

Example 27 Deconvolution

METHOD OF MAKING INTERPOLYMERS AND PRODUCTS MADE THEREFROM

PRIOR RELATED APPLICATIONS

This application is a divisional application of U.S. application Ser. No. 10/100,557, filed Mar. 15, 2002, now U.S. Pat. No. 6,924,342 which claims priority to prior filed U.S. Provisional Patent Application Ser. No. 60/276,719, filed on Mar. 16, 2001, each of which is incorporated by reference herein in its entirety.

FEDERALLY SPONSORED RESEARCH STATEMENT

Not applicable.

REFERENCE TO MICROFICHE APPENDIX

Not applicable.

FIELD OF THE INVENTION

This invention relates to a process for making olefin polymers and products therefrom.

BACKGROUND OF THE INVENTION

Ethylene homopolymers and copolymers are a well-known class of olefin polymers from which various plastic products are produced. Such products include films, fibers, coatings, and molded articles, such as containers and consumer goods. The polymers used to make these articles are prepared from ethylene, optionally with one or more copolymerizable monomers. There are many types of polyethylene. For example, low density polyethylene ("LDPE") is generally produced by free radical polymerization and consists of highly branched polymers with long and short chain branches' distributed throughout the polymer. Due to its branched structure, LDPE generally is easy to process, i.e., it can be melt processed in high volumes at low energy input. However, films of LDPE have relatively low toughness, low puncture resistance, low tensile strength, and poor tear properties, compared to linear-low density polyethylene ("LLDPE"). Moreover, the cost to manufacture LDPE is relatively high because it is produced under high pressures (e.g., as high as 45,000 psi) and high temperatures. Most LDPE commercial processes have a relatively low ethylene conversion. As such, large amounts of unreacted ethylene must be recycled and repressurized, resulting in an inefficient process with a high energy cost.

A more economical process to produce polyethylene involves use of a coordination catalyst, such as a Ziegler-Natta catalyst, under low pressures. Conventional Ziegler-Natta catalysts are typically composed of many types of catalytic species, each having different metal oxidation states and different coordination environments with ligands. Examples of such heterogeneous systems are known and include metal halides activated by an organometallic co-catalyst, such as titanium chloride supported on magnesium chloride, activated with trialkyl aluminum. Because these systems contain more than one catalytic species, they possess polymerization sites with different activities and varying abilities to incorporate comonomer into a polymer chain. The consequence of such multi-site chemistry is a product with poor control of the polymer chain architecture, when compared to a neighboring chain. Moreover, differences in the individual catalyst site produce polymers of high molecular weight at some sites and low molecular weight at others, resulting in a polymer with a broad molecular weight distribution and a heterogeneous composition. Consequently, the molecular weight distribution of such polymers is fairly broad as indicated by $M_w/M_n$ (also referred to as polydispersity index or "PDI" or "MWD") Due to the heterogeneity of the composition, their mechanical and other properties are less desirable.

Recently, a new catalyst technology useful in the polymerization of olefins has been introduced. It is based on the chemistry of single-site homogeneous catalysts, including metallocenes which are organometallic compounds containing one or more cyclopentadienyl ligands attached to a metal, such as hafnium, titanium, vanadium, or zirconium. A co-catalyst, such as oligomeric methyl alumoxane, is often used to promote the catalytic activity of the catalyst. By varying the metal component and the substituents on the cyclopentadienyl ligand, a myriad of polymer products may be tailored with molecular weights ranging from about 200 to greater than 1,000,000 and molecular weight distributions from 1.0 to about 15. Typically, the molecular weight distribution of a metallocene catalyzed polymer is less than about 3, and such a polymer is considered as a narrow molecular weight distribution polymer.

The uniqueness of metallocene catalysts resides, in part, in the steric and electronic equivalence of each active catalyst molecule. Specifically, metallocenes are characterized as having a single, stable chemical site rather than a mixture of sites as discussed above for conventional Ziegler-Natta catalysts. The resulting system is composed of catalysts which have a singular activity and selectivity. For this reason, metallocene catalyst systems are often referred to as "single site" owing to their homogeneous nature. Polymers produced by such systems are often referred to as single site resins in the art.

With the advent of coordination catalysts for ethylene polymerization, the degree of long-chain branching in an ethylene polymer was substantially decreased, both for the traditional Ziegler-Natta ethylene polymers and the newer metallocene catalyzed ethylene polymers. Both, particularly the metallocene copolymers, are linear polymers or substantially linear polymers with a limited level of long chain branching. These polymers are relatively difficult to melt process when the molecular weight distribution is less than about 3.5. Thus, a dilemma appears to exist—polymers with a broad molecular weight distribution are easier to process but may lack desirable solid state attributes otherwise available from metallocene catalyzed copolymers. On the contrary, linear or substantially linear polymers catalyzed by a metallocene catalyst have desirable physical properties in the solid state but may nevertheless lack the desired processability when in the melt.

The introduction of long chain branches into substantially linear olefin copolymers has been observed to improve processing characteristics of the polymers. Such has been done using metallocene-catalyzed polymers where significant numbers of olefinically unsaturated chain ends are produced during the polymerization reaction. The olefinically unsaturated polymer chains can become "macromonomers" or "macromers" and can be re-inserted with other copolymerizable monomers to form the branched copolymers. However, the levels of long chain branching attainable with known methods thus far are not as high as those observed in LDPE made by free radical polymerization. Another limitation with the existing polyethylene compositions is that, although the processability, ease of melt processing, or increase in shear-thinning properties can be improved with the introduction of long chain branching in the polymers, the molecular weight distribution tends to increase with increased branching.

So far, improved processability may be achieved by blending different molecular weight polyethylene copolymer components or introducing a limited level of branching into polyethylene polymers. Accordingly, it generally has been thought that the advantages of the narrow molecular weight distribution made possible by metallocene catalysis needed to be sacrificed, at least in part, if improved processibilty is sought. For these reasons, there is a need for a polymerization process which could produce a polymer with melt processing characteristics similar to or better than LDPE while exhibiting solid state properties comparable to a metallocene-catalyzed polymer.

SUMMARY OF THE INVENTION

In some embodiments, the invention provides an olefin polymer composition wherein the polymer molecules have a comb-like structure with at least 0.3 long-chain branches per 1000 carbon atoms. Some polymer compositions have a melt strength of about 5 cN at 190° C. and when made into a film, the film has a CD shrink of at least 20%.

Some of the polymer compositions have an $R_v$ of about 0.12 or higher where $R_v$ is defined as:

$$R_v = \frac{[vinyl]}{[vinyl] + [vinylidene] + [cis] + [trans]}$$

wherein [vinyl] is the concentration of vinyl groups in the olefin polymer expressed in vinyls/1,000 carbon atoms; [vinylidene], [cis] and [trans] are the concentration of vinylidene, cis and trans groups in the olefin polymer expressed in the number of the respective groups per 1,000 carbon atoms.

Some polymers include a high molecular weight fraction and a low molecular weight fraction. The ratio of the molecular weight of the high molecular weight fraction to the molecular weight of the low molecular weight fraction can vary. In some olefin polymer compositions, the ratio of the molecular weight of the high molecular weight fraction to the molecular weight of the low molecular weight fraction is greater than about 1.3. In other compositions, the ratio of the molecular weight of the high molecular weight fraction to the molecular weight of the low molecular weight fraction is greater than about 2. In some compositions the ratio ranges from 2 and about 40. In other compositions, the ratio is between about 1.5 and about 8.5. Still other compositions have a ratio of between about 2.0 and about 7.0. In still other embodiments, the ratio of the molecular weight of the high molecular weight fraction to the molecular weight of the low molecular weight fraction is between about 3.0 and about 6.0.

In some compositions, the olefin polymer of claim comprises ethylene and at least one α-olefin. Some olefin polymers comprises ethylene and at least one vinylidene olefin or ethylene and at least one diolefin. In some embodiments the olefin polymer is an ethylene/a-olefin interpolymer such as, but not limited to, an ethylene/propylene copolymer, an ethylene/1-butene copolymer, an ethylene/1-hexene polymer, ethylene/styrene polymer, ethylene/1-octene copolymers, or ethylene/propylene/diene terpolymer.

BRIEF DESCRIPTION OF THE DRAWINGS

FIG. 2 compares the rheology of the interpolymers in accordance with embodiments of the invention and LDPE.

DESCRIPTION OF EMBODIMENTS OF THE INVENTION

Figure 1:
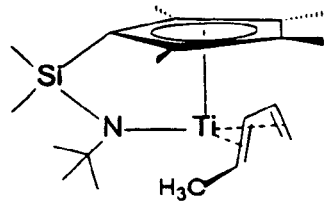
FIG. 1 shows the chemical structures of various catalysts suitable for embodiments of the invention.
Figure 1:
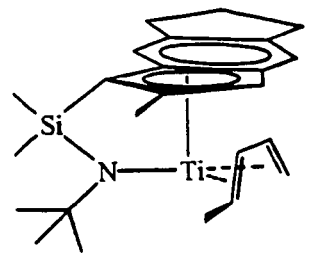
Figure 1:
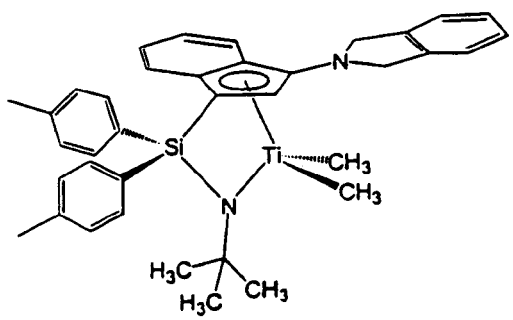
Figure 1:
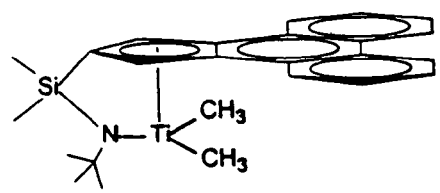
Figure 1:
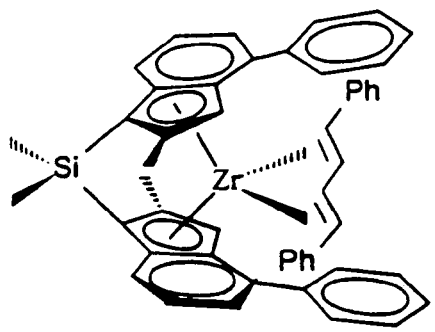
Figure 1:
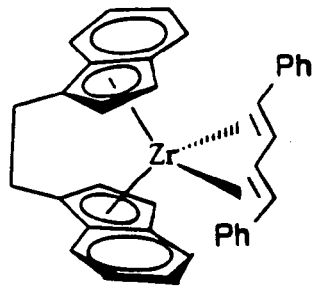
Figure 1:
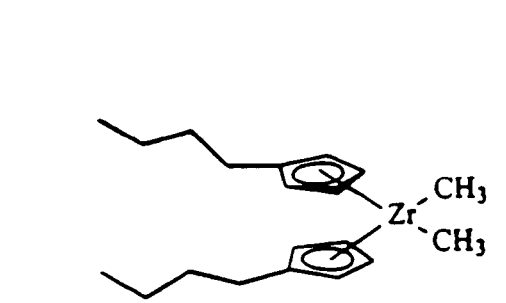
Figure 1:
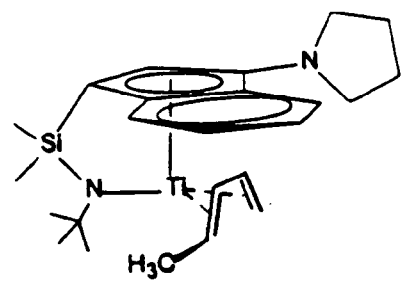

Embodiments of the invention provide a new process of making olefin polymers with desired processability and physical characteristics. The process comprises contacting one or more olefinic monomers or comonomers in the presence of at least one high molecular weight catalyst and at least one low molecular weight catalyst in a single polymerization reactor; and effectuating the polymerization of the olefinic comonomers in the reactor to obtain an olefin polymer. Preferably, the high molecular weight catalyst and the low molecular weight catalyst have the ability to incorporate a substantially similar amount of comonomers in the polymer produced.

The term "polymer" as used herein refers to a macromolecular compound prepared by polymerizing monomers of the same or a different type. A polymer refers to homopolymers, copolymers, terpolymers, interpolymers, and so on. The term "interpolymer" used herein refers to polymers prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like. The term "monomer" or "comonomer" refers to any compound with a polymerizable moiety which is added to a reactor in order to produce a polymer. "Metallocene catalyzed polymer" used herein refers to any polymer that is made in the presence of one metallocene catalyst or one constrained geometry catalyst. The term "metallocene" as used herein refers to a metal-containing compound having at least one substituted or unsubstituted cyclopentadienyl group bound to the metal.

A high molecular weight catalyst is defined relative to a low molecular weight catalyst. A high weight molecular weight catalyst refers to a catalyst which produces a polymer with a high weight-average molecular weight $M_{wH}$ from the comonomers of choice under a set of given polymerization conditions, whereas a low molecular weight catalyst refers to a catalyst which produces a polymer with a low weight average molecular weight $M_{wL}$ from the same comonomers under substantially the same polymerization conditions. Therefore, the terms "low molecular weight catalyst" and "high molecular weight catalyst" used herein do not refer to the molecular weight of a catalyst; rather, they refer to a catalysts ability to make a polymer with a low or high molecular weight. Preferably, the ratio of the high molecular weight to the low molecular weight, i.e., $M_{wH}/M_{wL}$ is greater than about 1.3. Generally, the ratio, $M_{wH}/M_{wL}$, is in the range from about 1.5 to about 60, preferably in the range from about 1.5 to about 40, still more preferably from about 1.5 to about 15, and most preferably from about 1.5 to about 15. In some embodiments, the ratio is from about 3.0 to about 15.0, more preferably from about 3.0 to about 10.0 and most preferably from about 3.0 to about 6.0. In other embodiments, the ratio $M_{wH}/M_{wL}$ can be greater than 60 (e.g., 70, 80, 90, or even 100), but it is generally less preferred.

Polymerization conditions generally refer to temperature, pressure, monomer content (including comonomer concentration), catalyst concentration, cocatalyst concentration, activator concentration, etc., that influence the molecular weight of the polymer produced. The weight-average molecular weight ($M_w$) of a homopolymer, copolymer, or other interpolymer can be measured by gel permeation chromatography as described in U.S. Pat. No. 5,272,236, which is incorporated by reference herein in its entirety. For ethylene polymers or interpolymers, one method to determine the molecular weight is to measure the melt index according to ASTM D-1238 Condition 190° C./2.16 kg (formerly known as "Condition E" and also known as "$I_2$"). Generally, melt index $I_2$ is inversely related to the molecular weight of an ethylene polymer. The higher the molecular weight, the lower the melt index $I_2$, although the relationship is not necessarily linear. Another measurement used in characterizing the molecular weight of ethylene polymers involves measuring the melt index with a higher weight in accordance with ASTM D-1238, Condition 190° C./10 kg (formerly known as "Condition N" and also known as "$I_{10}$"). Similarly, melt index $I_{10}$ is inversely related to the molecular weight of an ethylene polymer.

Due to the intrinsic molecular weight differences in the polymer produced by the chosen high and low molecular weight catalysts, the polymer produced by the two catalysts in a single reactor has a high molecular weight fraction and a low molecular weight fraction. Such a phenomenon is referred to herein after as "polymer split." A polymer split is defined as the weight fraction of the high molecular weight polymer component in a polymer with such split. The relative fraction of the high molecular weight component can be measured by deconvoluting a gel permeation chromotography ("GPC") peak. One characteristic of the process described herein is that the polymer split may be varied from 0 to 100% by adjusting the ratio of the high molecular weight catalyst to the low molecular weight catalyst. Because any two catalysts may exhibit different catalytic efficiency at a given set of polymerization process conditions, the polymer split may not correspond directly to the molar ratio of the two catalysts.

A high molecular weight catalyst and a low molecular weight catalyst are determined with reference to each other. One does not know whether a catalyst is a high molecular weight catalyst or a low molecular weight catalyst until after another catalyst is also selected. Therefore, the terms "high molecular weight" and "low molecular weight" used herein when referring to a catalyst are merely relative terms and do not encompass any absolute value with respect to the molecular weight of a polymer. After a pair of catalysts are selected, one can easily ascertain which one is the high molecular catalyst by the following procedure: 1) select at least one monomer which can be polymerized by the chosen catalysts; 2) make a polymer from the selected monomer(s) in a single reactor containing one of the selected catalysts under pre-selected polymerization conditions; 3) make another polymer from the same monomer(s) in a single reactor containing the other catalyst under substantially the same polymerization conditions; and 4) measure the melt index $I_2$ for the respective interpolymers. The catalyst that yields a lower $I_2$ is the higher molecular weight catalyst. Conversely, the catalyst that yields a high $I_2$ is the lower molecular weight catalyst. Using this methodology, it is possible to rank a plurality of catalysts based on the molecular weight of the polymers they can produce under substantially the same conditions. As such, one may select three, four, five, six, or more catalysts according their molecular weight capability and use these catalysts simultaneously in a single polymerization reactor to produce polymers with tailored structures and properties.

In some embodiments, the high molecular weight catalysts and the low molecular weight catalysts are selected such that they have the ability to incorporate a substantially similar amount of comonomers in the polymer. In other words, under substantially the same conditions of temperature, pressure, and monomer content (including comonomer concentration), each catalyst incorporates substantially the same mole percentage of comonomers into the resulting interpolymer. One way to quantify "substantially the same" or "substantially similar" mole percentage of comonomers is as follows: where a first catalyst incorporates less than 5 mol. % of comonomers under a set of polymerization conditions, a second catalyst incorporates the same mole percentage of comonomers within 2 mol. %. For example, if the first catalyst incorporates 4 mol. % 1-octene in an ethylene-1-octene copolymerization, then the second catalyst would exhibit substantially the same comonomer incorporation if it yields an interpolymer with about 2.0 mol. % to about 6.0 mol. % octene under substantially the same polymerization conditions of temperature, pressure, comonomer concentration, and comonomer type. For a catalyst with about 5 mol. % to about 10 mol. % comonomer incorporation, the range for "substantially the same comonomer incorporation" for a second catalyst is within 3 mol. % of the comonomer incorporation. For a catalyst with about 10 mol. % to about 20 mol. %, the range for "substantially the same comonomer incorporation" would be within 4 mol. %. For a catalyst which incorporates 20 mol. % or higher comonomers, the range for "substantially the same comonomer incorporation" for another catalyst would be within 6 mol. %.

For the case of an olefin homopolymer, two catalysts are considered to have "substantially the same comonomer incorporation" if the two catalysts, under reaction conditions equivalent to the conditions used to make a homopolymer but differing in that if 1-octene is used as a comonomer in an amount such that one of the catalysts produces a 1.0 mole % octene copolymer, the other catalyst produces a 1-octene copolymer with the same mole % octene within 0.75 mole %. For the special case of a 1-octene homopolymer, 1-decene is used as the comonomer.

Comonomer incorporation can be measured by many techniques that are known in the art. One technique which may be employed is $^{13}$C NMR spectroscopy, an example of which is described for the determination of comonomer content for ethylene/alpha-olefin copolymers in Randall (Journal of Macromolecular Science, Reviews in Macromolecular Chemistry and Physics, C29 (2 & 3), 201–317 (1989)), the disclosure of which is incorporated herein by reference. The basic procedure for determining the comonomer content of an olefin interpolymer involves obtaining the $^{13}C$ NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

It is known in the art that catalysts for olefin polymerization can change in their ability to incorporate comonomers under different reaction conditions, especially at different reactor temperatures. For example, it is known that the ability of most single-site and metallocene catalysts to incorporate higher alpha olefins in an ethylene/alpha olefin copolymerization decreases with increasing polymerization temperature. In other words, the reactivity ratio $r_1$ generally increases with increasing polymerization temperature.

The reactivity ratios of the metallocenes in general are obtained by known methods, for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 46, 191 (1950) incorporated herein in its entirety by reference. For example, to determine reactivity ratios the most widely used copolymerization model is based on the following equations:

  (1)

  (2)

  (3)

  (4)

where $M_i$ refers to a monomer molecule which is arbitrarily designated as "i" where i=1, 2; and $M_2^*$ refers to a growing polymer chain to which monomer i has most recently attached.

The $k_{ij}$ values are the rate constants for the indicated reactions. For example, in ethylene/propylene copolymerization, $k_{11}$ represents the rate at which an ethylene unit inserts into a growing polymer chain in which the previously inserted monomer unit was also ethylene. The reactivity ratios follow as: $r_1=k_{11}/k_{12}$ and $r_2=k_{22}/k_{21}$ wherein $k_{11}$, $k_{12}$, $k_{22}$ and $k_{21}$ are the rate constants for ethylene (1) or propylene (2) addition to a catalyst site where the last polymerized monomer is an ethylene ($k_{1X}$) or propylene ($k_{2X}$).

Because the change in $r_1$ with temperature may vary from catalyst to catalyst, it should be appreciated that the term "substantially the same comonomer incorporation" refers to catalysts which are compared at the same or substantially the same polymerization conditions, especially with regard to polymerization temperature. Thus, a pair of catalysts may not possess "substantially the same comonomer incorporation" at a low polymerization temperature, but may possess "substantially the same comonomer incorporation" at a higher temperature, and visa versa. For the purposes of this invention, "substantially the same comonomer incorporation" refers to catalysts which are compared at the same or substantially the same polymerization temperature. Because it is also known that different cocatalysts or activators can have an effect on the amount of comonomer incorporation in an olefin copolymerization, it should be appreciated that "substantially the same comonomer incorporation" refers to catalysts which are compared using the same or substantially the same cocatalyst(s) or activator(s). Thus, for the purposes of this invention, a test to determine whether or not two or more catalysts have "substantially the same comonomer incorporation" should be conducted with each catalyst using the same method of activation for each catalyst, and the test should be conducted at the same polymerization temperature, pressure, and monomer content (including comonomer concentration) as is used in the instant inventive process when the individual catalysts are used together.

When a low molecular weight catalyst with $r_1^L$ and a high molecular weight catalyst with $r_1^H$ are selected, the $r_1$ ratio, $r_1^H/r_1^L$, is another way to define the amount of comonomer incorporation by the low and high molecular weight catalysts. To have substantially similar or the same comonomer incorporation in some embodiments of the invention, the ratio, $r_1^H/r_1^L$, preferably should fall between about 0.2 to about 5, more preferably between about 0.25 to about 4, and most preferably between about 0.3 to about 3.5. In some embodiments, substantially similar or the same comonomer incorporation is obtained when the ratio, $r_1^H/r_1^L$, approaches about 1 (i.e., from about 0.9 to about 1.1).

Although $r_1$ may be any value, it preferably should be about 18 or less. For example, $r_1$ may be about 15, 10, 5, or 1. Generally, a lower $r_1$ indicates a higher comonomer incorporation ability for the catalyst. Conversely, a higher $r_1$ generally indicates a lower comonomer incorporation ability for the catalyst (i.e., a higher tendency to make a homopolymer). Therefore, if one desires to make a copolymer with a minimal density split, it would be preferable to use at least two catalysts with substantially similar or identical $r_1$, each of which is less than 18. On the other hand, when one desires to make a blend of homopolymers and copolymers with a significant density split, it would be preferable to employ at least two catalysts with substantially dissimilar $r_1$, at least one of which may be higher than 18.

As described above, while it is preferred to select a high molecular weight catalyst and a lower molecular weight catalyst with substantially similar comonomer incorporation capability, catalysts with different or substantially dissimilar comonomer incorporation capability may be used in embodiments of the invention. When two catalysts have substantially similar comonomer incorporation capability, the interpolymer produced has a minimal density split, i.e., density variations from one polymer chain to another. In contrast, when two catalysts have different or substantially dissimilar comonomer incorporation capability, the interpolymer produced by those two catalysts has a substantial density split. Such density split has a direct impact on the physical characteristics of the interpolymer. Generally, for many applications it is more desirable to produce an interpolymer with a minimal density split.

Long Chain Branching

The interpolymers produced in accordance with some embodiments of the invention have relatively high levels of long chain branches ("LCB"). Long chain branching is formed in the novel interpolymers disclosed herein by reincorporation of vinyl-terminated polymer chains. As such, the distribution of the length of the LCBs correspond to the molecular weight distribution of vinyl-terminated polymer molecules within the polymer sample. Long-chain branches for the purposes of this invention represent the branches formed by reincorporation of vinyl-terminated macromers, not the branches formed by incorporation of the comonomers. The number of carbon atoms on the long chain branches may range from four, five, six or seven to several thousands, depending on the polymerization conditions. The level of LCBs refers to the number of long chain branches per 1000 carbon atoms. Typically, the level of LCBs in the interpolymers is about 0.02 branch/1000 carbons or higher. Some interpolymers may have about 0.05 to 1 LCB/1000 carbons, or even 0.05 to about 3 LCBs/1000 carbons, whereas other interpolymers may have about 0.1 LCBs/1000 carbons to about 10 LCBs/1000 carbons. Still other interpolymers may have LCB exceeding 10/1000 carbons. The presence of a higher levels of LCB may have some beneficial effects. For example, an ethylene interpolymer with LCBs is observed to possess improved processability, such as shear thinning and delayed melt fracture, as described in U.S. Pat. No. 5,272,236. It is expected that a higher level of LCB in an interpolymer may further improve melt processability.

For certain of the embodiments of the present invention, the polymers can be described as having a "comb-like" LCB structure. For the purposes of this invention, a "comb-like" LCB structure refers to the presence of significant levels of polymer molecules having a relatively long backbone and having a plurality of long chain branches which are relatively short compared to the length of the backbone. LCB's that generally are less than about one third of the length of the polymer backbone on average are considered to be relatively short for the purposes of this invention. For example, a polymer comprising individual molecules having a backbone of about 5,000 carbons on average and 3 long chain branches of about 500 carbons each on average would have a "comb-like" structure.

The interpolymers made in accordance with some embodiments of the invention are unique in the following ways: they differ from LDPE in that they have a relatively narrow molecular weight distribution and a controlled long-chain branch structure; on the other hand, they differ from a typical metallocene catalyzed polymer in that their processability is better. Thus, certain of the interpolymers bridge the gap between LDPE and currently available metallocene catalyzed polymers.

Various methods are known for determining the presence of long chain branches. For example, long chain branching can be determined for some of the inventive interpolymers disclosed herein by using $^{13}C$ nuclear magnetic resonance (NMR) spectroscopy and to a limited extent, e.g. for ethylene homopolymers and for certain copolymers, and it can be quantified using the method of Randall, (Journal of Macromolecular Science, Rev. Macromol.Chem. Phvs., C29 (2&3), p. 285–297). Although conventional $^{13}C$ nuclear magnetic resonance spectroscopy cannot determine the length of a long chain branch in excess of about six carbon atoms, there are other known techniques useful for quantifying or determining the presence of long chain branches in ethylene polymers, such as ethylene/1-octene interpolymers. For those interpolymers wherein the $^{13}C$ resonances of the comonomer overlap completely with the $^{13}C$ resonances of the long-chain branches, either the comonomer or the other monomers (such as ethylene) can be isotopically labeled so that the LCB can be distinguished from the comonomer. For example, a copolymer of ethylene and 1-octene can be prepared using $^{13}C$-labeled ethylene. In this case, the LCB resonances associated with macromer incorporation will be significantly enhanced in intensity and will show coupling to neighboring $_{13}C$ carbons, whereas the octene resonances will be unenhanced.

Other methods include the technique disclosed in U.S. Pat. No. 4,500,648, incorporated by reference herein in its entirety, which teaches that long chain branching frequency ("LCBF") can be represented by the equation $LCBF=b/M_w$ wherein b is the weight average number of long chain branches per molecule and $M_W$ is the weight average molecular weight. The molecular weight averages and the long chain branching characteristics are determined by gel permeation chromatography and intrinsic viscosity methods, respectively.

Two other useful methods for quantifying or determining the presence of long chain branches in ethylene polymers, such as ethylene/1-octene interpolymers, are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., *J. Chem. Phys.*, 17, 1301 (1949) and Rudin, A., *Modern Methods of Polymer Characterization*, John Wiley & Sons, New York (1991) pp. 103–112, the disclosures of both of which are incorporated by reference. Still another method for determining long chain branching is using GPC-FTIR as described by Markel, E. J., et al. *Macromolecules*, 2000, 33, 8541–48 (2000), which is incorporated by reference herein in its entirety.

The formation of long chain branching depends on a number of factors, including but not limited to, monomer (or comonomer) concentration, reactor temperature, pressure, polymer concentration, and catalyst(s) used. Generally, a higher level of long chain branching may be obtained when a polymerization reaction is operated at a higher temperature, a lower comonomer concentration, a higher polymer concentration, and using catalysts which can generate a relatively high percentage of vinyl end groups and have relatively high comonomer incorporation ability (i.e., lower $r_1$). Conversely, a lower level of long chain branching may be obtained when a polymerization reaction is operated at a lower temperature, a higher comonomer concentration, a lower polymer concentration, and using catalysts which can generate a relatively low percentage of vinyl end groups and have relatively low comonomer incorporation ability (i.e., higher $r_1$).

Catalysts:

Any catalyst which is capable of copolymerizing one or more olefin monomers to make an interpolymer or homopolymer may be used in embodiments of the invention. For certain embodiments, additional selection criteria, such as molecular weight capability and/or comonomer incorporation capability, preferably should be satisfied. Suitable catalysts include, but are not limited to, single-site catalysts (both metallocene catalysts and constrained geometry catalysts), multi-site catalysts (Ziegler-Natta catalysts), and variations therefrom. They include any known and presently unknown catalysts for olefin polymerization. It should be understood that the term "catalyst" as used herein refers to a metal-containing compound which is used, along with an activating cocatalyst, to form a catalyst system. The catalyst, as used herein, is usually catalytically inactive in the absence of a cocatalyst or other activating technique. However, not all suitable catalyst are catalytically inactive without a cocatalyst and thus requires activation.

One suitable class of catalysts is the constrained geometry catalysts disclosed in U.S. Pat. Nos. 5,064,802, 5,132,380, 5,703,187, 6,034,021, EP 0 468 651, EP 0 514 828, WO 93/19104, and WO 95/00526, all of which are incorporated by references herein in their entirety. Another suitable class of catalysts is the metallocene catalysts disclosed in U.S. Pat. Nos. 5,044,438; 5,057,475; 5,096,867; and 5,324,800, all of which are incorporated by reference herein in their entirety. It is noted that constrained geometry catalysts may be considered as metallocene catalysts, and both are sometimes referred to in the art as single-site catalysts.

For example, catalysts may be selected from the metal coordination complexes corresponding to the formula:

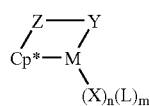

Formula I wherein: M is a metal of group 3, 4–10, or the lanthanide series of the periodic table of the elements; Cp* is a cyclopentadienyl or substituted cyclopentadienyl group bound in an $\eta^5$ bonding mode to M; Z is a moiety comprising boron, or a member of group 14 of the periodic table of the elements, and optionally sulfur or oxygen, the moiety having up to 40 non-hydrogen atoms, and optionally Cp* and Z together form a fused ring system; X independently each occurrence is an anionic ligand group, said X having up to 30 non-hydrogen atoms; n is 2 less than the valence of M when Y is anionic, or 1 less than the valence of M when Y is neutral; L independently each occurrence is a neutral Lewis base ligand group, said L having up to 30 non-hydrogen atoms; m is 0, 1, 2, 3, or 4; and Y is an anionic or neutral ligand group bonded to Z and M comprising nitrogen, phosphorus, oxygen or sulfur and having up to 40 non-hydrogen atoms, optionally Y and Z together form a fused ring system.

Suitable catalysts may also be selected from the metal coordination complex corresponds to the formula:

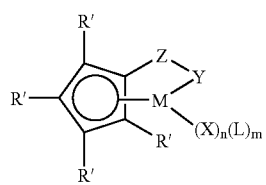

Formula II wherein R' each occurrence is independently selected from the group consisting of hydrogen, alkyl, aryl, silyl, germyl, cyano, halo and combinations thereof having up to 20 non-hydrogen atoms; X each occurrence independently is selected from the group consisting of hydride, halo, alkyl, aryl, silyl, germyl, aryloxy, alkoxy, amide, siloxy, and combinations thereof having up to 20 non-hydrogen atoms; L independently each occurrence is a neural Lewis base ligand having up to 30 non-hydrogen atoms; Y is —O—, —S—, —NR*—, —PR*—, or a neutral two electron donor ligand selected from the group consisting of OR*, SR*, NR*$_2$, PR*$_2$; M, n, and m are as previously defined; and Z is SIR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$; wherein: R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system.

It should be noted that whereas formula I and the following formulas indicate a monomeric structure for the catalysts, the complex may exist as a dimer or higher oligomer.

Further preferably, at least one of R', Z, or R* is an electron donating moiety. Thus, highly preferably Y is a nitrogen or phosphorus containing group corresponding to the formula —N(R"")— or —P(R"")—, wherein R"" is $C_{1-10}$ alkyl or aryl, i.e., an amido or phosphido group.

Additional catalysts may be selected from the amidosilane- or amidoalkanediyl-compounds corresponding to the formula:

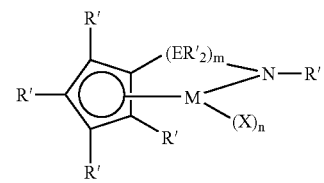

Formula III wherein: M is titanium, zirconium or hafnium, bound in an $\eta^5$ bonding mode to the cyclopentadienyl group; R' each occurrence is independently selected from the group consisting of hydrogen, silyl, alkyl, aryl and combinations thereof having up to 10 carbon or silicon atoms; E is silicon or carbon; X independently each occurrence is hydride, halo, alkyl, aryl, aryloxy or alkoxy of up to 10 carbons; m is 1 or 2; and n is 1 or 2 depending on the valence of M.

Examples of the above metal coordination compounds include, but are not limited to, compounds in which the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific compounds include, but are not limited to, (tertbutylamido)(tetramethyl-$\eta^5$-cyclopentadienyl)-1,2-ethanediylzirconiumdimethyl, (tert-butylamido)(tetramethyl-$\eta^5$-cyclopentadienyl)-1,2-ethanediyltitaniumdimethyl, (methylamido)(tetramethyl-$\eta^5$-cyclopentadienyl)-1,2-ethanediylzirconiumdichloride, (methylamido)(tetramethyl-$\eta^5$-eyelopentadienyl)-1,2-ethanediyltitaniumdichloride, (ethylamido)(tetramethyl-$\eta^5$-cyclopentadienyl)-methylenetitanium dichloro, (tertbutylamido)diphenyl(tetramethyl-$\eta^5$-cyclopentadienyl)-silanezirconiumdibenzyl, (benzylamido)dimethyl-(tetramethyl-$\eta^5$-cyclopentadienyl)ilanetitaniumdichloride, phenylphosphido)dimethyl(tetramethyl-η⁵-cyclopentadienyl)silanezirconiumdibenzyl, and the like.

Another suitable class of catalysts is substituted indenyl containing metal complexes as disclosed in U.S. Pat. No. 5,965,756 and 6,015,868 which are incorporated by reference herein in their entirety. Other catalysts are disclosed in copending applications: U.S. application Ser. Nos. 09/230,185; and 09/715,380, and U.S. Provisional Application Ser. Nos. 60/215,456; 60/170,175, and 60/393,862. The disclosures of all of the preceding patent applications are incorporated by reference herein in their entirety. These catalysts tend to have a higher molecular weight capability.

One class of the above catalysts is the indenyl containing metal wherein:

Formula IV

M is titanium, zirconium or hafnium in the +2, +3 or +4 formal oxidation state;

A' is a substituted indenyl group substituted in at least the 2 or 3 position with a group selected from hydrocarbyl, fluoro-substituted hydrocarbyl, hydrocarbyloxy-substituted hydrocarbyl, dialkylamino-substituted hydrocarbyl, silyl, germyl and mixtures thereof, the group containing up to 40 non-hydrogen atoms, and the A' further being covalently bonded to M by means of a divalent Z group; Z is a divalent moiety bound to both A' and M via σ-bonds, the Z comprising boron, or a member of Group 14 of the Periodic Table of the Elements, and also comprising nitrogen, phosphorus, sulfur or oxygen; X is an anionic or dianionic ligand group having up to 60 atoms exclusive of the class of ligands that are cyclic, delocalized, π-bound ligand groups; X' independently each occurrence is a neutral Lewis base, having up to 20 atoms; p is 0, 1 or 2, and is two less than the formal oxidation state of M, with the proviso that when X is a dianionic ligand group, p is 1; and q is 0, 1 or 2.

The above complexes may exist as isolated crystals optionally in pure form or as a mixture with other complexes, in the form of a solvated adduct, optionally in a solvent, especially an organic liquid, as well as in the form of a dimer or chelated derivative thereof, wherein the chelating agent is an organic material, preferably a neutral Lewis base, especially a trihydrocarbylamine, trihydrocarbylphosphine, or halogenated derivative thereof.

Preferred catalysts are complexes corresponding to the formula:

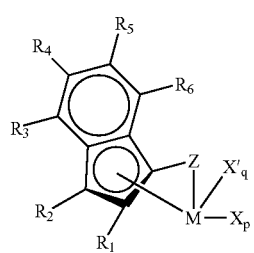

Formula V wherein $R^1$ and $R_2$ independently are groups selected from hydrogen, hydrocarbyl, perfluoro substituted hydrocarbyl, silyl, germyl and mixtures thereof, the group containing up to 20 non-hydrogen atoms, with the proviso that at least one of $R_1$ or $R_2$ is not hydrogen; $R_3$, $R_4$, $R_5$, and $R_6$ independently are groups selected from hydrogen, hydrocarbyl, perfluoro substituted hydrocarbyl, silyl, germyl and mixtures thereof, the group containing up to 20 non-hydrogen atoms; M is titanium, zirconium or hafnium; Z is a divalent moiety comprising boron, or a member of Group 14 of the Periodic Table of the Elements, and also comprising nitrogen, phosphorus, sulfur or oxygen, the moiety having up to 60 non-hydrogen atoms; p is 0, 1 or 2; q is zero or one; with the proviso that: when p is 2, q is zero, M is in the +4 formal oxidation state, and X is an anionic ligand selected from the group consisting of halide, hydrocarbyl, hydrocarbyloxy, di(hydrocarbyl)amido, di(hydrocarbyl)phosphido, hydrocarbylsulfido, and silyl groups, as well as halo-, di(hydrocarbyl)amino-, hydrocarbyloxy- and di(hydrocarbyl)phosphino-substituted derivatives thereof, the X group having up to 20 non-hydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or non-conjugated diene, optionally substituted with one or more hydrocarbyl groups, the X' having up to 40 carbon atoms and forming a π-complex with M.

More preferred catalysts are complexes corresponding to the formula:

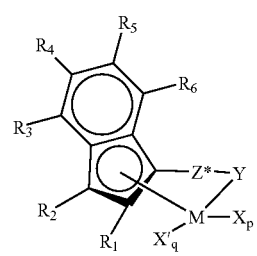

Formula VI wherein: $R_1$ and $R_2$ are hydrogen or $C_{1-6}$ alkyl, with the proviso that at least one of $R_1$ or $R_2$ is not hydrogen; $R_3$, $R_4$, $R_5$, and $R_6$ independently are hydrogen or $C_{1-6}$ alkyl; M is titanium; Y is —O—, —S—, —NR*—, —PR*—; Z* is SiR*$_2$, CR*$_2$, SiR*$_2$SiR*$_2$, CR*$_2$CR*$_2$, CR*=CR*, CR*$_2$SiR*$_2$, or GeR*$_2$; R* each occurrence is independently hydrogen, or a member selected from hydrocarbyl, hydrocarbyloxy, silyl, halogenated alkyl, halogenated aryl, and combinations thereof, the R* having up to 20 non-hydrogen atoms, and optionally, two R* groups from Z (when R* is not hydrogen), or an R* group from Z and an R* group from Y form a ring system; p is 0, 1 or 2; q is zero or one; with the proviso that: when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 1,4-butadienyl, and when p is 0, q is 1, M is in the +2 formal oxidation state, and X' is 1,4-diphenyl-1,3-butadiene or 1,3-pentadiene. The latter diene is illustrative of unsymmetrical diene groups that result in production of metal complexes that are actually mixtures of the respective geometrical isomers.

Examples of specific catalysts that may be used in embodiments of the invention include, but are not limited, the following metal complexes:

2-methylindenyl Complexes:

(t-butylamido)dimethyl($\eta^5$-2-methylindenyl)silanetitanium (II) 1,4-diphenyl-1,3-butadiene; (t-butylamido)dimethyl($\eta^5$-2-methylindenyl)silanetitanium (II) 1,3-pentadiene; (t-butylamido)dimethyl($\eta^5$-2-methylindenyl)silanetitanium (III) 2-(N,N-dimethylamino)benzyl; (t-butylamido)dimethyl ($\eta^5$-2-methylindenyl)silanetitanium (IV) dimethyl; (t-butylamido)dimethyl($\eta^5$-2-methylindenyl)silanetitanium (IV) dibenzyl; (n-butylamido)dimethyl($\eta^5$-2-methylindenyl)silanetitanium (II) 1,4-diphenyl-1,3-butadiene; (n-butylamido)dimethyl($\eta^5$-2-methylindenyl)silanetitanium (II) 1,3-pentadiene; (n-butylamido)dimethyl ($\eta^5$-2-methylindenyl)silanetitanium (III) 2-(N,N-dimethylamino)benzyl; (n-butylamido)dimethyl($\eta^5$-2-methylindenyl)silanetitanium (IV) dimethyl; (n-butylamido)dimethyl($\eta^5$-2-methylindenyl)silanetitanium (IV) dibenzyl; (cyclododecylamido)dimethyl($\eta^5$-2-methylindenyl)silanetitanium (II) 1,4-diphenyl-1,3-butadiene; (cyclododecylamido)dimethyl($\eta^5$-2-methylindenyl)silanetitanium (II) 1,3-pentadiene, (cyclododecylamido)dimethyl($\eta^5$-2-methylindenyl)silanetitanium (III) 2-(N,N-dimethylamino)benzyl; (cyclododecylamido)dimethyl($\eta^5$-2-methylindenyl)silanetitanium (IV) dimethyl; (cyclododecylamido)dimethyl ($\eta^5$-2-methylindenyl)silanetitanium (IV) dibenzyl; (2,4,6trimethylanilido)dimethyl($\eta^5$-2-methylindenyl) silanetitanium (II) 1,4-diphenyl-1,3-butadiene; (2,4,6-trimethylanilido)dimethyl($\eta^5$-2-methylindenyl) silanetitanium (II) 1,3-pentadiene; (2,4,6-trimethylanilido)dimethyl($\eta^5$-2-methylindenyl)silanetitanium (III) 2-(N,N-dimethylamino)benzyl; (2,4,6-trimethylanilido)dimethyl ($\eta^5$-2-methylindenyl)silanetitanium (IV) dimethyl; (2,4,6-trimethylanilido)dimethyl($\eta^5$-2-methylindenyl) silanetitanium (IV) dibenzyl; (1-adamantylamido)dimethyl ($\eta^5$-2-methylindenyl)silanetitanium (II) 1,4-diphenyl-1,3-butadiene; (1-adamantylamido)dimethyl($\eta^5$-2-methylindenyl)silanetitanium (II) 1,3-pentadiene; (1-adamantylamido)dimethyl($\eta^5$-2-methylindenyl)silanetitanium (III) 2-(N,N-dimethylamino)benzyl; (1-adamantylamido)dimethyl($\eta^5$-2-methylindenyl)silanetitanium (IV) dimethyl; (1-adamantylamido)dimethyl($\eta^5$-2-methylindenyl)silanetitanium (IV) dibenzyl; (t-butylamido)dimethyl ($\eta^5$-2-methylindenyl)silanetitanium (II) 1,4-diphenyl-1,3-butadiene; (t-butylamido)dimethyl($\eta^5$-2-methylindenyl) silanetitanium (II) 1,3-pentadiene; (t-butylamido)dimethyl ($\eta^5$-2-methylindenyl)silanetitanium (III) 2-(N,N-dimethylamino)benzyl; (t-butylamido)dimethyl($\eta^5$-2-methylindenyl)silanetitanium (IV) dimethyl; (t-butylamido)dimethyl($\eta^5$-2-methylindenyl)silanetitanium (IV) dibenzyl; (n-butylamido)diisopropoxy($\eta^5$-2-methylindenyl)silanetitanium (II) 1,4-diphenyl-1,3-butadiene; (n-butylamido)diisopropoxy($\eta^5$-2-methylindenyl)silanetitanium (II) 1,3-pentadiene; (n-butylamido)diisopropoxy($\eta^5$-2-methylindenyl) silanetitanium (III) 2-(N,N-dimethylamino)benzyl; (n-butylamido)diisopropoxy($\eta^5$-2-methylindenyl)silanetitanium (IV) dimethyl; (n-butylamido)diisopropoxy($\eta^5$-2-methylindenyl)silanetitanium (IV) dibenzyl; (cyclododecylamido)diisopropoxy($\eta^5$-2-methylindenyl)-silanetitanium (II) 1,4-diphenyl-1,3-butadiene; (cyclododecylamido)diisopropoxy($\eta^5$-2-methylindenyl)-silanetitanium (II) 1,3-pentadiene; (cyclododecylamido)diisopropoxy($\eta^5$-2-methylindenyl)-silanetitanium (III) 2-(N,N-dimethylamino)benzyl; (cyclododecylamido)diisopropoxy($\eta^5$-2-methylindenyl)-silanetitanium (IV) dimethyl; (cyclododecylamido)diisopropoxy($\eta^5$-2-methylindenyl)-silanetitanium (IV) dibenzyl; (2,4,6-trimethylanilido)diisopropoxy($\eta^5$-2-methyl-indenyl) silanetitanium (II) 1,4-diphenyl-1,3-butadiene; (2,4,6-trimethylanilido)diisopropoxy($\eta^5$-2-methylindenyl)silanetitanium (II) 1,3-pentadiene; (2,4,6-trimethylanilido) diisopropoxy($\eta^5$-2-methylindenyl)silanetitanium (III) 2-(N,N-dimethylamino)benzyl; (2,4,6-trimethylanilido)diisopropoxy($\eta^5$-2-methylindenyl)silanetitanium (IV) dimethyl; (2,4,6-trimethylanilido)diisopropoxy($\eta^5$-2-methylindenyl)silanetitanium (IV) dibenzyl; (1-adamantylamido)diisopropoxy($\eta^5$-2-methylindenyl)silanetitanium (II) 1,4-diphenyl-1,3-butadiene; (1-adamantylamido)diisopropoxy($\eta^5$-2-methylindenyl)silanetitanium (II) 1,3-pentadiene; (1-adamantylamido)diisopropoxy($\eta^5$-2-methylindenyl)silanetitanium (III) 2-(N,N-dimethylamino)benzyl; (1-adamantylamido)diisopropoxy($\eta^5$-2-methylindenyl)silanetitanium (IV) dimethyl; (1-adamantylamido)diisopropoxy($\eta^5$-2-methylindenyl)silanetitanium (IV) dibenzyl; (n-butylamido)dimethoxy($\eta^5$-2-methylindenyl)silanetitanium (II) 1,4-diphenyl-1,3-butadiene; (n-butylamido)dimethoxy($\eta^5$-2-methylindenyl)silanetitanium (II) 1,3-pentadiene; (n-butylamido)dimethoxy($\eta^5$-2-methylindenyl) silanetitanium (III) 2-(N,N-dimethylamino)benzyl; (n-butylamido)dimethoxy($\eta^5$-2-methylindenyl)silanetitanium (IV) dimethyl; (n-butylamido)dimethoxy($\eta^5$-2-methylindenyl)silanetitanium (IV) dibenzyl; (cyclododecylamido)dimethoxy($\eta^5$-2-methylindenyl)silanetitanium (II) 1,4-diphenyl-1,3-butadiene; (cyclododecylamido)dimethoxy($\eta^5$-2-methylindenyl)silanetitanium (II) 1,3-pentadiene; (cyclododecylamido)dimethoxy($\eta^5$-2-methylindenyl)silanetitanium (III) 2-(N,N-dimethylamino)benzyl; (cyclododecylamido)dimethoxy($\eta^5$-2-methylindenyl)silanetitanium (IV) dimethyl; (cyclododecylamido)dimethoxy ($\eta^5$-2-methylindenyl)silanetitanium (IV) dibenzyl; (2,4,6-trimethylanilido)dimethoxy($\eta^5$-2-methylindenyl) silanetitanium (II) 1,4-diphenyl-1,3-butadiene; (2,4,6-trimethylanilido)dimethoxy($\eta^5$-2-methylindenyl) silanetitanium (II) 1,3-pentadiene; (2,4,6-trimethylanilido) dimethoxy($\eta^5$-2-methylindenyl)silanetitanium (III) 2-(N,N-dimethylamino)benzyl; (2,4,6-trimethylanilido)dimethoxy ($\eta^5$-2-methylindenyl)silanetitanium (IV) dimethyl; (2,4,6-trimethylanilido)dimethoxy($\eta^5$-2-methylindenyl) silanetitanium (IV) dibenzyl; (1-adamantylamido) dimethoxy($\eta^5$-2-methylindenyl)silanetitanium (II) 1,4-diphenyl-1,3-butadiene; (1-adamantylamido)dimethoxy($\eta^5$-2-methylindenyl)silanetitanium (II) 1,3-pentadiene; (1-adamantylamido)dimethoxy($\eta^5$-2-methylindenyl)silanetitanium (III) 2-(N,N-dimethylamino)benzyl; (1-adamantylamido)dimethoxy($\eta^5$-2-methylindenyl)silanetitanium (IV) dimethyl; (1-adamantylamido)dimethoxy($\eta^5$-2-methylindenyl)silanetitanium (IV) dibenzyl; (n-butylamido)ethoxymethyl($\eta^5$-2-methylindenyl)silanetitanium (II) 1,4-diphenyl-1,3-butadiene; (n-butylamido)ethoxymethyl($\eta^5$-2-methylindenyl)silanetitanium (II) 1,3-pentadiene; (n-butylamido)ethoxymethyl($\eta^5$-2-methylindenyl)silanetitanium (III) 2-(N,N-dimethylamino) benzyl; (n-butylamido)ethoxymethyl($\eta^5$-2-methylindenyl)silanetitanium (IV) dimethyl; (n-butylamido)ethoxymethyl($\eta^5$-2-methylindenyl) silanetitanium (IV) dibenzyl; (cyclododecylamido)ethoxymethyl($\eta^5$-2-methylindenyl)silanetitanium (II) 1,4-diphenyl-1,3-butadiene; (cyclododecylamido)ethoxymethyl ($\eta^5$-2-methylindenyl)silanetitanium (II) 1,3-pentadiene; (cyclododecylamido)ethoxymethyl($\eta^5$-2-methylindenyl)silanetitanium (III) 2-(N,N-dimethylamino)benzyl; (cyclododecylamido)ethoxymethyl($\eta^5$-2-methylindenyl)silanetitanium (IV) dimethyl; (cyclododecylamido)ethoxymethyl ($\eta^5$-2-methylindenyl)silanetitanium (IV) dibenzyl; (2,4,6-trimethylanilido)ethoxymethyl($\eta^5$-2-methylindenyl) silanetitanium (II) 1,4-diphenyl-1,3-butadiene; (2,4,6-trimethylanilido)ethoxymethyl($\eta^5$-2-methylindenyl) silanetitanium (II) 1,3-pentadiene; (2,4,6-trimethylanilido) ethoxymethyl($\eta^5$-2-methylindenyl)silanetitanium (III) 2-(N,N-dimethylamino)benzyl; (2,4,6-trimethylanilido) ethoxymethyl($\eta^5$-2-methylindenyl)silanetitanium (IV) dimethyl; (2,4,6-trimethylanilido)ethoxymethyl($\eta^5$-2-methylindenyl)silanetitanium (IV) dibenzyl; (1-adamantylamido) ethoxymethyl($\eta^5$-2-methylindenyl)silanetitanium (II) 1,4-diphenyl-1,3-butadiene; (1-adamantylamido)ethoxymethyl ($\eta^5$-2-methylindenyl)silanetitanium (II) 1,3-pentadiene; (1-adamantylamido)ethoxymethyl($\eta^5$-2-methylindenyl)silanetitanium (III) 2-(N,N-dimethylamino)benzyl; (1-adamantylamido)ethoxymethyl($\eta^5$-2-methylindenyl)silanetitanium (IV) dimethyl; (1-adamantylamido)ethoxymethyl($\eta^5$-2-methylindenyl)silanetitanium (IV) dibenzyl;

2,3-dimethylindenyl Complexes:

(t-butylamido)dimethyl($\eta^5$-2,3-dimethylindenyl)silanetitanium (II) 1,4-diphenyl-1,3-butadiene; (t-butylamido)dimethyl($\eta^5$-2,3-dimethylindenyl)silanetitanium (II) 1,3-pentadiene; (t-butylamido)dimethyl($\eta^5$-2,3-dimethylindenyl) silanetitanium (III) 2-(N,N-dimethylamino)benzyl; (t-butylamido)dimethyl($\eta^5$-2,3-dimethylindenyl)silanetitanium (IV) dimethyl; (t-butylamido)dimethyl($\eta^5$-2,3-dimethylindenyl)silanetitanium (IV) dibenzyl; (n-butylamido)dimethyl($\eta^5$-2,3-dimethylindenyl)-silanetitanium (II) 1,4-diphenyl-1,3-butadiene; (n-butylamido)dimethyl($\eta^5$-2,3-dimethylindenyl)silanetitanium (II) 1,3-pentadiene; (n-butylamido)dimethyl($\eta^5$-2,3-dimethylindenyl)-silanetitanium (III) 2-(N,N-dimethylamino)benzyl; (n-butylamido) dimethyl($\eta^5$-2,3-dimethylindenyl)silanetitanium (IV) dimethyl; (n-butylamido)dimethyl($\eta^5$-2,3-dimethylindenyl) silanetitanium (IV) dibenzyl; (cyclododecylamido)dimethyl ($\eta^5$-2,3-dimethylindenyl)silanetitanium (II) 1,4-diphenyl-1,3-butadiene; (cyclododecylamido)dimethyl($\eta^5$-2,3-dimethylindenyl)silanetitanium (II) 1,3-pentadiene; (cyclododecylamido)dimethyl($\eta^5$-2,3-dimethylindenyl)silanetitanium (III) 2-(N,N-dimethylamino)benzyl; (cyclododecylamido)dimethyl($\eta^5$-2,3-dimethylindenyl)silanetitanium (IV) dimethyl; (cyclododecylamido)dimethyl($\eta^5$-2,3-dimethylindenyl)silanetitanium (IV) dibenzyl; (2,4,6-trimethylanilido)dimethyl($\eta^5$-2,3-dimethyl-indenyl) silanetitanium (II) 1,4-diphenyl-1,3-butadiene; (2,4,6-trimethylanilido)dimethyl($\eta^5$-2,3-dimethylindenyl) silanetitanium (II) 1,3-pentadiene; (2,4,6-trimethylanilido) dimethyl($\eta^5$-2,3-dimethylindenyl)silanetitanium (III) 2-(N,N-dimethylamino)benzyl; (2,4,6-trimethylanilido)dimethyl ($\eta^5$-2,3-dimethylindenyl)silanetitanium (IV) dimethyl; (2,4,6-trimethylanilido)dimethyl($\eta^5$-2,3-dimethylindenyl) silanetitanium (IV) dibenzyl; (1-adamantylamido)dimethyl ($\eta^5$-2,3-dimethylindenyl)silanetitanium (II) 1,4-diphenyl-1,3-butadiene; (1-adamantylamido)dimethyl($\eta^5$-2,3-dimethylindenyl)silanetitanium (II) 1,3-pentadiene; (1-adamantylamido)dimethyl($\eta^5$-2,3-dimethylindenyl)silanetitanium (III) 2-(N,N-dimethylamino)benzyl; (1-adamantylamido)dimethyl($\eta^5$-2,3-dimethylindenyl)silanetitanium (IV) dimethyl; (1-adamantylamido)dimethyl($\eta^5$-2,3-dimethylindenyl)silanetitanium (IV) dibenzyl; (t-butylamido)dimethyl($\eta^5$-2,3-dimethylindenyl)silanetitanium (II)1,4-diphenyl-1,3-butadiene; (t-butylamido)dimethyl($\eta^5$-2,3-dimethylindenyl)silanetitanium (II) 1,3-pentadiene; (t-butylamido)dimethyl($\eta^5$-2,3-dimethylindenyl) silanetitanium (III) 2-(N,N-dimethylamino)benzyl; (t-butylamido)dimethyl($\eta^5$-2,3-dimethylindenyl)silanetitanium (IV) dimethyl; (t-butylamido)dimethyl($\eta^5$-2,3-dimethylindenyl)silanetitanium (IV) dibenzyl; (n-butylamido)diisopropoxy($\eta^5$-2,3-dimethylindenyl)silanetitanium (II) 1,4-diphenyl-1,3-butadiene; (n-butylamido)diisopropoxy($\eta^5$-2,3-dimethylindenyl)silanetitanium (II) 1,3-pentadiene; (n-butylamido)diisopropoxy($\eta^5$-2,3-dimethylindenyl)silanetitanium (III) 2-(N,N-dimethylamino)benzyl; (n-butylamido)diisopropoxy($\eta^5$-2,3-dimethylindenyl)silanetitanium (IV) dimethyl; (n-butylamido)diisopropoxy($\eta^5$-2,3-dimethylindenyl)silanetitanium (IV) dibenzyl; (cyclododecylamido)diisopropoxy($\eta^5$-2,3-dimethylindenyl)-silanetitanium (II) 1,4-diphenyl-1,3-butadiene; (cyclododecylamido)diisopropoxy($\eta^5$-2,3-dimethylindenyl)-silanetitanium (II) 1,3-pentadiene; (cyclododecylamido)diisopropoxy($\eta^5$-2,3-dimethylindenyl)-silanetitanium (III) 2-(N,N-dimethylamino)benzyl; (cyclododecylamido)diisopropoxy($\eta^5$-2,3-dimethylindenyl)-silanetitanium (IV) dimethyl; (cyclododecylamido)diisopropoxy($\eta^5$-2,3-dimethylindenyl)-silanetitanium (IV) dibenzyl; (2,4,6-trimethylanilido) diisopropoxy($\eta^5$-2,3-dimethyl-indenyl)silanetitanium (II) 1,4-diphenyl-1,3-butadiene; (2,4,6-trimethylanilido) diisopropoxy($\eta^5$-2,3-dimethylindenyl)silanetitanium (II) 1,3-pentadiene; (2,4,6-trimethylanilido)diisopropoxy($\eta^5$-2,3-dimethylindenyl)silanetitanium (III) 2-(N,N-dimethylamino)benzyl; (2,4,6-trimethylanilido) diisopropoxy($\eta^5$-2,3-dimethylindenyl)silanetitanium (IV) dimethyl; (2,4,6-trimethylanilido)diisopropoxy($\eta^5$-2,3-dimethylindenyl)silanetitanium (IV) dibenzyl; (1-adamantylamido)diisopropoxy($\eta^5$-2,3-dimethylindenyl)silanetitanium (II) 1,4-diphenyl-1,3-butadiene; (1-adamantylamido)diisopropoxy($\eta^5$-2,3-dimethylindenyl)silanetitanium (II) 1,3-pentadiene; (1-adamantylamido)diisopropoxy($\eta^5$-2,3-dimethylindenyl)silanetitanium (III) 2-(N,N-dimethylamino)benzyl; (1-adamantylamido)diisopropoxy($\eta^5$-2,3-dimethylindenyl)silanetitanium (IV) dimethyl; (1-adamantylamido)diisopropoxy($\eta^5$-2,3-dimethylindenyl) silanetitanium (IV) dibenzyl; (n-butylamido)dimethoxy($\eta^5$-2,3-dimethylindenyl)silanetitanium (II) 1,4-diphenyl-1,3-butadiene; (n-butylamido)dimethoxy($\eta^5$-2,3-dimethylindenyl)silanetitanium (II) 1,3-pentadiene; (n-butylamido)dimethoxy($\eta^5$-2,3-dimethylindenyl)silanetitanium (III) 2-(N,N-dimethylamino)benzyl; (n-butylamido) dimethoxy($\eta^5$-2,3-dimethylindenyl)silanetitanium (IV) dimethyl; (n-butylamido) dimethoxy($\eta^5$-2,3-dimethylindenyl)silanetitanium (IV) dibenzyl; (cyclododecylamido) dimethoxy($\eta^5$-2,3-dimethylindenyl)silanetitanium (II) 1,4-diphenyl-1,3-butadiene; (cyclododecylamido)dimethoxy ($\eta^5$-2,3-dimethylindenyl)silanetitanium (II) 1,3-pentadiene; (cyclododecylamido)dimethoxy($\eta^5$-2,3-dimethylindenyl)silanetitanium (III) 2-(N,N-dimethylamino)benzyl; (cyclododecylamido)dimethoxy($\eta^5$-2,3-dimethylindenyl)silanetitanium (IV) dimethyl; (cyclododecylamido)dimethoxy ($\eta^5$-2,3-dimethylindenyl)silanetitanium (IV) dibenzyl; (2,4,6-trimethylanilido)dimethoxy($\eta$methylanilido)dimethoxy ($\eta^5$-2,3-dimethylindenyl)silanetitanium (II) 1,4-diphenyl-1,3-butadiene; (2,4,6-trimethylanilido)dimethoxy($\eta^5$-2,3-dimethylindenyl)silanetitanium (II) 1,3-pentadiene; (2,4,6-trimethylanilido)dimethoxy($\eta^5$-2,3-dimethylindenyl) silanetitanium (III) 2-(N,N-dimethylamino)benzyl; (2,4,6-trimethylanilido)dimethoxy($\eta^5$-2,3-dimethylindenyl) silanetitanium (IV) dimethyl; (2,4,6-trimethylanilido) dimethoxy($\eta^5$-2,3-dimethylindenyl)silanetitanium (IV) dibenzyl; (1-adamantylamido)dimethoxy($\eta^5$-2,3-dimethylindenyl)silanetitanium (II) 1,4-diphenyl-1,3-butadiene;

(1-adamantylamido)dimethoxy($\eta^5$-2,3-dimethylindenyl)silanetitanium (II) 1,3-pentadiene; (1-adamantylamido)dimethoxy($\eta^5$-2,3-dimethylindenyl)silanetitanium (III) 2-(N,N-dimethylamino)benzyl; (1-adamantylamido)dimethoxy($\eta^5$-2,3-dimethylindenyl)silanetitanium (IV) dimethyl; (1-adamantylamido)dimethoxy($\eta^5$-2,3-dimethylindenyl)silanetitanium (IV) dibenzyl; (n-butylamido)ethoxymethyl($\eta^5$-2,3-dimethylindenyl)-silanetitanium (II) 1,4-diphenyl-1,3-butadiene; (n-butylamido)ethoxymethyl($\eta^5$-2,3-dimethylindenyl)silanetitanium (II) 1,3-pentadiene; (n-butylamido)ethoxymethyl($\eta^5$-2,3-dimethylindenyl)silanetitanium (III) 2-(N,N-dimethylamino)benzyl; (n-butylamido)ethoxymethyl($\eta^5$-2,3-dimethylindenyl)silanetitanium (IV) dimethyl; (n-butylamido)ethoxymethyl($\eta^5$-2,3-dimethylindenyl)silanetitanium (IV) dibenzyl; (cyclododecylamido)ethoxymethyl($\eta^5$-2,3-dimethylindenyl)silanetitanium (II) 1,4-diphenyl-1,3-butadiene; (cyclododecylamido)ethoxymethyl($\eta^5$-2,3-dimethylindenyl)silanetitanium (II) 1,3-pentadiene; (cyclododecylamido)ethoxymethyl($\eta^5$-2,3-dimethylindenyl)silanetitanium (III) 2-(N,N-dimethylamino)benzyl; (cyclododecylamido)ethoxymethyl($\eta^5$-2,3-dimethylindenyl)silanetitanium (IV) dimethyl; (cyclododecylamido)ethoxymethyl($\eta^5$-2,3-dimethylindenyl)silanetitanium (IV) dibenzyl; (2,4,6-trimethylanilido)ethoxymethyl($\eta^5$-2,3-dimethylindenyl)silanetitanium (II) 1,4-diphenyl-1,3-butadiene; (2,4,6-trimethylanilido)ethoxymethyl($\eta^5$-2,3-dimethylindenyl)silanetitanium (II) 1,3-pentadiene; (2,4,6-trimethylanilido)ethoxymethyl($\eta^5$-2,3-dimethylindenyl)silanetitanium (III) 2-(N,N-dimethylamino)benzyl; (2,4,6-trimethylanilido)ethoxymethyl($\eta^5$-2,3-dimethylindenyl)silanetitanium (IV) dimethyl; (2,4,6-trimethylanilido)ethoxymethyl($\eta^5$-2,3-dimethylindenyl)silanetitanium (IV) dibenzyl; (1-adamantylamido)ethoxymethyl($\eta^5$-2,3-dimethylindenyl)silanetitanium (II) 1,4-diphenyl-1,3-butadiene; (1-adamantylamido)ethoxymethyl($\eta^5$-2,3-dimethylindenyl)silanetitanium (II) 1,3-pentadiene; (1-adamantylamido)ethoxymethyl($\eta^5$-2,3-dimethylindenyl)silanetitanium (III) 2-(N,N-dimethylamino)benzyl; (1-adamantylamido)ethoxymethyl($\eta^5$-2,3-dimethylindenyl)silanetitanium (IV) dimethyl; (1-adamantylamido)ethoxymethyl($\eta^5$-2,3-dimethylindenyl)silanetitanium (IV) dibenzyl;

3-methylindenyl Complexes:

(t-butylamido)dimethyl($\eta^5$-3-methylindenyl)silanetitanium (II) 1,4-diphenyl-1,3-butadiene; (t-butylamido)dimethyl($\eta^5$-3-methylindenyl)silanetitanium (II) 1,3-pentadiene; (t-butylamido)dimethyl($\eta^5$-3-methylindenyl)silanetitanium (III) 2-(N,N-dimethylamino)benzyl; (t-butylamido)dimethyl($\eta^5$-3-methylindenyl)silanetitanium (IV) dimethyl; (t-butylamido)dimethyl($\eta^5$-3-methylindenyl)silanetitanium (IV) dibenzyl; (n-butylamido)dimethyl($\eta^5$-3-methylindenyl)silanetitanium (II) 1,4-diphenyl-1,3-butadiene; (n-butylamido)dimethyl($\eta^5$-3-methylindenyl)silanetitanium (II) 1,3-pentadiene; (n-butylamido)dimethyl($\eta^5$-3-methylindenyl)silanetitanium (III) 2-(N,N-dimethylamino)benzyl; (n-butylamido)dimethyl($\eta^5$-3-methylindenyl)silanetitanium (IV) dimethyl; (n-butylamido)dimethyl($\eta^5$-3-methylindenyl)silanetitanium (IV) dibenzyl; (cyclododecylamido)dimethyl($\eta^5$-3-methylindenyl)silanetitanium (II) 1,4-diphenyl-1,3-butadiene; (cyclododecylamido)dimethyl($\eta^5$-3-methylindenyl)silanetitanium (II) 1,3-pentadiene; (cyclododecylamido)dimethyl($\eta^5$-3-methylindenyl)silanetitanium (III) 2-N,N-dimethylamino)benzyl; (cyclododecylamido)dimethyl($\eta^5$-3-methylindenyl)silanetitanium (IV) dimethyl; (cyclododecylamido)dimethyl($\eta^5$-3-methylindenyl)silanetitanium (IV) dibenzyl; (2,4,6-trimethylanilido)dimethyl($\eta^5$-3-methylindenyl)silanetitanium (II) 1,4-diphenyl-1,3-butadiene; (2,4,6-trimethylanilido)dimethyl($\eta^5$-3-methylindenyl)silanetitanium (II) 1,3-pentadiene; (2,4,6-trimethylanilido)dimethyl($\eta^5$-3-methylindenyl)silanetitanium (III) 2-(N,N-dimethylamino)benzyl; (2,4,6-trimethylanilido)dimethyl($\eta^5$-3-methylindenyl)silanetitanium (IV) dimethyl; (2,4,6-trimethylanilido)dimethyl($\eta^5$-3-methylindenyl)silanetitanium (IV) dibenzyl; (1-adamantylamido)dimethyl($\eta^5$-3-methylindenyl)silanetitanium (II) 1,4-diphenyl-1,3-butadiene; (1-adamantylamido)dimethyl($\eta^5$-3-methylindenyl)silanetitanium (II) 1,3-pentadiene; (1-adamantylamido)dimethyl($\eta^5$-3-methylindenyl)silanetitanium (III) 2-(N,N-dimethylamino)benzyl; (1-adamantylamido)dimethyl($\eta^5$-3-methylindenyl)silanetitanium (IV) dimethyl; (1-adamantylamido)dimethyl($\eta^5$-3-methylindenyl)silanetitanium (IV) dibenzyl; (t-butylamino)dimethyl($\eta^5$-3-methylindenyl)silanetitanium (II) 1,4-diphenyl-1,3-butadiene; (t-butylamido)dimethyl($\eta^5$-3-methylindenyl)silanetitanium (II) 1,3-pentadiene; (t-butylamido)dimethyl($\eta^5$-3-methylindenyl)silanetitanium (III) 2-(N,N-dimethylamino)benzyl; (t-butylamido)dimethyl($\eta^5$-3-methylindenyl)silanetitanium (IV) dimethyl; (t-butylamido)dimethyl($\eta^5$-3-methylindenyl)silanetitanium (IV) dibenzyl; (n-butylamido)diisopropoxy($\eta^5$-3-methylindenyl)silanetitanium (II) 1,4-diphenyl-1,3-butadiene; (n-butylamido)diisopropoxy($\eta^5$-3-methylindenyl)silanetitanium (II) 1,3-pentadiene; (n-butylamido)diisopropoxy($\eta^5$-3-methylindenyl)silanetitanium (III) 2-(N,N-dimethylamino)benzyl; (n-butylamido)diisopropoxy($\eta^5$-3-methylindenyl)silanetitanium (IV) dimethyl; (n-butylamido)diisopropoxy($\eta^5$-3-methylindenyl)silanetitanium (IV) dibenzyl; (cyclododecylamido)diisopropoxy($\eta^5$-3-methylindenyl)-silanetitanium (II) 1,4-diphenyl-1,3-butadiene; (cyclododecylamido)diisopropoxy($\eta^5$-3-methylindenyl)-silanetitanium (II) 1,3-pentadiene; (cyclododecylamido)diisopropoxy($\eta^5$-3-methylindenyl)-silanetitanium (III) 2-(N,N-dimethylamino)benzyl; (cyclododecylamido)diisopropoxy($\eta^5$-3-methylindenyl)-silanetitanium (IV) dimethyl; (cyclododecylamido)diisopropoxy($\eta^5$-3-methylindenyl)-silanetitanium (IV) dibenzyl; (2,4,6-trimethylanilido)diisopropoxy($\eta^5$-3-methyl-indenyl)silanetitanium (II) 1,4-diphenyl-1,3-butadiene; (2,4,6-trimethylanilido)diisopropoxy($\eta^5$-3-methylindenyl)silanetitanium (II) 1,3-pentadiene; (2,4,6-trimethylanilido)diisopropoxy($\eta^5$-3-methylindenyl)silanetitanium (III) 2-(N,N-dimethylamino)benzyl; (2,4,6-trimethylanilido)diisopropoxy($\eta^5$-3-methylindenyl)silanetitanium (IV) dimethyl; (2,4,6-trimethylanilido)diisopropoxy($\eta^5$-3-methylindenyl)silanetitanium (IV) dibenzyl; (1-adamantylamido)diisopropoxy($\eta^5$-3-methylindenyl)silanetitanium (II) 1,4-diphenyl-1,3-butadiene; (1-adamantylamido)diisopropoxy($\eta^5$-3-methylindenyl)silanetitanium (II) 1,3-pentadiene; (1-adamantylamido)diisopropoxy($\eta^5$-3-methylindenyl)silanetitanium (III) 2-(N,N-dimethylamino)benzyl; (1-adamantylamido)diisopropoxy($\eta^5$-3-methylindenyl)silanetitanium (IV) dimethyl; (1-adamantylamido)diisopropoxy($\eta^5$-3-methylindenyl)silanetitanium (IV) dibenzyl; (n-butylamido)dimethoxy($\eta^5$-3-methylindenyl)silanetitanium (II) 1,4-diphenyl-1,3-butadiene; (n-butylamido)dimethoxy($\eta^5$-3-methylindenyl)silanetitanium (II) 1,3-pentadiene; (n-butylamido)dimethoxy($\eta^5$-3-methylindenyl)silanetitanium (III) 2-(N,N-dimethylamino)benzyl; (n-butylamido)dimethoxy($\eta^5$-3-methylindenyl)silanetitanium (IV) dimethyl; (n-butylamido)dimethoxy($\eta^5$-3-methylindenyl)silanetitanium (IV) dibenzyl; (cyclododecylamido)dimethoxy($\eta^5$-3-methylindenyl)silanetitanium (II) 1,4-diphenyl-1,3-butadiene; (cyclododecylamido)dimethoxy($\eta^5$-3-methylindenyl)silanetitanium (II) 1,3-pentadiene; (cyclododecylamido)dimethoxy($\eta^5$-3-methylindenyl)silanetitanium (III) 2-(N,N-dimethylamino)benzyl; (cyclododecylamido)dimethoxy($\eta^5$-3-methylindenyl)silanetitanium (IV) dimethyl; (cyclododecylamido)dimethoxy($\eta^5$-3-methylindenyl)silanetitanium (IV) dibenzyl; (2,4,6-trimethylanilido)dimethoxy($\eta^5$-3-methylindenyl)silanetitanium (II) 1,4-diphenyl-1,3-butadiene; (2,4,6-trimethylanilido)dimethoxy($\eta^5$-3-methylindenyl)silanetitanium (II) 1,3-pentadiene; (2,4,6-trimethylanilido)dimethoxy($\eta^5$-3-methylindenyl)silanetitanium (III) 2-(N,N-dimethylamino)benzyl; (2,4,6-trimethylanilido)dimethoxy($\eta^5$-3-methylindenyl)silanetitanium (IV) dimethyl; (2,4,6-trimethylanilido)dimethoxy($\eta^5$-3-methylindenyl)silanetitanium (IV) dibenzyl; (1-adamantylamido)dimethoxy($\eta^5$-3-methylindenyl)silanetitanium (II) 1,4-diphenyl-1,3-butadiene; (1-adamantylamido)dimethoxy($\eta^5$-3-methylindenyl)silanetitanium (II) 1,3-pentadiene; (1-adamantylamido)dimethoxy($\eta^5$-3-methylindenyl)silanetitanium (III) 2-(N,N-dimethylamino)benzyl; (1-adamantylamido)dimethoxy($\eta^5$-3-methylindenyl)silanetitanium (IV) dimethyl; (1-adamantylamido)dimethoxy($\eta^5$-3-methylindenyl)silanetitanium (IV) dibenzyl; (n-butylamido)ethoxymethyl($\eta^5$-3-methylindenyl)silanetitanium (II) 1,4-diphenyl-1,3-butadiene; (n-butylamido)ethoxymethyl($\eta^5$-3-methylindenyl)silanetitanium (II) 1,3-pentadiene; (n-butylamido)ethoxymethyl($\eta^5$-3-methylindenyl)silanetitanium (III) 2-(N,N-dimethylamino)benzyl; (n-butylamido)ethoxymethyl($\eta^5$-3-methylindenyl)silanetitanium (IV) dimethyl; (n-butylamido)ethoxymethyl($\eta^5$-3-methylindenyl)silanetitanium (IV) dibenzyl; (cyclododecylamido)ethoxymethyl($\eta^5$-3-methylindenyl)silanetitanium (II) 1,4-diphenyl-1,3-butadiene; (cyclododecylamido)ethoxymethyl($\eta^5$-3-methylindenyl)silanetitanium (II) 1,3-pentadiene; (cyclododecylamido)ethoxymethyl($\eta^5$-3-methylindenyl)silanetitanium (III) 2-(N,N-dimethylamino)benzyl; (cyclododecylamido)ethoxymethyl($\eta^5$-3-methylindenyl)silanetitanium (IV) dimethyl; (cyclododecylamido)ethoxymethyl($\eta^5$-3-methylindenyl)silanetitanium (IV) dibenzyl; (2,4,6-trimethylanilido)ethoxymethyl($\eta^5$-3-methylindenyl)silanetitanium (II) 1,4-diphenyl-1,3-butadiene; (2,4,6-trimethylanilido)ethoxymethyl($\eta^5$-3-methylindenyl)silanetitanium (II) 1,3-pentadiene; (2,4,6-trimethylanilido)ethoxymethyl($\eta^5$-3-methylindenyl)silanetitanium (III) 2-(N,N-dimethylamino)benzyl; (2,4,6-trimethylanilido)ethoxymethyl($\eta^5$-3-methylindenyl)silanetitanium (IV) dimethyl; (2,4,6-trimethylanilido)ethoxymethyl($\eta^5$-3-methylindenyl)silanetitanium (IV) dibenzyl; (1-adamantylamido)ethoxymethyl($\eta^5$-3-methylindenyl)silanetitanium (II) 1,4-diphenyl-1,3-butadiene; (1-adamantylamido)ethoxymethyl($\eta^5$-3-methylindenyl)silanetitanium (II) 1,3-pentadiene; (1-adamantylamido)ethoxymethyl($\eta^5$-3-methylindenyl)silanetitanium (III) 2-(N,N-dimethylamino)benzyl; (1-adamantylamido)ethoxymethyl($\eta^5$-3-methylindenyl)silanetitanium (IV) dimethyl; (1-adamantylamido)ethoxymethyl($\eta^5$-3-methylindenyl)silanetitanium (IV) dibenzyl;

2-methyl-3-ethylindenyl Complexes:

(t-butylamido)dimethyl($\eta^5$-2-methyl-3-ethylindenyl)silanetitanium (II) 1,4-diphenyl-1,3-butadiene; (t-butylamido)dimethyl($\eta^5$-2-methyl-3-ethylindenyl)silanetitanium (II) 1,3-pentadiene; (t-butylamido)dimethyl($\eta^5$-2-methyl-3-ethylindenyl)silanetitanium (III) 2-(N,N-dimethylamino)benzyl; (t-butylamido)dimethyl($\eta^5$-2-methyl-3-ethylindenyl)silanetitanium (IV) dimethyl; (t-butylamido)dimethyl($\eta^5$-2-methyl-3-ethylindenyl)silanetitanium (IV) dibenzyl; (n-butylamido)dimethyl($\eta^5$-2-methyl-3-ethylindenyl)silanetitanium (II) 1,4-diphenyl-1,3-butadiene; (n-butylamido)dimethyl($\eta^5$-2-methyl-3-ethylindenyl)silanetitanium (II) 1,3-pentadiene; (n-butylamido)dimethyl($\eta^5$-2-methyl-3-ethylindenyl)silanetitanium (III) 2-(N,N-dimethylamino)benzyl; (n-butylamido)dimethyl($\eta^5$-2-methyl-3-ethylindenyl)silanetitanium (IV) dimethyl; (n-butylamido)dimethyl($\eta^5$-2-methyl-3-ethylindenyl)silanetitanium (IV) dibenzyl; (cyclododecylamido)dimethyl($\eta^5$-2-methyl-3-ethylindenyl)silanetitanium (II) 1,4-diphenyl-1,3-butadiene; (cyclododecylamido)dimethyl($\eta^5$-2-methyl-3-ethylindenyl)silanetitanium (II) 1,3-pentadiene; (cyclododecylamido)dimethyl($\eta^5$-2-methyl-3-ethylindenyl)silanetitanium (III) 2-(N,N-dimethyl amino)benzyl; (cyclododecylamido)dimethyl(-2-methyl-3-ethylindenyl)silanetitanium (IV) dimethyl; (cyclododecylamido)dimethyl($\eta^5$-2-methyl-3-ethylindenyl)silanetitanium (IV) dibenzyl; (2,4,6-trimethylanilido)dimethyl($\eta^5$-2-methyl-3-ethyl-indenyl)silanetitanium (II) 1,4-diphenyl-1,3-butadiene; (2,4,6-trimethylanilido)dimethyl($\eta^5$-2-methyl-3-ethylindenyl)silanetitanium (II) 1,3-pentadiene; (2,4,6-trimethylanilido)dimethyl($\eta^5$-2-methyl-3-ethylindenyl)silanetitanium (III) 2-(N,N-dimethylamino)benzyl; (2,4,6-trimethylanilido)dimethyl($\eta^5$-2-methyl-3-ethylindenyl)silanetitanium (IV) dimethyl; (2,4,6-trimethylanilido)dimethyl($\eta^5$-2-methyl-3-ethylindenyl)silanetitanium (IV) dibenzyl; (1-adamantylamido)dimethyl($\eta^5$-2-methyl-3-ethylindenyl)silanetitanium (II) 1,4-diphenyl-1,3-butadiene; (1-adamantylamido)dimethyl($\eta^5$-2-methyl-3-ethylindenyl)silanetitanium (II) 1,3-pentadiene; (1-adamantylamido)dimethyl($\eta^5$-2-methyl-3-ethylindenyl)silanetitanium (III) 2-(N,N-dimethylamino)benzyl; (1-adamantylamido)dimethyl($\eta^5$-2-methyl-3-ethylindenyl)silanetitanium (IV) dimethyl; (1-adamantylamido)dimethyl($\eta^5$-2-methyl-3-ethylindenyl)silanetitanium (IV) dibenzyl; (t-butylamido)dimethyl($\eta^5$-2-methyl-3-ethylindenyl)-silanetitanium (II) 1,4-diphenyl-1,3-butadiene; (t-butylamido)dimethyl($\eta^5$-2-methyl-3-ethylindenyl)silanetitanium (II) 1,3-pentadiene; (t-butylamido)dimethyl($\eta^5$-2-methyl-3-ethylindenyl)-silanetitanium (III) 2-(N,N-dimethylamino)benzyl; (t-butylamido)dimethyl($\eta^5$-2-methyl-3-ethylindenyl)silanetitanium (IV) dimethyl; (t-butylamido)dimethyl($\eta^5$-2-methyl-3-ethylindenyl)silanetitanium (IV) dibenzyl; (n-butylamido)diisopropoxy($\eta^5$-2-methyl-3-ethyl-indenyl)silanetitanium (II) 1,4-diphenyl-1,3-butadiene; (n-butylamido)diisopropoxy($\eta^5$-2-methyl-3-ethylindenyl)silanetitanium (II) 1,3-pentadiene; (n-butylamido)diisopropoxy($\eta^5$-2-methyl-3-ethylindenyl)silanetitanium (III) 2-(N,N-dimethylamino)benzyl; (n-butylamido)diisopropoxy($\eta^5$-2-methyl-3-ethylindenyl)silanetitanium (IV) dimethyl; (n-butylamido)diisopropoxy($\eta^5$-2-methyl-3-ethylindenyl)silanetitanium (IV) dibenzyl; (cyclododecylamido)diisopropoxy(-2-methyl-3-ethyl-indenyl)silanetitanium (II) 1,4-diphenyl-1,3-butadiene; (cyclododecylamido)diisopropoxy($\eta^5$-2-methyl-3-ethylindenyl)-silanetitanium (II) 1,3-pentadiene; (cyclododecylamido)diisopropoxy($\eta^5$-2-methyl-3-ethylindenyl)-silanetitanium (III) 2-(N,N-dimethylamino)benzyl; (cyclododecylamido)diisopropoxy($\eta^5$-2-methyl-3-ethylindenyl)-silanetitanium (IV) dimethyl; (cyclododecylamido)diisopropoxy($\eta^5$-2-methyl-3-ethylindenyl)-silanetitanium (IV) dibenzyl; (2,4,6-trimethylanilido)diisopropoxy($\eta^5$-2-methyl-3-ethylindenyl)silanetitanium (II) 1,4-diphenyl-1,3-butadiene; (2,4,6-trimethylanilido)diisopropoxy($\eta^5$-2-methyl-3-ethylindenyl)silanetitanium (II) 1,3-pentadiene; (2,4,6-trimethylanilido)diisopropoxy($\eta^5$-2-methyl-3-ethylindenyl)silanetitanium (III) 2-(N,N-dimethylamino)benzyl; (2,4,6-trimethylanilido)diisopropoxy($\eta^5$-2-methyl-3-ethylindenyl)silanetitanium (IV) dimethyl; (2,4,6-trimethylanilido)diisopropoxy($\eta^5$-2-methyl-3-ethylindenyl)silanetitanium (IV) dibenzyl; (1-adamantylamido)diisopropoxy($\eta^5$-2-methyl-3-ethyl-indenyl)silanetitanium (II) 1,4-diphenyl-1,3-butadiene; (1-adamantylamido)diisopropoxy($\eta^5$-2-methyl-3-ethylindenyl)silanetitanium (II) 1,3-pentadiene; (1-adamantylamido)diisopropoxy($\eta^5$-2-methyl-3-ethylindenyl)silanetitanium (III) 2-(N,N-dimethylamino)benzyl; (1-adamantylamido)diisopropoxy($\eta^5$-2-methyl-3-ethylindenyl)silanetitanium (IV) dimethyl; (1-adamantylamido)diisopropoxy($\eta^5$-2-methyl-3-ethylindenyl)silanetitanium (IV) dibenzyl; (n-butylamido)dimethoxy($\eta^5$-2-methyl-3-ethylindenyl)silanetitanium (II) 1,4-diphenyl-1,3-butadiene; (n-butylamido)dimethoxy($\eta^5$-2-methyl-3-ethylindenyl)silanetitanium (II) 1,3-pentadiene; (n-butylamido)dimethoxy($\eta^5$-2-methyl-3-ethylindenyl)silanetitanium (III) 2-(N,N-dimethylamino)benzyl; (n-butylamido)dimethoxy($\eta^5$-2-methyl-3-ethylindenyl)silanetitanium (IV) dimethyl; (n-butylamido)dimethoxy($\eta^5$-2-methyl-3-ethylindenyl)silanetitanium (IV) dibenzyl; (cyclododecylamido)dimethoxy($\eta^5$-2-methyl-3-ethyl-indenyl)silanetitanium (II) 1,4-diphenyl-1,3-butadiene; (cyclododecylamido)dimethoxy($\eta^5$-2-methyl-3-ethylindenyl) silanetitanium (II) 1,3-pentadiene; (cyclododecylamido) dimethoxy($\eta^5$-2-methyl-3-ethylindenyl)silanetitanium (III) 2-(N,N-dimethylamino)benzyl; (cyclododecylamido) dimethoxy($\eta^5$-2-methyl-3-ethylindenyl)silanetitanium (IV) dimethyl; (cyclododecylamido)dimethoxy($\eta^5$-2-methyl-3-ethylindenyl)silanetitanium (IV) dibenzyl; (2,4,6-trimethylanilido)dimethoxy($\eta^5$-2-methyl-3-ethylindenyl)silanetitanium (II) 1,4-diphenyl-1,3-butadiene; (2,4,6-trimethylanilido)dimethoxy($\eta^5$-2-methyl-3-ethylindenyl) silanetitanium (II) 1,3-pentadiene; (2,4,6-trimethylanilido) dimethoxy($\eta^5$-2-methyl-3-ethylindenyl)silanetitanium (III) 2-(N,N-dimethylamino)benzyl; (2,4,6-trimethylanilido) dimethoxy($\eta^5$-2-methyl-3-ethylindenyl)silanetitanium (IV) dimethyl; (2,4,6-trimethylanilido)dimethoxy($\eta^5$-2-methyl-3-ethylindenyl)silanetitanium (IV) dibenzyl; (1-adamantylamido)dimethoxy($\eta^5$-2-methyl-3-ethylindenyl)silanetitanium (II) 1,4-diphenyl-1,3-butadiene; (1-adamantylamido) dimethoxy($\eta^5$-2-methyl-3-ethylindenyl)silanetitanium (II) 1,3-pentadiene; (1-adamantylamido)dimethoxy($\eta^5$-2-methyl-3-ethylindenyl)silanetitanium (III) 2-(N,N-dimethylamino)benzyl; (1-adamantylamido)dimethoxy($\eta^5$-2-methyl-3-ethylindenyl)silanetitanium (IV) dimethyl; (1-adamantylamido)dimethoxy($\eta^5$-2-methyl-3-ethylindenyl)silanetitanium (IV) dibenzyl; (n-butylamido)ethoxymethyl($\eta^5$-2-methyl-3-ethyl-indenyl)silanetitanium (II) 1,4-diphenyl-1,3-butadiene; (n-butylamido)ethoxymethyl($\eta^5$-2-methyl-3-ethylindenyl)silanetitanium (II) 1,3-pentadiene; (n-butylamido)ethoxymethyl($\eta^5$-2-methyl-3-ethylindenyl) silanetitanium (III) 2-(N,N-dimethylamino)benzyl; (n-butylamido)ethoxymethyl($\eta^5$-2-methyl-3-ethylindenyl)silanetitanium (IV) dimethyl; (n-butylamido)ethoxymethyl($\eta^5$-2-methyl-3-ethylindenyl)silanetitanium (IV) dibenzyl; (cyclododecylamido)ethoxymethyl($\eta^5$-2-methyl-3-ethyl-indenyl)silane-titanium (II) 1,4-diphenyl-1,3-butadiene; (cyclododecylamido)ethoxymethyl($\eta^5$-2-methyl-3-ethylindenyl)silane-titanium (II) 1,3-pentadiene; (cyclododecylamido)ethoxymethyl($\eta^5$-2-methyl-3-ethylindenyl)silane-titanium (III) 2-(N,N-dimethylamino)benzyl; (cyclododecylamido)ethoxymethyl($\eta^5$-2-methyl-3-ethylindenyl)silanetitanium (IV) dimethyl; (cyclododecylamido) ethoxymethyl($\eta^5$-2-methyl-3-ethylindenyl)silanetitanium (IV) dibenzyl; (2,4,6-trimethylanilido)ethoxymethyl($\eta^5$-2-methyl-3-ethylindenyl)silanetitanium (II) 1,4-diphenyl-1,3-butadiene; (2,4,6-trimethylanilido)ethoxymethyl($\eta^5$-2-methyl-3-ethylindenyl)silanetitanium (II) 1,3-pentadiene; (2,4,6-trimethylanilido)ethoxymethyl($\eta^5$-2-methyl-3-ethylindenyl)silanetitanium (III) 2-(N,N-dimethylamino)benzyl; (2,4,6-trimethylanilido)ethoxymethyl($\eta^5$-2-methyl-3-ethylindenyl)silanetitanium (IV) dimethyl; (2,4,6-trimethylanilido)ethoxymethyl($\eta^5$-2-methyl-3-ethylindenyl)silanetitanium (IV) dibenzyl; (1-adamantylamido)ethoxymethyl($\eta^5$-2-methyl-3-ethylindenyl)silanetitanium (II) 1,4-diphenyl-1,3-butadiene; (1-adamantylamido)ethoxymethyl($\eta^5$-2-methyl-3-ethylindenyl)silanetitanium (II) 1,3-pentadiene; (1-adamantylamido)ethoxymethyl($\eta^5$-2-methyl-3-ethylindenyl)silanetitanium (III) 2-(N,N-dimethylamino)benzyl; (1-adamantylamido)ethoxymethyl($\eta^5$-2-methyl-3-ethylindenyl)silanetitanium (IV) dimethyl; (1-adamantylamido) ethoxymethyl($\eta^5$-2-methyl-3-ethylindenyl)silanetitanium (IV) dibenzyl;

2,3,4,6-tetramethylindenyl Complexes:

(t-butylamido)dimethyl($\eta^5$-2,3,4,6-tetramethylindenyl) silanetitanium (II) 1,4-diphenyl-1,3-butadiene; (t-butylamido)dimethyl($\eta^5$-2,3,4,6-tetramethylindenyl)silanetitanium (II) 1,3-pentadiene; (t-butylamido)dimethyl($\eta^5$-2,3,4,6-tetramethylindenyl)silanetitanium (III) 2-(N,N-dimethylamino)benzyl; (t-butylamido)dimethyl($\eta^5$-2,3,4,6-tetramethylindenyl)silanetitanium (IV) dimethyl; t-butylamido)dimethyl($\eta^5$-2,3,4,6-tetramethylindenyl)silanetitanium (IV) dibenzyl; (n-butylamido)dimethyl($\eta^5$-2,3,4,6-tetramethylindenyl)silanetitanium (II) 1,4-diphenyl-1,3-butadiene; (n-butylamido)dimethyl($\eta^5$-2,3,4,6-tetramethylindenyl)silanetitanium (II) 1,3-pentadiene;; (n-butylamido)dimethyl($\eta^5$-2,3,4,6-tetramethylindenyl)-silanetitanium (III) 2-(N,N-dimethylamino)benzyl; (n-butylamido)dimethyl($\eta^5$-2,3,4,6-tetramethylindenyl)silanetitanium (IV) dimethyl; (n-butylamido)dimethyl($\eta^5$-2,3,4,6-tetramethylindenyl)silanetitanium (IV) dibenzyl; (cyclododecylamido)dimethyl($\eta^5$-2,3,4,6-tetramethylindenyl)silanetitanium (II) 1,4-diphenyl-1,3-butadiene; (cyclododecylamido)dimethyl($\eta^5$-2,3,4,6-tetramethylindenyl) silanetitanium (II) 1,3-pentadiene; (cyclododecylamido) dimethyl($\eta^5$-2,3,4,6-tetramethylindenyl)silanetitanium (III) 2-(N,N-dimethylamino)benzyl; (cyclododecylamido)dimethyl($\eta^5$-2,3,4,6-tetramethylindenyl)silanetitanium (IV) dimethyl; (cyclododecylamido)dimethyl($\eta^5$-2,3,4,6-tetramethylindenyl)silanetitanium (IV) dibenzyl; (2,4,6-trimethylanilido)dimethyl($\eta^5$-2,3,4,6-tetramethylindenyl)silanetitanium (II) 1,4-diphenyl-1,3-butadiene; (2,4,6-trimethylanilido)dimethyl($\eta^5$-2,3,4,6-tetramethylindenyl) silanetitanium (II) 1,3-pentadiene; (2,4,6-trimethylanilido) dimethyl($\eta^5$-2,3,4,6-tetramethylindenyl)silanetitanium (III) 2-(N,N-dimethylamino)benzyl; (2,4,6-trimethylanilido) dimethyl($\eta^5$-2,3,4,6-tetramethylindenyl)silanetitanium (IV) dimethyl; (2,4,6-trimethylanilido)dimethyl($\eta^5$-2,3,4,6-tetramethylindenyl)silanetitanium (IV) dibenzyl; (1-adamantylamido)dimethyl($\eta^5$-2,3,4,6-tetramethylindenyl)silanetitanium (II) 1,4-diphenyl-1,3-butadiene; (1-adamantylamido)dimethyl($\eta^5$-2,3,4,6-tetramethylindenyl)silanetitanium (II) 1,3-pentadiene; (1-adamantylamido) dimethyl($\eta^5$-2,3,4,6-tetramethylindenyl)silanetitanium (III) 2-(N,N-dimethylamino)benzyl; (1-adamantylamido)dimethyl($\eta^5$-2,3,4,6-tetramethylindenyl)silanetitanium (IV) dimethyl; (1-adamantylamido)dimethyl($\eta^5$-2,3,4,6-tetramethylindenyl)silanetitanium (IV) dibenzyl; (t-butylamido) dimethyl($\eta^5$-2,3,4,6-tetramethylindenyl)-silanetitanium (II) 1,4-diphenyl-1,3-butadiene; (t-butylamido)dimethyl($\eta^5$-2,3,4,6-tetramethylindenyl)silanetitanium (II) 1,3-pentadiene; (t-butylamido)dimethyl($\eta^5$-2,3,4,6-tetramethylindenyl)-silanetitanium (III) 2-(N,N-dimethylamino)benzyl; (t-butylamido)dimethyl($\eta^5$-2,3,4,6-tetramethylindenyl)silanetitanium (IV) dimethyl; (t-butylamido)dimethyl($\eta^5$-2,3,4,6-tetramethylindenyl)silanetitanium (IV) dibenzyl;

(n-butylamido)diisopropoxy($\eta^5$-2,3,4,6-tetramethylindenyl)silane-titanium (II) 1,4-diphenyl-1,3-butadiene; (n-butylamido)diisopropoxy($\eta^5$-2,3,4,6-tetramethylindenyl)silane-titanium (II) 1,3-pentadiene; (n-butylamido)diisopropoxy($\eta^5$-2,3,4,6-tetramethylindenyl)-silanetitanium (III) 2-(N,N-dimethylamino)benzyl; (n-butylamido)diisopropoxy($\eta^5$-2,3,4,6-tetramethylindenyl)silane-titanium (IV) dimethyl; (n-butylamido)diisopropoxy($\eta^5$-2,3,4,6-tetramethylindenyl)silane-titanium (IV) dibenzyl; (cyclododecylamido)diisopropoxy($\eta^5$-2,3,4,6-tetramethylindenyl)-silanetitanium (II) 1,4-diphenyl-1,3-butadiene; (cyclododecylamido)diisopropoxy($\eta^5$-2,3,4,6-tetramethylindenyl)silanetitanium (II) 1,3-pentadiene; (cyclododecylamido)diisopropoxy(-2,3,4,6-tetramethylindenyl)silanetitanium (III) 2-(N,N-dimethylamino)benzyl; cyclododecylamido)diisopropoxy ($\eta^5$-2,3,4,6-tetramethylindenyl)silanetitanium (IV) dimethyl; (cyclododecylamido)diisopropoxy($\eta^5$-2,3,4,6-tetramethylindenyl)silanetitanium (IV) dibenzyl; (2,4,6-trimethylanilido)diisopropoxy($\eta^5$-2,3,4,6-tetramethylindenyl)silanetitanium (II) 1,4-diphenyl-1,3-butadiene; (2,4,6-trimethylanilido)diisopropoxy($\eta^5$-2,3,4,6-tetramethylindenyl)silanetitanium (II) 1,3-pentadiene; (2,4,6-trimethylanilido)diisopropoxy($\eta^5$-2,3,4,6-tetramethylindenyl)silanetitanium (III) 2-(N,N-dimethylamino)benzyl; (2,4,6-trimethylanilido)diisopropoxy($\eta^5$-2,3,4,6-tetramethyl indenyl)silanetitanium (IV) dimethyl; (2,4,6-trimethylanilido)diisopropoxy($\eta^5$-2,3,4,6-tetramethylindenyl)silanetitanium (IV) dibenzyl; (1-adamantylamido)diisopropoxy($\eta^5$-2,3,4,6-tetramethylindenyl)silanetitanium (II) 1,4-diphenyl-1,3-butadiene; (1-adamantylamido)diisopropoxy($\eta^5$-2,3,4,6-tetramethylindenyl)silanetitanium (II) 1,3-pentadiene; (1-adamantylamido)diisopropoxy($\eta^5$-2,3,4,6-tetramethylindenyl)silanetitanium (III) 2-(N,N-dimethylamino)benzyl; (1-adamantylamido)diisopropoxy($\eta^5$-2,3,4,6-tetramethylindenyl)silanetitanium (IV) dimethyl; (1-adamantylamido)diisopropoxy($\eta^5$-2,3,4,6-tetramethylindenyl)silanetitanium (IV) dibenzyl; (n-butylamido)dimethoxy($\eta^5$-2,3,4,6-tetramethylindenyl)silanetitanium (II) 1,4-diphenyl-1,3-butadiene; (n-butylamido)dimethoxy($\eta^5$-2,3,4,6-tetramethylindenyl)silanetitanium (II) 1,3-pentadiene; (n-butylamido)dimethoxy($\eta^5$-2,3,4,6-tetramethylindenyl)silanetitanium (III) 2-(N,N-dimethylamino)benzyl; (n-butylamido)dimethoxy($\eta^5$-2,3,4,6-tetramethylindenyl)silanetitanium (IV) dimethyl; (n-butylamido)dimethoxy($\eta^5$-2,3,4,6-tetramethylindenyl)silanetitanium (IV) dibenzyl; (cyclododecylamido)dimethoxy ($\eta^5$-2,3,4,6-tetramethylindenyl)silanetitanium (II) 1,4-diphenyl-1,3-butadiene; (cyclododecylamido)dimethoxy ($\eta^5$-2,3,4,6-tetramethylindenyl)silanetitanium (II) 1,3-pentadiene; (cyclododecylamido)dimethoxy($\eta^5$-2,3,4,6-tetramethylindenyl)silanetitanium (III) 2-(N,N-dimethylamino)benzyl; (cyclododecylamido)dimethoxy($\eta^5$-2,3,4,6-tetramethylindenyl)silanetitanium (IV) dimethyl; (cyclododecylamido)dimethoxy($\eta^5$-2,3,4,6-tetramethylindenyl)silanetitanium (IV) dibenzyl; (2,4,6-trimethylanilido)dimethoxy($\eta^5$-2,3,4,6-tetramethylindenyl)silanetitanium (II) 1,4-diphenyl-1,3-butadiene; (2,4,6-trimethylanilido)dimethoxy($\eta^5$-2,3,4,6-tetramethylindenyl)silanetitanium (II) 1,3-pentadiene; (2,4,6-trimethylanilido)dimethoxy($\eta^5$-2,3,4,6-tetramethylindenyl)silanetitanium (III) 2-(N,N-dimethylamino)benzyl; (2,4,6-trimethylanilido)dimethoxy($\eta^5$-2,3,4,6-tetramethylindenyl)silanetitanium (IV) dimethyl; (2,4,6-trimethylanilido)dimethoxy($\eta^5$-2,3,4,6-tetramethylindenyl)silanetitanium (IV) dibenzyl; (1-adamantylamido)dimethoxy($\eta^5$-2,3,4,6-tetramethylindenyl)silanetitanium (II) 1,4-diphenyl-1,3-butadiene; (1-adamantylamido)dimethoxy($\eta^5$-2,3,4,6-tetramethylindenyl)silanetitanium (II) 1,3-pentadiene; (1-adamantylamido)dimethoxy($\eta^5$-2,3,4,6-tetramethylindenyl)silanetitanium (III) 2-(N,N-dimethylamino)benzyl; (1-adamantylamido)dimethoxy($\eta^5$-2,3,4,6-tetramethylindenyl)silanetitanium (IV) dimethyl; (1-adamantylamido)dimethoxy($\eta^5$-2,3,4,6-tetramethylindenyl)silanetitanium (IV) dibenzyl; (n-butylamido)ethoxymethyl($\eta^5$-2,3,4,6-tetramethylindenyl)silanetitanium (II) 1,4-diphenyl-1,3-butadiene; (n-butylamido)ethoxymethyl($\eta^5$-2,3,4,6-tetramethylindenyl)silanetitanium (II) 1,3-pentadiene; (n-butylamido)ethoxymethyl($\eta^5$-2,3,4,6-tetramethylindenyl)silanetitanium (III) 2-(N,N-dimethylamino)benzyl; (n-butylamido)ethoxymethyl($\eta^5$-2,3,4,6-tetramethylindenyl)silanetitanium (IV) dimethyl; (n-butylamido)ethoxymethyl($\eta^5$-2,3,4,6-tetramethylindenyl)silanetitanium (IV) dibenzyl; (cyclododecylamido)ethoxymethyl($\eta^5$-2,3,4,6-tetramethylindenyl)silanetitanium (II) 1,4-diphenyl-1,3-butadiene; (cyclododecylamido)ethoxymethyl($\eta^5$-2,3,4,6-tetramethylindenyl)silanetitanium (II) 1,3-pentadiene; (cyclododecylamido)ethoxymethyl($\eta^5$-2,3,4,6-tetramethylindenyl)silanetitanium (III) 2-(N,N-dimethylamino)benzyl; (cyclododecylamido)ethoxymethyl($\eta^5$-2,3,4,6-tetramethylindenyl)silanetitanium (IV) dimethyl; (cyclododecylamido)ethoxymethyl($\eta^5$-2,3,4,6-tetramethylindenyl)silanetitanium (IV) dibenzyl; (2,4,6-trimethylanilido)ethoxymethyl($\eta^5$-2,3,4,6-tetramethylindenyl)silanetitanium (II) 1,4-diphenyl-1,3-butadiene; (2,4,6-trimethylanilido)ethoxymethyl($\eta^5$-2,3,4,6-tetramethylindenyl)silanetitanium (II) 1,3-pentadiene; (2,4,6-trimethylanilido)ethoxymethyl($\eta^5$-2,3,4,6-tetramethylindenyl)silanetitanium (III) 2-(N,N-dimethylamino)benzyl; (2,4,6-trimethylanilido)ethoxymethyl($\eta^5$-2,3,4,6-tetramethylindenyl)silanetitanium (IV) dimethyl; (2,4,6-trimethylanilido)ethoxymethyl($\eta^5$-2,3,4,6-tetramethylindenyl)silanetitanium (IV) dibenzyl; (1-adamantylamido)ethoxymethyl($\eta^5$-2,3,4,6-tetramethylindenyl)silanetitanium (II) 1,4-diphenyl-1,3-butadiene; (1-adamantylamido)ethoxymethyl($\eta^5$-2,3,4,6-tetramethylindenyl)silanetitanium (II) 1,3-pentadiene; (1-adamantylamido)ethoxymethyl($\eta^5$-2,3,4,6-tetramethylindenyl)silanetitanium (III) 2-(N,N-dimethylamino(benzyl; (1-adamantylamido)ethoxymethyl($\eta^5$-2,3,4,6-tetramethylindenyl)silanetitanium (IV) dimethyl; and (1-adamantylamido)ethoxymethyl($\eta^5$-2,3,4,6-tetramethylindenyl)silanetitanium (IV) dibenzyl.

2,3,4,6,7-pentamethylindenyl Complexes:

(t-butylamido)dimethyl($\eta^5$-2,3,4,6,7-pentamethylindenyl)silanetitanium (II) 1,4-diphenyl-1,3-butadiene; (t-butylamido)dimethyl($\eta^5$-2,3,4,6,7-pentamethylindenyl)silanetitanium (II) 1,3-pentadiene; (t-butylamido)dimethyl($\eta^5$-2,3,4,6,7-pentamethylindenyl)silanetitanium (III) 2-(N,N-dimethylamino)benzyl; (t-butylamido)dimethyl($\eta^5$-2,3,4,6,7-pentamethylindenyl)silanetitanium (IV) dimethyl; (t-butylamido)dimethyl($\eta^5$-2,3,4,6,7-pentamethylindenyl)silanetitanium (IV) dibenzyl; (n-butylamido)dimethyl($\eta^5$-2,3,4,6,7-pentamethyl-indenyl)silanetitanium (II) 1,4-diphenyl-1,3-butadiene; (n-butylamido)dimethyl($\eta^5$-2,3,4,6,7-pentamethylindenyl)silanetitanium (II) 1,3-pentadiene; (n-butylamido)dimethyl($\eta^5$-2,3,4,6,7-pentamethylindenyl)-silanetitanium (III) 2-(N,N-dimethylamino)benzyl; (n-butylamido)dimethyl($\eta^5$-2,3,4,6,7-pentamethylindenyl)silanetitanium (IV) dimethyl; (n-butylamido)dimethyl($\eta^5$-2,3,4,6,7-pentamethylindenyl)silanetitanium (IV) dibenzyl; (cyclododecylamido)dimethyl($\eta^5$-2,3,4,6,7-pentamethylindenyl)silanetitanium (II) 1,4-diphenyl-1,3-butadiene; (cyclododecylamido)dimethyl($\eta^5$-2,3,4,6,7-pentamethylindenyl)silanetitanium (II) 1,3-pentadiene; (cyclododecylamido)dimethyl($\eta^5$-2,3,4,6,7-pentamethylindenyl)silanetitanium (III) 2-(N,N-dimethylamino)benzyl; (cyclododecylamido)dimethyl($\eta^5$-2,3,4,6,7-pentamethylindenyl)silanetitanium (IV) dimethyl; (cyclododecylamido)dimethyl($\eta^5$-2,3,4,6,7-pentamethylindenyl)silanetitanium (IV) dibenzyl; (2,4,6-trimethylanilido)dimethyl($\eta^5$-2,3,4,6,7-pentamethyl-indenyl)silanetitanium (II) 1,4-diphenyl-1,3-butadiene; (2,4,6-trimethylanilido)dimethyl($\eta^5$-2,3,4,6,7-pentamethylindenyl)silanetitanium (II) 1,3-pentadiene; (2,4,6-trimethylanilido)dimethyl($\eta^5$-2,3,4,6,7-pentamethyl-indenyl)silanetitanium (II) 2-(N,N-dimethylamino)benzyl; (2,4,6-trimethylanilido)dimethyl($\eta^5$-2,3,4,6,7-pentamethyl-indenyl)silanetitanium (IV) dimethyl; (2,4,6-trimethylanilido)dimethyl($\eta^5$-2,3,4,6,7-pentamethylindenyl)silanetitanium (IV) dibenzyl; (1-adamantylamido)dimethyl($\eta^5$-2,3,4,6,7-pentamethylindenyl)silanetitanium (II)1,4-diphenyl-1,3-butadiene; (1-adamantylamido)dimethyl($\eta^5$-2,3,4,6,7-pentamethylindenyl)silanetitanium (II) 1,3-pentadiene; (1-adamantylamido)dimethyl($\eta^5$-2,3,4,6,7-pentamethylindenyl)silanetitanium (III) 2-(N,N-dimethylamino)benzyl; (1-adamantylamido)dimethyl($\eta^5$-2,3,4,6,7-pentamethylindenyl)silanetitanium (IV) dimethyl; (1-adamantylamido)dimethyl($\eta^5$-2,3,4,6,7-pentamethylindenyl)silanetitanium (IV) dibenzyl; (t-butylamido)dimethyl($\eta^5$-2,3,4,6,7-pentamethylindenyl)-silanetitanium (II) 1,4-diphenyl-1,3-butadiene; (t-butylamido)dimethyl($\eta^5$-2,3,4,6,7-pentamethylindenyl)silanetitanium (II) 1,3-pentadiene; (t-butylamido)dimethyl($\eta^5$-2,3,4,6,7-pentamethylindenyl)-silanetitanium (III) 2-(N,N-dimethylamino)benzyl; (t-butylamido)dimethyl($\eta^5$-2,3,4,6,7-pentamethylindenyl)silanetitanium (IV) dimethyl; (t-butylamido)dimethyl($\eta^5$-2,3,4,6,7-pentamethylindenyl)silanetitanium (IV) dibenzyl; (n-butylamido)diisopropoxy($\eta^5$-2,3,4,6,7-pentamethyl-indenyl)silanetitanium (II) 1,4-diphenyl-1,3-butadiene; (n-butylamido)diisopropoxy($\eta^5$-2,3,4,6,7-pentamethylindenyl)silanetitanium (II) 1,3-pentadiene; (n-butylamido)diisopropoxy($\eta^5$-2,3,4,6,7-pentamethylindenyl)-silanetitanium (III) 2-(N,N-dimethylamino)benzyl; (n-butylamido)diisopropoxy($\eta^5$-2,3,4,6,7-pentamethylindenyl)silane-titanium (IV) dimethyl; (n-butylamido)diisopropoxy($\eta^5$-2,3,4,6,7-pentamethylindenyl)silane-titanium (IV) dibenzyl; (cyclododecylamido)diisopropoxy($\eta^5$-2,3,4,6,7-pentamethyl-indenyl)-silanetitanium (II) 1,4-diphenyl-1,3-butadiene; (cyclododecylamido)diisopropoxy($\eta^5$-2,3,4,6,7-pentamethylindenyl)silanetitanium (II) 1,3-pentadiene; (cyclododecylamido)diisopropoxy(-2,3,4,6,7-pentamethylindenyl)silanetitanium (III) 2-(N,N-dimethylamino)benzyl; (cyclododecylamido)diisopropoxy($\eta^5$-2,3,4,6,7-pentamethylindenyl)silanetitanium (IV) dimethyl; (cyclododecylamido)diisopropoxy($\eta^5$-2,3,4,6,7-pentamethylindenyl)silanetitanium (IV) dibenzyl; (2,4,6-trimethylanilido)diisopropoxy($\eta^5$-2,3,4,6,7-pentamethylindenyl)silanetitanium (II) 1,4-diphenyl-1,3-butadiene; (2,4,6-trimethylanilido)diisopropoxy($\eta^5$-2,3,4,6,7-pentamethylindenyl)silanetitanium (II) 1,3-pentadiene; (2,4,6-trimethylanilido)diisopropoxy($\eta^5$-2,3,4,6,7-pentamethylindenyl)silanetitanium (III) 2-N,N-dimethylamino)benzyl; (2,4,6-trimethylanilido)diisopropoxy($\eta^5$-2,3,4,6,7-pentamethylindenyl)silanetitanium (IV) dimethyl; (2,4,6-trimethylanilido)diisopropoxy($\eta^5$-2,3,4,6,7-pentamethylindenyl)silanetitanium (IV) dibenzyl; (1-adamantylamido)diisopropoxy($\eta^5$-2,3,4,6,7-pentamethyl-indenyl)silanetitanium (II) 1,4-diphenyl-1,3-butadiene; (1-adamantylamido)diisopropoxy($\eta^5$-2,3,4,6,7-pentamethylindenyl)silanetitanium (II) 1,3-pentadiene; (1-adamantylamido)diisopropoxy($\eta^5$-2,3,4,6,7-pentamethylindenyl)silanetitanium (III) 2-(N,N-dimethylamino)benzyl; (1-adamantylamido)diisopropoxy($\eta^5$-2,3,4,6,7-pentamethylindenyl)silanetitanium (IV) dimethyl; (1-adamantylamido)diisopropoxy($\eta^5$-2,3,4,6,7-pentamethylindenyl)silanetitanium (IV) dibenzyl; (n-butylamido)dimethoxy($\eta^5$-2,3,4,6,7-pentamethylindenyl)silanetitanium (II) 1,4-diphenyl-1,3-butadiene; (n-butylamido)dimethoxy($\eta^5$-2,3,4,6,7-pentamethylindenyl)silanetitanium (II) 1,3-pentadiene; (n-butylamido)dimethoxy($\eta^5$-2,3,4,6,7-pentamethylindenyl)silanetitanium (III) 2-(N,N-dimethylamino)benzyl; (n-butylamido)dimethoxy($\eta^5$-2,3,4,6,7-pentamethylindenyl)silanetitanium (IV) dimethyl; (n-butylamido)dimethoxy($\eta^5$-2,3,4,6,7-pentamethylindenyl)silanetitanium (IV) dibenzyl; (cyclododecylamido)dimethoxy($\eta^5$-2,3,4,6,7-pentamethylindenyl)silanetitanium (II) 1,4-diphenyl-1,3-butadiene; (cyclododecylamido)dimethoxy($\eta^5$-2,3,4,6,7-pentamethylindenyl)silanetitanium (II) 1,3-pentadiene; (cyclododecylamido)dimethoxy($\eta^5$-2,3,4,6,7-pentamethylindenyl)silanetitanium (III) 2-(N,N-dimethylamino)benzyl; (cyclododecylamido)dimethoxy($\eta^5$-2,3,4,6,7-pentamethylindenyl)silanetitanium (IV) dimethyl; (cyclododecylamido)dimethoxy($\eta^5$-2,3,4,6,7-pentamethylindenyl)silanetitanium (IV) dibenzyl; (2,4,6-trimethylanilido)dimethoxy($\eta^5$-2,3,4,6,7-pentamethylindenyl)silanetitanium (II) 1,4-diphenyl-1,3-butadiene; (2,4,6-trimethylanilido)dimethoxy($\eta^5$-2,3,4,6,7-pentamethylindenyl)silanetitanium (II) 1,3-pentadiene; (2,4,6-trimethylanilido)dimethoxy($\eta^5$-2,3,4,6,7-pentamethylindenyl)silanetitanium (III) 2-(N,N-dimethylamino)benzyl; (2,4,6-trimethylanilido)dimethoxy($\eta^5$-2,3,4,6,7-pentamethylindenyl)silanetitanium (IV) dimethyl; (2,4,6-trimethylanilido)dimethoxy($\eta^5$-2,3,4,6,7-pentamethylindenyl)silanetitanium (IV) dibenzyl; (1-adamantylamido)dimethoxy($\eta^5$-2,3,4,6,7-pentamethylindenyl)silanetitanium (II) 1,4-diphenyl-1,3-butadiene; (1-adamantylamido)dimethoxy($\eta^5$-2,3,4,6,7-pentamethylindenyl)silanetitanium (II) 1,3-pentadiene; (1-adamantylamido)dimethoxy($\eta^5$-2,3,4,6,7-pentamethylindenyl)silanetitanium (III) 2-(N,N dimethylamino)benzyl; (1-adamantylamido)dimethoxy($\eta^5$-2,3,4,6,7-pentamethylindenyl)silanetitanium (IV) dimethyl; (1-adamantylamido)dimethoxy($\eta^5$-2,3,4,6,7-pentamethylindenyl)silanetitanium (IV) dibenzyl; (n-butylamido)ethoxymethyl($\eta^5$-2,3,4,6,7-pentamethylindenyl)silanetitanium (II) 1,4-diphenyl-1,3-butadiene; (n-butylamido)ethoxymethyl($\eta^5$-2,3,4,6,7-pentamethylindenyl)silanetitanium (II) 1,3-pentadiene; (n-butylamido)ethoxymethyl($\eta^5$-2,3,4,6,7-pentamethylindenyl)silanetitanium (III) 2-(N,N-dimethylamino)benzyl; (n-butylamido)ethoxymethyl($\eta^5$-2,3,4,6,7-pentamethylindenyl)silanetitanium (IV) dimethyl; (n-butylamido)ethoxymethyl($\eta^5$-2,3,4,6,7-pentamethylindenyl)silanetitanium (IV) dibenzyl; (cyclododecylamido)ethoxymethyl($\eta^5$-2,3,4,6,7-pentamethylindenyl)silanetitanium (II) 1,4-diphenyl-1,3-butadiene; (cyclododecylamido)ethoxymethyl($\eta^5$-2,3,4,6,7-pentamethylindenyl)silanetitanium (II) 1,3-pentadiene; (cyclododecylamido)ethoxymethyl($\eta^5$-2,3,4,6,7-pentamethylindenyl)silane titanium (III) 2-(N,N-dimethylamino)benzyl; (cyclododecylamido)ethoxymethyl($\eta^5$-2,3,4,6,7-pentamethylindenyl)silanetitanium (IV) dimethyl; (cyclododecylamido)ethoxymethyl($\eta^5$-2,3,4,6,7-pentamethylindenyl)silanetitanium (IV) dibenzyl; (2,4,6-trimethylanilido)ethoxymethyl($\eta^5$-2,3,4,6,7-pentamethylindenyl)silanetitanium (II) 1,4-diphenyl-1,3-butadiene; (2,4,6-trimethylanilido)ethoxymethyl($\eta^5$-2,3,4,6,7-pentamethylindenyl)silanetitanium (II) 1,3-pentadiene; (2,4,6-trimethylanilido)ethoxymethyl($\eta^5$-2,3,4,6,7-pentamethylindenyl)silanetitanium (III) 2-(N,N-dimethylamino)benzyl; (2,4,6-trimethylanilido)ethoxymethyl($\eta^5$-2,3,4,6,7-pentamethylindenyl)

silanetitanium (IV) dimethyl; (2,4,6-trimethylanilido) ethoxymethyl($\eta^5$-2,3,4,6,7-pentamethylindenyl)silane titanium (IV) dibenzyl; (1-adamantylamido)ethoxymethyl ($\eta^5$-2,3,4,6,7-pentamethyl-indenyl)silanetitanium (II) 1,4-diphenyl-1,3-butadiene; (1-adamantylamido)ethoxymethyl ($\eta^5$-2,3,4,6,7-pentamethylindenyl)silanetitanium (II) 1,3-pentadiene; (1-adamantylamido)ethoxymethyl($\eta^5$-2,3,4,6,7-pentamethylindenyl)silanetitanium (III) 2-(N,N-dimethylamino)benzyl; (1-adamantylamido)ethoxymethyl ($\eta^5$-2,3,4,6,7-pentamethylindenyl)silanetitanium (IV) dimethyl; and (1-adamantylamido)ethoxymethyl($\eta^5$-2,3,4,6, 7-pentamethylindenyl)silanetitanium (IV) dibenzyl.

Other catalysts, cocatalysts, catalyst systems, and activating techniques which may be used in the practice of the invention disclosed herein may include those disclosed in WO 96/23010, published on Aug. 1, 1996, the entire disclosure of which is hereby incorporated by reference; those disclosed in WO 99/14250, published Mar. 25, 1999, the entire disclosure of which is hereby incorporated by reference; those disclosed in WO 98/41529, published Sep. 24, 1998, the entire disclosure of which is hereby incorporated by reference; those disclosed in WO 97/42241, published Nov. 13, 1997, the entire disclosure of which is hereby incorporated by reference; those disclosed by Scollard, et al., in J. Am. Chem. Soc 1996, 118, 10008–10009, the entire disclosure of which is hereby incorporated by reference; those disclosed in EP 0 468 537 B1, published Nov. 13, 1996, the entire disclosure of which is hereby incorporated by reference; those disclosed in WO 97/22635, published Jun. 26, 1997, the entire disclosure of which is hereby incorporated by reference; those disclosed in EP 0 949 278 A2, published Oct. 13, 1999, the entire disclosure of which is hereby incorporated by reference; those disclosed in EP 0 949 279 A2, published Oct. 13, 1999, the entire disclosure of which is hereby incorporated by reference; those disclosed in EP 1 063 244 A2, published Dec. 27, 2000, the entire disclosure of which is hereby incorporated by reference; those disclosed in U.S. Pat. No. 5,408,017, the entire disclosure of which is hereby incorporated by reference; those disclosed in U.S. Pat. No. 5,767,208, the entire disclosure of which is hereby incorporated by reference; those disclosed in U.S. Pat. No. 5,907,021, the entire disclosure of which is hereby incorporated by reference; those disclosed in WO 88/05792, published Aug. 11, 1988, the entire disclosure of which is hereby incorporated by reference; those disclosed in WO88/05793, published Aug. 11, 1988, the entire disclosure of which is hereby incorporated by reference; those disclosed in WO 93/25590, published Dec. 23, 1993, the entire disclosure of which is hereby incorporated by reference; those disclosed in U.S. Pat. No. 5,599, 761, the entire disclosure of which is hereby incorporated by reference; those disclosed in U.S. Pat. No. 5,218,071, the entire disclosure of which is hereby incorporated by reference; those disclosed in WO 90/07526, published Jul. 12, 1990, the entire disclosure of which is hereby incorporated by reference; those disclosed in U.S. Pat. No. 5,972,822, the entire disclosure of which is hereby incorporated by reference; those disclosed in U.S. Pat. No. 6,074,977, the entire disclosure of which is hereby incorporated by reference; those disclosed in U.S. Pat. No. 6,013,819, the entire disclosure of which is hereby incorporated by reference; those disclosed in U.S. Pat. No. 5,296,433, the entire disclosure of which is hereby incorporated by reference; those disclosed in U.S. Pat. No. 4,874,880, the entire disclosure of which is hereby incorporated by reference; those disclosed in U.S. Pat. No. 5,198,401, the entire disclosure of which is hereby incorporated by reference; those disclosed in U.S. Pat. No. 5,621,127, the entire disclosure of which is hereby incorporated by reference; those disclosed in U.S. Pat. No. 5,703,257, the entire disclosure of which is hereby incorporated by reference; those disclosed in U.S. Pat. No. 5,728,855, the entire disclosure of which is hereby incorporated by reference; those disclosed in U.S. Pat. No. 5,731,253, the entire disclosure of which is hereby incorporated by reference; those disclosed in U.S. Pat. No. 5,710,224, the entire disclosure of which is hereby incorporated by reference; those disclosed in U.S. Pat. No. 5,883,204, the entire disclosure of which is hereby incorporated by reference; those disclosed in U.S. Pat. No. 5,504,049, the entire disclosure of which is hereby incorporated by reference; those disclosed in U.S. Pat. No. 5,962,714, the entire disclosure of which is hereby incorporated by reference; those disclosed in U.S. Pat. No. 5,965,677, the entire disclosure of which is hereby incorporated by reference; those disclosed in U.S. Pat. No. 5,427,991, the entire disclosure of which is hereby incorporated by reference; those disclosed in WO 93/21238, published Oct. 28, 1993, the entire disclosure of which is hereby incorporated by reference; those disclosed in WO 94/03506, published Feb. 17, 1994, the entire disclosure of which is hereby incorporated by reference; those disclosed in WO 93/21242, published Oct. 28, 1993, the entire disclosure of which is hereby incorporated by reference; those disclosed in WO 94/00500, published Jan. 6, 1994, the entire disclosure of which is hereby incorporated by reference; those disclosed in WO 96/00244, published Jan. 4, 1996, the entire disclosure of which is hereby incorporated by reference; those disclosed in WO 98/50392, published Nov. 12, 1998, the entire disclosure of which is hereby incorporated by reference; those disclosed in Wang, et al., Organometallics 1998, 17, 3149–3151, the entire disclosure of which is hereby incorporated by reference; those disclosed in Younkin, et al., Science 2000, 287, 460–462, the entire disclosure of which is hereby incorporated by reference; those disclosed by Chen and Marks, Chem. Rev. 2000, 100, 1391–1434, the entire disclosure of which is hereby incorporated by reference; those disclosed by Alt and Koppl, Chem. Rev. 2000, 100, 1205–1221, the entire disclosure of which is hereby incorporated by reference; those disclosed by Resconi, et al., Chem. Rev. 2000, 100, 1253–1345, the entire disclosure of which is hereby incorporated by reference; those disclosed by Ittel, et al., ChemRev. 2000, 100, 1169–1203, the entire disclosure of which is hereby incorporated by reference; those disclosed by Coates, Chem. Rev., 2000, 100, 1223–1251, the entire disclosure of which is hereby incorporated by reference; and those disclosed in WO 96/13530, published May 9, 1996, the entire disclosure of which is hereby incorporated by reference. Also useful are those catalysts, cocatalysts, and catalyst systems disclosed in U.S. Ser. No. 09/230,185, filed Jan. 15, 1999; U.S. Pat. Nos. 5,965,756; 6,150,297; U.S. Ser. No. 09/715,380, filed Nov. 17, 2000.

Methods for preparing the aforementioned catalysts are described, for example, in U.S. Pat. No. 6,015,868. In some embodiments, the following catalysts are used: 1) (N-1,1-dimethylethyl)-1,1-(4-methylphenyl)-1-((1,2,3,3a,7a–n)-3-(1,3-dihydro-2H-isoindol-2-yl)-1H-inden-1-yl)silanaminato-(2-)-N-)dimethyltitanium; and 2) (N-1,1-dimethylethyl)-1,1-(4-butylphenyl)-1-((1,2,3,3a,7a–n)-3-(1, 3-dihydro-2H-isoindol-2-yl)-1H-inden-1-yl)silanaminato-(2-)-N-)dimethyltitanium. The chemical structures of certain of these catalysts are illustrated in FIG. 1.

Cocatalysts:

The above-described catalysts may be rendered catalytically active by combination with an activating cocatalyst or by use of an activating technique. Suitable activating cocatalysts for use herein include, but are not limited to, polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 30 carbons in each hydrocarbyl or halogenated hydrocarbyl group, more especially perfluorinated tri(aryl)boron and perfluorinated tri(aryl)aluminum compounds, mixtures of fluoro-substituted(aryl)boron compounds with alkyl-containing aluminum compounds, especially mixtures of tris(pentafluorophenyl)borane with trialkylaluminum or mixtures of tris(pentafluorophenyl)borane with alkylalumoxanes, more especially mixtures of tris(pentafluorophenyl)borane with methylalumoxane and mixtures of tris(pentafluorophenyl)borane with methylalumoxane modified with a percentage of higher alkyl groups (MMAO), and most especially tris(pentafluorophenyl)borane and tris(pentafluorophenyl)aluminum; non-polymeric, compatible, non-coordinating, ion forming compounds (including the use of such compounds under oxidizing conditions), especially the use of ammonium-, phosphonium-, oxonium-, carbonium-, silylium- or sulfonium-salts of compatible, non-coordinating anions, or ferrocenium salts of compatible, non-coordinating anions; bulk electrolysis and combinations of the foregoing activating cocatalysts and techniques. The foregoing activating cocatalysts and activating techniques have been previously taught with respect to different metal complexes in the following references: EP-A-277,003, U.S. Pat. Nos. 5,153,157, 5,064,802, EP-A468,651 (equivalent to U.S. Ser. No. 07/547,718), EP-A-520,732 (equivalent to U.S. Ser. No. 07/876,268), and EP-A-520,732 (equivalent to U.S. Ser. No. 07/884,966 filed May 1, 1992). The disclosures of the all of the preceding patents or patent applications are incorporated by reference herein in their entirety.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane are especially desirable activating cocatalysts. It has been observed that the most efficient catalyst activation using such a combination of tris(pentafluoro-phenyl)borane/alumoxane mixture occurs at reduced levels of alumoxane. Preferred molar ratios of Group 4 metal complex:tris(pentafluoro-phenylborane:alumoxane are from 1:1:1 to 1:5:10, more preferably from 1:1:1 to 1:3:5. Such efficient use of lower levels of alumoxane allows for the production of olefin polymers with high catalytic efficiencies using less of the expensive alumoxane cocatalyst. Additionally, polymers with lower levels of aluminum residue, and hence greater clarity, are obtained.

Suitable ion forming compounds useful as cocatalysts in some embodiments of the invention comprise a cation which is a Bronsted acid capable of donating a proton, and a compatible, non-coordinating anion, $A^-$. As used herein, the term "non-coordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A non-coordinating anion specifically refers to an anion which, when functioning as a charge balancing anion in a cationic metal complex, does not transfer an anionic substituent or fragment thereof to the cation thereby forming neutral complexes during the time which would substantially interfere with the intended use of the cationic metal complex as a catalyst. "Compatible anions" are anions which are not degraded to neutrality when the initially formed complex decomposes and are non-interfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, the anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, known in the art and many, particularly such compounds containing a single boron atom in the anion portion, are available commercially.

Preferably such cocatalysts may be represented by the following general formula:

$$(L^*-H)_d^+(A)^{d-} \qquad \text{Formula VII}$$

wherein $L^*$ is a neutral Lewis base; $(L^*-H)+$ is a Bronsted acid; $A^{d-}$ is an anion having a charge of d–, and d is an integer from 1 to 3. More preferably $A^{d-}$ corresponds to the formula: $[M'Q_4]^-$, wherein M' is boron or aluminum in the +3 formal oxidation state; and Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), the Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

$$(L^*-H)^+(M'Q_4)^-; \qquad \text{Formula VIII}$$

wherein $L^*$ is as previously defined; M' is boron or aluminum in a formal oxidation state of 3; and Q is a hydrocarbyl-, hydrocarbyloxy-, fluorinated hydrocarbyl-, fluorinated hydrocarbyloxy-, or fluorinated silylhydrocarbyl-group of up to 20 non-hydrogen atoms, with the proviso that in not more than one occasion is Q hydrocarbyl. Most preferably, Q in each occurrence is a fluorinated aryl group, especially a pentafluorophenyl group. Preferred $(L^*-H)^+$ cations are N,N-dimethylaniline, N,N-di(octadecyl)anilinium, di(octadecyl)methylammonium, methylbis(hydrogenated tallowyl) ammonium, and tributylammonium.

Illustrative, but not limiting, examples of boron compounds which may be used as an activating cocatalyst are tri-substituted ammonium salts such as: trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis pentafluorophenyl)borate; N,N-dimethylanilinium n-butyltris(pentafluorophenyl)borate; N,N-dimethylanilinium benzyltris(pentafluorophenyl)borate; N,N-dimethylanilinium tetrakis(4-(t-butyldimethylsilyl)-2,3,5,6-tetrafluorophenyl) borate; N,N-dimethylanilinium tetrakis(4-(triisopropylsilyl)-2,3,5,6-tetrafluorophenyl)borate; N,N-dimethylanilinium pentafluorophenoxytris (pentafluorophenyl)borate; N,N-diethylanilinium tetrakis (pentafluorophenyl)borate; N,N-dimethyl-2,4,6-trimethylanilinium tetrakis(pentafluorophenyl)borate; trimethylammonium tetrakis(2,3,4,6-tetrafluorophenyl)borate; triethylammonium tetrakis(2,3,4,6-tetrafluorophenyl) borate; tripropylammonium tetrakis(2,3,4,6-tetrafluorophenyl)borate; tri(n-butyl)ammonium tetrakis(2,3,4,6-tetrafluorophenyl)borate, dimethyl(t-butyl)ammonium tetrakis(2,3,4,6-tetrafluorophenyl)borate; N,N-dimethylanilinium tetrakis(2,3,4,6-tetrafluorophenyl)borate; N,N-diethylanilinium tetrakis(2,3,4,6-tetrafluorophenyl)borate; and N,N-dimethyl-2,4,6-trimethylanilinium tetrakis(2,3,4,6-tetrafluorophenyl)borate; dialkylammonium salts such as: di-(i-propyl)ammonium tetrakis(pentafluorophenyl)borate, and dicyclohexylammonium tetrakis(pentafluorophenyl)borate; tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate; di-substituted oxonium salts such as: diphenyloxonium tetrakis(pentafluorophenyl)borate, di(o-tolyl)oxonium tetrakis(pentafluorophenyl)borate, and di(2,6-dimethylphenyl)oxonium tetrakis(pentafluorophenyl)borate; di-substituted sulfonium salts such as: diphenylsulfonium tetrakis(pentafluorophenyl)borate, di(o-tolyl)sulfonium tetrakis(pentafluorophenyl)borate, and bis (2,6-dimethylphenyl)sulfonium tetrakis(pentafluorophenyl) borate.

Another suitable ion forming, activating cocatalyst comprises a salt of a cationic oxidizing agent and a non-coordinating, compatible anion represented by the formula:

$$(Ox^{e+})_d(A^{d-})_e \qquad \text{Formula IX}$$

wherein: $Ox^{e+}$ is a cationic oxidizing agent having a charge of e+; e is an integer from 1 to 3; and $A^{d-}$ and d are as previously defined.

Examples of cationic oxidizing agents include, but are not limited to, ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a non-coordinating, compatible anion represented by the formula: $©^+ A^-$, wherein $©^+$ is a $C_{1-20}$ carbenium ion; and $A^-$ is as previously defined. A preferred carbenium ion is the trityl cation, that is triphenylmethylium.

A further suitable ion forming, activating cocatalyst comprises a compound which is a salt of a silylium ion and a non-coordinating, compatible anion represented by the formula:

$$R_3Si(X')_q^+A^- \qquad \text{Formula X}$$

wherein: R is $C_{1-10}$ hydrocarbyl, and X', q and $A^-$ are as previously defined.

Preferred silylium salt activating cocatalysts include, but are not limited to, trimethylsilylium-tetrakispentafluorophenylborate, triethylsilylium tetrakispentafluorophenylborate and ether substituted adducts thereof. Silylium salts have been previously generically disclosed in J. Chem. Soc. Chem. Comm., 1993, 383–384, as well as Lambert, J. B., et al., Organometallics, 1994, 13, 2430–2443. The use of the above silylium salts as activating cocatalysts for addition polymerization catalysts is disclosed in U.S. Pat. No. 5,625,087, which is incorporated by reference herein in its entirety. Certain complexes of alcohols, mercaptans, silanols, and oximes with tris(pentafluorophenyl)borane are also effective catalyst activators and may be used in embodiments of the invention. Such cocatalysts are disclosed in U.S. Pat. No. 5,296,433, which is also incorporated by reference herein in its entirety.

Monomers:

The process described herein may be employed to prepare any olefin polymers, including but not limited to, ethylene/propylene, ethylene/1-butene, ethylene/1-hexene, ethylene/4-methyl-1-pentene, ethylene/styrene, ethylene/propylene/styrene, and ethylene/1-octene copolymers, isotactic polypropylene/1-butene, isotactic polypropylene/1-hexene, isotactic polypropylene/1-octene, terpolymers of ethylene, propylene and a non-conjugated diene, i.e., EPDM terpolymers, as well as homopolymers of ethylene, propylene, butylene, styrene, etc.

Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_{2-20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_{1-20}$ hydrocarbyl or cyclohydrocarbyl groups. Also included are mixtures of such olefins as well as mixtures of such olefins with $C_{4-40}$ diolefin compounds.

Examples of olefin monomers include, but are not limited to ethylene, propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_{4-40}$ dienes, including but not limited to 1,3-butadiene, 1,3-pentadiene, 1,4-hexadiene, 1,5-hexadiene, 1,7-octadiene, 1,9-decadiene, other $C_{4-40}$ α-olefins, and the like. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The novel processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be advantageously prepared by following the teachings herein. Optionally, copolymers comprising ethylene, styrene and a $C_{3-20}$ alpha olefin, optionally comprising a $C_{4-20}$ diene, having improved properties over those presently known in the art can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

Polymerization Process:

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is generally employed in large quantity, generally at least 100 times the quantity of metal complex on a molar basis. Tris(pentafluorophenyl)borane and tris(pentafluorophenyl) aluminum, where used as an activating cocatalyst are preferably employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

In general, the polymerization may be accomplished at conditions known in the art for Ziegler-Natta or Kaminsky-Sinn type polymerization reactions, that is, temperatures from −50 to 250° C., preferably 30 to 200° C. and pressures from atmospheric to 10,000 atmospheres. Suspension, solution, slurry, gas phase, solid state powder polymerization or other process condition may be employed if desired. A support, especially silica, alumina, or a polymer (especially polytetrafluoroethylene or a polyolefin) may be employed, and desirably is employed when the catalysts are used in a gas phase or slurry polymerization process. Preferably, the support is passivated before the addition of the catalyst. Passivation techniques are known in the art, and include treatment of the support with a passivating agent such as triethylaluminum. The support is preferably employed in an amount to provide a weight ratio of catalyst (based on metal):support from about 1:100,000 to about 1:10, more preferably from about 1:50,000 to about 1:20, and most preferably from about 1:10,000 to about 1:30. In most polymerization reactions, the molar ratio of catalyst:polymerizable compounds employed preferably is from about $10^{-12}$:1 to about $10^{-1}$:1, more preferably from about $10^{-9}$:1 to about $10^{-5}$:1.

Suitable solvents for polymerization are inert liquids. Examples include, but are not limited to, straight and branched-chain hydrocarbons such as isobutane, butane, pentane, hexane, heptane, octane, and mixtures thereof; mixed aliphatic hydrocarbon solvents such as kerosene and ISOPAR (available from Exxon Chemicals), cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and the like, and aromatic and alkyl-substituted aromatic compounds such as benzene, toluene, xylene, ethylbenzene and the like. Suitable solvents also include, but are not limited to, liquid olefins which may act as monomers or comonomers including ethylene, propylene, butadiene, cyclopentene, 1-hexene, 1-hexane, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, vinyltoluene (including all isomers alone or in admixture), and the like. Mixtures of the foregoing are also suitable.

The catalysts may be utilized in combination with at least one additional homogeneous or heterogeneous polymerization catalyst in separate reactors connected in series or in parallel to prepare polymer blends having desirable properties. An example of such a process is disclosed in WO 94/00500, equivalent to U.S. Ser. No. 07/904,770, as well as U.S. Ser. No. 08/10958, filed Jan. 29, 1993. The disclosures of the patent applications are incorporated by references herein in their entirety.

The catalyst system may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material. The heterogeneous form of the catalyst system may be employed in a slurry polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably, the major part of the diluent comprises at least the α-olefin monomer or monomers to be polymerized.

Solution polymerization conditions utilize a solvent for the respective components of the reaction. Preferred solvents include, but are not limited to, mineral oils and the various hydrocarbons which are liquid at reaction temperatures and pressures. Illustrative examples of useful solvents include, but are not limited to, alkanes such as pentane, iso-pentane, hexane, heptane, octane and nonane, as well as mixtures of alkanes including kerosene and Isopar E™, available from Exxon Chemicals Inc.; cycloalkanes such as cyclopentane, cyclohexane, and methylcyclohexane; and aromatics such as benzene, toluene, xylenes, ethylbenzene and diethylbenzene.

At all times, the individual ingredients, as well as the catalyst components, should be protected from oxygen and moisture. Therefore, the catalyst components and catalysts should be prepared and recovered in an oxygen and moisture free atmosphere. Preferably, therefore, the reactions are performed in the presence of a dry, inert gas such as, for example, nitrogen or argon.

The polymerization may be carried out as a batch or a continuous polymerization process. A continuous process is preferred, in which event catalysts, solvent or diluent (if employed), and comonomers (or monomer) are continuously supplied to the reaction zone and polymer product continuously removed therefrom. The polymerization conditions for manufacturing the interpolymers according to embodiments of the invention are generally those useful in the solution polymerization process, although the application is not limited thereto. Gas phase and slurry polymerization processes are also believed to be useful, provided the proper catalysts and polymerization conditions are employed.

In some embodiments, the polymerization is conducted in a continuous solution polymerization system comprising two reactors connected in series or parallel. One or both reactors contain at least two catalysts which have a substantially similar comonomer incorporation capability but different molecular weight capability. In one reactor, a relatively high molecular weight product ($M_w$ from 100,000 to over 1,000,000, more preferably 200,000 to 1,000,000) is formed while in the second reactor a product of a relatively low molecular weight ($M_w$ 2,000 to 300,000) is formed. The final product is a mixture of the two reactor effluents which are combined prior to devolatilization to result in a uniform mixing of the two polymer products. Such a dual reactor/dual catalyst process allows for the preparation of products with tailored properties. In one embodiment, the reactors are connected in series, that is the effluent from the first reactor is charged to the second reactor and fresh monomer, solvent and hydrogen is added to the second reactor. Reactor conditions are adjusted such that the weight ratio of polymer produced in the first reactor to that produced in the second reactor is from 20:80 to 80:20. In addition, the temperature of the second reactor is controlled to produce the lower molecular weight product. In one embodiment, the second reactor in a series polymerization process contains a heterogeneous Ziegler-Natta catalyst or chrome catalyst known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natta catalysts and their preparation include, but are not limited to, those disclosed in U.S. Pat. Nos. 4,612,300, 4,330,646, and 5,869,575. The disclosures of each of these three patents are herein incorporated by reference.

The process described herein may be useful in the preparation of EP and EPDM copolymers in high yield and productivity. The process employed may be either a solution or slurry process both of which are previously known in the art. Kaminsky, *J. Poly. Sci.*, Vol. 23, pp. 2151–64 (1985) reported the use of a soluble bis(cyclopentadienyl) zirconium dimethylalumoxane catalyst system for solution polymerization of EP and EPDM elastomers. U.S. Pat. No. 5,229,478 discloses a slurry polymerization process utilizing similar bis(cyclopentadienyl)zirconium based catalyst systems.

The following procedure may be carried out to obtain an EPDM polymer: in a stirred-tank reactor propylene monomer is introduced continuously together with solvent, diene monomer and ethylene monomer. The reactor contains a liquid phase composed substantially of ethylene, propylene and diene monomers together with any solvent or additional diluent. If desired, a small amount of a "H"-branch inducing diene such as norbornadiene, 1,7-octadiene or 1,9-decadiene may also be added. At least two catalysts and suitable cocatalysts are continuously introduced in the reactor liquid phase. The reactor temperature and pressure may be controlled by adjusting the solvent/monomer ratio, the catalyst addition rate, as well as by cooling or heating coils, jackets or both. The polymerization rate is controlled by the rate of catalyst addition. The ethylene content of the polymer product is determined by the ratio of ethylene to propylene in the reactor, which is controlled by manipulating the respective feed rates of these components to the reactor. The molecular weight of the polymer product is controlled, optionally, by controlling other polymerization variables such as the temperature, monomer concentration, or by a stream of hydrogen introduced to the reactor, as is known in the art. The reactor effluent is contacted with a catalyst kill agent, such as water. The polymer solution is optionally heated, and the polymer product is recovered by flashing off unreacted gaseous ethylene and propylene as well as residual solvent or diluent at reduced pressure, and, if necessary, conducting further devolatilization in equipment such as a devolatizing extruder or other devolatilizing equipment operated at reduced pressure. In a continuous process, the mean residence time of the catalyst and polymer in the reactor generally is from 5 minutes to 8 hours, and preferably from 10 minutes to 6 hours, more preferably from 10 minutes to 1 hour.

In some embodiments, ethylene is added to the reaction vessel in an amount to maintain a differential pressure in excess of the combined vapor pressure of the α-olefin and diene monomers. The ethylene content of the polymer is determined by the ratio of ethylene differential pressure to the total reactor pressure. Generally the polymerization process is carried out with a pressure of ethylene of from 10 to 1000 psi (70 to 7000 kPa), most preferably from 40 to 800 psi (30 to 600 kPa). The polymerization is generally conducted at a temperature of from 25 to 250° C., preferably from 75 to 200° C., and most preferably from greater than 95 to 200° C.

In one embodiment of the invention, a process for producing a $C_{2-20}$ olefin homopolymer or interpolymer comprises one or more of the following steps: 1) providing controlled addition of a low molecular weight catalyst to a reactor, optionally including a cocatalyst and a scavenger component; 2) providing controlled addition of a high molecular weight catalyst to the same reactor, optionally including a cocatalyst and a scavenger component; 3) continuously feeding one or more $C_{2-20}$ olefins into the reactor, optionally with a solvent or diluent, and optionally with a controlled amount of $H_2$; 4) continuously feeding the low molecular weight catalyst into the reactor at a fixed rate; 5) continuously feeding the high molecular weight catalyst into the same reactor at a rate sufficient to produce the desired $M_w$ of the polymer product wherein the ratio of the molecular weight of the polymer produced by the high molecular weight catalyst to the molecular weight of the polymer produced by the low molecular weight catalyst ($M_{wH}/M_{wL}$) is in the range from about 1.5 to about 15; and 6) recovering the polymer product. Preferably, the process is a continuous solution process. The optional cocatalysts and scavenger components in the novel process can be independently mixed with each catalyst component before the catalyst components are introduced into the reactor, or they may each independently be fed into the reactor using separate streams, resulting in "in reactor" activation. Scavenger components are known in the art and include, but are not limited to, alkyl aluminum compounds, including alumoxanes. Examples of scavengers include, but are not limited to, trimethyl aluminum, triethyl aluminum, triisobutyl aluminum, trioctyl aluminum, methylalumoxane (MAO), and other alumoxanes including, but not limited to, MMAO-3A, MMAO-7, PMAO-IP (all available from Akzo Nobel).

In another embodiment of the invention, a process for controlling the melt index of a polyolefin comprises one or more of the following steps: 1) providing controlled addition of a low molecular weight catalyst to a reactor, optionally including a cocatalyst and a scavenger component; 2) providing controlled addition of a high molecular weight catalyst to the same reactor, optionally including a cocatalyst and a scavenger component; 3) continuously feeding one or more $C_{2-20}$ olefins into the reactor, optionally with a solvent or diluent, and optionally with a controlled amount of $H_2$; 4) continuously feeding the low molecular weight catalyst into the reactor at a fixed rate under conditions wherein the melt index of the polymer produced by the low molecular weight catalyst has a melt index equal to or greater than about two times the desired melt index of the reactor product; 5) controlling the melt index of the polymer product by continuously feeding the high molecular weight catalyst into the same reactor at a rate sufficient to produce the desired melt index of the polymer product wherein the ratio of the molecular weight of the polymer produced by the high molecular weight catalyst to the molecular weight of the polymer produced by the low molecular weight catalyst ($M_{wH}/M_{wL}$) is in the range from about 1.5 to about 15; and 6) recovering the polymer product.

For the novel processes described herein, the polymer properties can be tailored by adjustment of process conditions. In general, for ethylene based polymers, the amount of long chain branching increases with a decrease in the concentration of ethylene. Thus, particularly in solution polymerization, the amount of long-chain branching can be controlled by adjusting the ethylene concentration, reactor temperature, and polymer concentration. In general, higher reactor temperatures lead to a higher level of polymer molecules that have unsaturated end groups. Long chain branching can be increased by selecting catalysts that generate a relatively large percentage of vinyl end groups, selecting catalysts having relatively high comonomer incorporating ability (i.e., low $r_1$), operating at relatively high reactor temperature at low ethylene and comonomer concentration, and high polymer concentration. If a relatively low level of long chain branching is desired, LCB can be minimized by selecting catalysts that generate a relatively low percentage of vinyl end groups, selecting catalysts having a relatively low comonomer incorporating ability (i.e., high $r_1$), operating at low reactor temperature at high ethylene concentration and low polymer concentration. By proper selection of process conditions, including catalyst selection, polymers with tailored properties can be produced. For a solution polymerization process, especially a continuous solution polymerization, preferred ranges of ethylene concentration at steady state are from about 0.25 weight percent of the total reactor contents to about 5 weight percent of the total reactor contents, and the preferred range of polymer concentration is from about 10% of the reactor contents by weight to about 45% of the reactor contents or higher.

In general, catalyst efficiency (expressed in terms of gram of polymer produced per gram of transition metal) decreases with increasing temperature and decreasing ethylene concentration. In addition, the molecular weight of the polymer product generally decreases with increasing reactor temperature and decreases with decreasing ethylene concentration. The molecular weight of the polyolefin can also be controlled with the addition of chain transfer compounds, especially through the addition of $H_2$.

As more hydrogen is added to a reactor, a lower molecular weight polymer generally is produced. Various catalysts may have different rates of hydrogen consumption under any particular polymerization condition. Therefore, when two or more catalysts are used simultaneously in a single reactor and hydrogen is used as a molecular weight control agent, one catalyst may convert more of the hydrogen than the other. Thus, the ratio of the molecular weights of the polymer molecules produced by the two (or more) catalysts may differ from that obtained when each catalyst is run individually under otherwise identical conditions.

Therefore, the polymerization processes disclosed herein employ catalysts selected according to either same-reactor methodology or separate-reactor methodology. The same-reactor methodology refers to a method of determining $M_{wH}/M_{wL}$ in which at least one high molecular weight catalyst and one low molecular weight catalyst are utilized simultaneously in a single reactor under reaction conditions. The molecular weight of the polymer produced from each catalyst ($M_{wH}$ and $M_{wL}$, respectively) are determined preferably by deconvolution of the GPC into individual components, or by physically separating the individual polymer fractions and measuring the $M_w$ of each separated component. Preferably, the ratio $M_{wH}/M_{wL}$ determined using same-reactor methodology utilized in the inventions disclosed herein is greater than about 1.3, and each catalyst has substantially the same comonomer incorporation, regardless of whether the same two catalysts meet these criteria if run individually in a reactor under otherwise identical conditions. On the other hand, the separate-reactor methodology refers to the use of a polymerization process using only one catalyst individually at a time to determine the $M_w$ of each catalyst, and thus the ratio $M_{wH}/M_{wL}$ wherein each $M_w$ is determined independent of the influence of the other catalyst. Preferably, $M_{wH}/M_{wL}$ determined using the separate-reactor methodology utilized in the inventions disclosed herein is greater than about 1.3, and each catalyst has substantially the same comonomer incorporation, regardless of whether the same two catalysts meet these criteria if run together simultaneously in a single reactor. One may recognize that it is relatively easier to employ the separate-reactor methodology to identify suitable high and low molecular weight catalysts. It should also be understood that it becomes progressively easier to employ the same-reactor methodology as the ratio $M_{wH}/M_{wL}$ increases. Therefore, using the same-reactor methodology, $M_{wH}/M_{wL}$ is more preferably $\geq$ about 2, still more preferably $\geq$ about 3 and most preferably $\geq$ about 4. It should be understood that catalysts selected according to either methodology can be used in embodiments of the invention. These methodologies are not exclusive. Other methods may be used to select suitable catalysts.

Catalyst Selection:

The nature of the polymer product of the instant invention depends on the characteristics of each catalyst as well as the specifics of the process in which the catalysts are used. By careful choice of each catalyst, the polymer product can be tailored to achieve specific properties. For example, in order to obtain a polymer with a broader molecular weight distribution, two (or more) catalysts preferably should be chosen so that the difference in molecular weight at the conditions of polymerization ($M_{wH}/M_{wL}$) is large, preferably greater than 4.0, more preferably greater than 6.0, even more preferably greater than 8.0. For a narrower MWD product, the catalysts preferably should be chosen so that $M_{wH}/M_{wL}$ is relatively low, preferably 4.0 or less, more preferably 3.0 or less, still more preferably 2.5 or less. It should be understood that the polymer split (i.e., the weight fraction of the high molecular weight polymer component in a polymer) may also have a substantial effect on the molecular weight distribution, in conjunction with the $M_{wH}/M_{wL}$.

The amount of long chain branching can be influenced by the catalyst selection as well as the specifics of the process conditions used in the novel process described herein. The amount of long chain branching (in terms of LCB per 1000 carbon atoms of the polymer) generally increases with higher levels of vinyl-terminated polymer chains. Because different catalysts exhibit different levels of vinyl termination relative to other forms of termination, a catalyst having a higher level of vinyl termination preferably should be selected in order to increase the amount of long-chain branching. Preferably, the ratio of vinyl terminated chains to the sum of all of the thermally-induced unsaturated chain ends (for example, vinyl+vinylidene+cis+trans for an ethylene/alpha olefin copolymer) should be as high as possible. The determination of unsaturated chain ends can be accomplished by methods which are known in the art, including preferably NMR spectroscopy, particularly $^{13}C$ NMR spectroscopy, and most preferably $^{1}H$ NMR spectroscopy. An example of the use of $^{1}H$ NMR spectroscopy to quantify unsaturated chain ends in ethylene/alpha olefin copolymers is given in Hasegawa, et al. (J. Poly. Sci., Part A, Vol 38(2000), pages 4641–4648), the disclosure of which is incorporated herein by reference.

In order to obtain a polymer product with relatively higher levels of LCB, catalysts preferably should be chosen that produce high levels of vinyl terminated chains. Preferably, the ratio of the vinyl groups to the sum of all of the terminal unsaturations, $R_v$, as defined below is relatively high. As mentioned above, $R_v$ may be determined using $^{1}H$ NMR spectroscopy, or if that is indeterminative, by $^{13}C$ NMR spectroscopy under conditions where the intensity of the peaks corresponding to the different carbons in the sample is directly proportional to the total number of contributing nuclei in the sample.

$$R_v = \frac{[vinyl]}{[vinyl] + [vinylidene] + [cis] + [trans]}$$

wherein [vinyl] is the concentration of vinyl groups in the isolated polymer in vinyls/1,000 carbon atoms; [vinylidene], [cis], and [trans] are the concentration of vinylidene, cis and trans groups in the isolated polymer in amount/1,000 carbon atoms, respectively.

In one aspect of this invention, for ethylene homopolymers produced using more than one catalyst in a single reactor, $R_v$ is $\geq 0.14$ for each catalyst; preferably, $R_v$ is $\geq 0.17$; more preferably $R_v$ is $\geq 0.19$; most preferably $R_v$ is $\geq 0.21$. In some embodiments $R_v$ is $\geq 0.25, 0.30, 0.35,$ or 0.40. Some embodiments may have $R_v$ values of 0.45 or 0.50 or higher. For ethylene interpolymers having a density of $\geq 0.920$ g/mL produced using more than one catalyst in a single reactor, $R_v$ is $\geq 0.13$ for each catalyst; preferably, $R_v$ is $\geq 0.15$, more preferably $R_v$ is $\geq 0.17$, most preferably $R_v$ is $\geq 0.19$. For ethylene interpolymers having a density greater than or equal to 0.900 g/mL but less than 0.920 g/mL produced using more than one catalyst in a single reactor, $R_v$ is $\geq 0.12$ for each catalyst; preferably, $R_v$ is $\geq 0.14$; more preferably $R_v$ is $\geq 0.16$; most preferably $R_v$ is $\geq 0.18$. For ethylene interpolymers having a density greater than or equal to 0.880 g/mL but less than 0.900 g/mL produced using more than one catalyst in a single reactor, $R_v$ is $\geq 0.10$ for each catalyst; preferably, $R_v$ is $\geq 0.12$; more preferably $R_v$ is $\geq 0.14$; most preferably $R_v$ is $\geq 0.16$. For ethylene interpolymers having a density less than 0.880 g/mL produced using more than one catalyst in a single reactor, $R_v$ is $\geq 0.08$ for each catalyst; preferably, $R_v$ is $\geq 0.10$; more preferably $R_v$ is $\geq 0.12$; most preferably $R_v$ is $\geq 0.16$.

Preferably, for all of the ethylene homopolymers and interpolymers described immediately above, at least two of the catalysts used in a single reactor have substantially the same comonomer incorporation, $M_{wH}/M_{wL}$ is in the range from about 1.5 to about 15, and the process used is a gas phase, slurry, or solution process. More preferably, for all of the ethylene homopolymers and interpolymers described immediately above, at least two of the catalysts used in a single reactor have substantially the same comonomer incorporation, $M_{wH}/M_{wL}$ is in the range from about 1.5 to about 15, and the process used is a continuous solution process, especially a continuous solution process wherein the polymer concentration in the reactor at steady state is at least 15% by weight of the reactor contents and the ethylene concentration is 3.5% or less by weight of the reactor contents. Still more preferably, for all of the ethylene homopolymers and interpolymers described immediately above, at least two of the catalysts used in a single reactor have substantially the same comonomer incorporation, $M_{wH}/M_{wL}$ is in the range from about 1.5 to about 15, and the process used is a continuous solution process wherein the polymer concentration in the reactor at steady state is at least 18% by weight of the reactor contents and the ethylene concentration is 2.5% or less by weight of the reactor contents. Most preferably, for all of the ethylene homopolymers and interpolymers described immediately above, at least two of the catalysts used in a single reactor have substantially the same comonomer incorporation, $M_{wH}/M_{wL}$ is in the range from about 1.5 to about 15, and the process used is a continuous solution process wherein the polymer concentration in the reactor at steady state is at least 20% by weight of the reactor contents and the ethylene concentration is 2.0% or less by weight of the reactor contents. For all of the ethylene homopolymers and interpolymers described immediately above, preferably the interpolymers comprise an interpolymer of ethylene and at least one olefin selected from the group consisting of $C_3$–$C_{10}$ alpha olefins, especially propylene, 1-butene, 1-hexene, and 1-octene, and the melt index of the interpolymer is preferably in the range of about 0.1 to about 500, more preferably in the range from about 0.1 to about 100.

Tailored polymers with desirable properties can be prepared by controlling the distribution and nature of long-chain branching between the high molecular weight component(s) and the low molecular weight component(s) of the polymer produced using more than one catalyst in the novel process described herein. For example, by selecting a low molecular weight catalyst with a high value for $R_v$ and a high molecular weight catalyst having a low value of $R_v$, the long chain branches will be predominantly the length produced by the low molecular weight catalyst. By selecting a low molecular weight catalyst having a low value for $R_v$, and a high molecular weight catalyst having a high value for $R_v$, the long chain branches will be predominantly the length of the chains produced by the high molecular weight catalyst. Other permutations of $R_v$ (high or low) and molecular weight (high or low) can be used to select a pair of catalysts to produce a desirable polymer. Therefore, by proper selection of catalyst pairs, it is possible to control and/or tailor the physical properties of the polymer, such as the MWD, the amount of LCB, the average length of LCB, the distribution of LCB across the molecular weight distribution, etc.

The novel process described herein may optionally use more than one reactor, especially where a second reactor is used wherein the second reactor comprises an additional catalyst, especially a Ziegler-Natta or chrome catalyst.

Accordingly, there is provided a process for preparing ethylene homopolymers or ethylene/α-olefin interpolymers, and the novel compositions produced therein. The process comprises one or more of the following steps: 1) contacting under continuous solution polymerization conditions in a first reaction vessel (a) ethylene and optionally one or more α-olefins, (b) a plurality of single-site catalysts wherein $M_{wH}/M_{wL}$ is from about 1.5 to about 40, and (c) optionally an activating cocatalyst; 2) sequentially passing the reactor contents from the first reactor into a second reactor under continuous solution polymerization conditions containing (d) ethylene and optionally one or more α-olefins, (e) a Ziegler-Natta or chrome catalyst, and (f) optionally an activating cocatalyst; 3) removing the solvent from the resulting polymer solution; and 4) recovering the product. Additional reactors, such as a third or fourth reactor containing single site catalysts or Ziegler-Natta catalysts (or chrome catalysts), may be used in series or parallel to the first and second reactors.

Preferably, at least one of the single-site catalysts has an $R_v \geq$ about 0.12. It is also preferable that each of the single-site catalysts have substantially the same comonomer incorporation, and the polymer concentration in the first reactor at steady state is at least about 15% or more by weight of the reactor contents and the ethylene concentration is about 3.5% by weight or less of the reactor contents. More preferably, the polymer concentration in the first reactor at steady state is at least about 18% or more by weight of the reactor contents and the ethylene concentration is about 2.0% by weight or less of the reactor contents. It is preferable that the first reactor temperature is at least 130 degrees C., and that the second reactor temperature is higher than the first reactor temperature. It is also preferable that $M_{wH}/M_{wL}$ is from about 1.5 to about 15, more preferably from about 2.5 to about 10, most preferably from about 4.0 to about 10.

Ethylene homopolymers or ethylene/α-olefin interpolymers may also be produced by a process which includes one or more of the following steps: 1) contacting under continuous solution polymerization conditions in a first reaction vessel (a) ethylene and optionally one or more α-olefins, (b) a plurality of single-site catalysts wherein $M_{wH}/M_{wL}$ is from about 1.5 to about 40, and (c) optionally an activating cocatalyst; 2) contacting under continuous solution polymerization conditions in at least one additional reaction vessel (d) ethylene and optionally one or more α-olefins, (e) a Ziegler-Natta or chrome catalyst, and (f) optionally an activating cocatalyst; 3) combining the solution from the first reactor with the solution from the additional reactor vessels; 4) removing the solvent from the resulting polymer solution; and 5) recovering the product. Similarly, additional reactors, such as a third or fourth reactor containing single site catalysts or Ziegler-Natta catalysts (or chrome catalysts), may be used in series or parallel to the first and second reactors.

Preferably, at least one of the single-site catalysts has an $R_v \geq$ about 0.12. It is also preferable that each of the single-site catalysts have substantially the same comonomer incorporation, and the polymer concentration in the first reactor at steady state is at least about 15% or more by weight of the reactor contents and the ethylene concentration is about 3.5% by weight or less of the reactor contents. More preferably, the polymer concentration in the first reactor at steady state is at least about 18% or more by weight of the reactor contents and the ethylene concentration is about 2.0% by weight or less of the reactor contents. It is preferable that the first reactor temperature is at least 130 degrees C., and that the second reactor temperature is higher than the first reactor temperature. It is also preferable that $M_{wH}/M_{wL}$ is from about 1.5 to about 15, more preferably from about 2.5 to about 10, most preferably from about 4.0 to about 10.

In one embodiment of this invention, a pair of catalysts is used simultaneously in one reactor wherein the ratio, $M_{wH}/M_{wL}$, is in the range from about 1.5 to about 15, and $R_v$ for the low $M_w$ catalyst is $\geq$ about 0.12, while $R_v$ for the high $M_w$ catalyst is $\leq$ about 0.08. Preferably, catalysts with this range of $M_w$ and $R_v$ have substantially the same comonomer incorporation, and the process used is a gas phase, slurry, or solution process. More preferably, at least two of the catalysts used in a single reactor have substantially the same comonomer incorporation, $M_{wH}/M_{wL}$ is in the range from about 1.5 to about 15, and the process used is a continuous solution process, especially a continuous solution process wherein the polymer concentration in the reactor at steady state is at least 15% by weight of the reactor contents and the ethylene concentration is 3.5% or less by weight of the reactor contents. Still more preferably, the catalysts are used in a single reactor and have substantially the same comonomer incorporation, $M_{wH}/M_{wL}$ is in the range from about 1.5 to about 15, and the process used is a continuous solution process wherein the polymer concentration in the reactor at steady state is at least 18% by weight of the reactor contents and the ethylene concentration is 2.5% or less by weight of the reactor contents. Most preferably, the catalysts are used in a single reactor and have substantially the same comonomer incorporation, $M_{wH}/M_{wL}$ is in the range from about 1.5 to about 15, and the process used is a continuous solution process wherein the polymer concentration in the reactor at steady state is at least 20% by weight of the reactor contents and the ethylene concentration is 2.0% or less by weight of the reactor contents.

In another embodiment of the invention, a pair of catalysts is used simultaneously in one reactor wherein the ratio, $M_{wH}/M_{wL}$, is in the range from about 1.5 to about 15, and $R_v$ for the low $M_w$ catalyst is $\leq$ about 0.08, while $R_v$ for the high $M_w$ catalyst is $\geq$ about 0.12. Preferably, catalysts with this range of $M_w$ and $R_v$ have substantially the same comonomer incorporation, and the process used is a gas phase, slurry, or solution process. More preferably, at least two of the catalysts used in a single reactor with this range of $M_w$ and $R_v$ have substantially the same comonomer incorporation, and the process used is a continuous solution process, especially a continuous solution process wherein the polymer concentration in the reactor at steady state is at least 15% by weight of the reactor contents and the ethylene concentration is 3.5% or less by weight of the reactor contents. Still more preferably, the catalysts with this range of $M_w$ and $R_v$ are used in a single reactor and have substantially the same comonomer incorporation, and the process used is a continuous solution process wherein the polymer concentration in the reactor at steady state is at least 18% by weight of the reactor contents and the ethylene concentration is 2.0% or less by weight of the reactor contents. Most preferably, the catalysts with this range of $M_w$ and $R_v$ are used in a single reactor and have substantially the same comonomer incorporation, and the process used is a continuous solution process wherein the polymer concentration in the reactor at steady state is at least 20% by weight of the reactor contents and the ethylene concentration is 1.5% or less by weight of the reactor contents.

In still another embodiment of the invention, novel ethylene homopolymers and interpolymers of ethylene, as well as a process for the production of these polymers are provided. The homopolymer of ethylene or interpolymer of ethylene comprises at least one $C_{4-20}$ alpha olefin, preferably a $C_{6-10}$ alpha olefin, optionally additionally comprising a non-conjugated diene, having improved properties wherein a plurality of catalysts, preferably metallocene catalysts, are used simultaneously in one reactor wherein the ratio, $M_{wH}/M_{wL}$, is in the range from about 1.5 to about 15, preferably from about 2.5 to about 10, more preferably from about 4.0 to about 10, and $R_v$ for the low $M_w$ catalyst is $\geq$ about 0.12, preferably $\geq$ about 0.14, more preferably $\geq$ about 0.18 most preferably $\geq$ about 0.25, $R_v$ for the high $M_w$ catalyst is $\geq$ about 0.12, preferably $\geq$ about 0.14, more preferably $\geq$ about 0.18 most preferably $\geq$ about 0.22, $M_{wL}$ is $\geq$ about 50% of the $M_w$ of the interpolymer, preferably $\geq$ about 60% of the $M_w$ of the interpolymer, the split is $\leq$ about 0.20, preferably $\leq$ about 0.15, more preferably $\leq$ about 0.10, the density of the interpolymer is $\geq$ about 0.880 g/mL, preferably $\geq$ about 0.890 g/mL, more preferably $\geq$ about 0.900 g/mL, most preferably $\geq$ about 0.920 g/mL, and the melt index ($I_2$) of the interpolymer is in the range of about 0.01 to about 100, preferably in the range of about 0.02 to about 50, more preferably about 0.05 to about 20. Preferably, catalysts with this range of $M_{wL}$ and $R_v$ have substantially the same comonomer incorporation, and the process used is a gas phase, slurry, or solution process.

More preferably, at least two of the catalysts used in a single reactor with aforementioned range of $M_{wL}$ and $R_v$, split, density, and $I_2$ have substantially the same comonomer incorporation and the process used is a continuous solution process, especially a continuous solution process wherein the polymer concentration in the reactor at steady state is at least about 15% by weight of the reactor contents and the ethylene concentration is about 3.5% or less by weight of the reactor contents, the reactor temperature is at least about 130 degrees C., and the concentration of $H_2$ in the feed to the reactor is about 0.10 ppm or less by weight of total feed to the reactor, preferably about 0.05 ppm or less, still more preferably about 0.02 ppm or less.

Still more preferably, the catalysts with the above range of $M_{wL}$ and $R_v$, split, density, and $I_2$ are used in a single reactor and have substantially the same comonomer incorporation and the process used is a continuous solution process wherein the polymer concentration in the reactor at steady state is at least about 18% by weight of the reactor contents and the ethylene concentration is about 2.0% or less by weight of the reactor contents, the reactor temperature is at least about 140 degrees C., and the concentration of $H_2$ in the feed to the reactor is about 0.10 ppm or less by weight of total feed to the reactor, preferably about 0.05 ppm or less, still more preferably about 0.02 ppm or less.

Even more preferably, the catalysts with the above range of $M_{wL}$ and $R_v$, split, density, and $I_2$ are used in a single reactor and have substantially the same comonomer incorporation and the process used is a continuous solution process wherein the polymer concentration in the reactor at steady state is at least about 20% by weight of the reactor contents and the ethylene concentration is about 1.5% or less by weight of the reactor contents, the reactor temperature is at least about 150 degrees C., and the hydrogen concentration is about 0.10 ppm or less by weight of total feed to the reactor, preferably about 0.05 ppm or less, still more preferably about 0.02 ppm or less.

Most preferably, the catalysts with the above range of $M_{wL}$ and $R_v$, split, density, and $I_2$ are used in a single reactor and have substantially the same comonomer incorporation and the process used is a continuous solution process wherein the polymer concentration in the reactor at steady state is at least 20% by weight of the reactor contents and the ethylene concentration is 0.5% or less by weight of the reactor contents, the reactor temperature is at least about 150 degrees C., and the hydrogen concentration is about 0.02 ppm or less by weight of total feed to the reactor.

Additional catalyst selection criteria include, but are not limited to, $r_1$ and, $r_1^H/r_1^L$. For example, two or more catalysts meeting one or more of the following criteria may be used to produce a desired polymer in some embodiments of the invention: $r_1$ for each catalyst is preferably about 18 or less, more preferably about 14 or less, and even more preferably about 10 or less; $r_1^H/r_1^L$ is preferably between about 0.25 and about 4, more preferably between about 0.3 to about 3.5, even more preferably between about 0.4 to about 2.5, about 0.5 to about 2, about 0.6 to about 1.7, about 0.7 to about 1.4, or about 0.8 to about 1.2; and most preferably between about 0.9 to about 1.1; $R_v$ is preferably about 0.10 or higher, more preferably about 0.14 or higher, and even more preferably about 0.19 or higher; and $M_{wH}/M_{wL}$ is preferably about 1.3 or higher, more preferably from about 1.5 to about 40, and even more preferably from about 1.5 to about 15. Any permutation of one or more of the aforementioned criteria may be employed to select catalysts. Although the above-stated ranges are preferred, other ranges, especially those outside the stated ranges, also may be used to select suitable catalysts.

Applications

The polymers made in accordance with embodiments of the invention have many useful applications. For example, fabricated articles made from the polymers may be prepared using all of the conventional polyolefin processing techniques. Useful articles include films (e.g., cast, blown and extrusion coated), including multi-layer films, fibers (e.g., staple fibers) including use of an interpolymer disclosed herein as at least one component comprising at least a portion of the fiber's surface), spunbond fibers or melt blown fibers (using, e.g., systems as disclosed in U.S. Pat. Nos. 4,430,563, 4,663,220, 4,668,566, or 4,322,027, all of which are incorporated herein by reference), and gel spun fibers (e.g., the system disclosed in U.S. Pat. No. 4,413,110, incorporated herein by reference), both woven and non-woven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton) and molded articles (e.g., made using an injection molding process, a blow molding process or a rotomolding process). Monolayer and multilayer films may be made according to the film structures and fabrication methods described in U.S. Pat. No. 5,685,128, which is incorporated by reference herein in its entirety. The polymers described herein are also useful for wire and cable coating operations, as well as in sheet extrusion for vacuum forming operations.

Specific applications wherein the inventive polymers disclosed herein may be used include, but are not limited to, greenhouse films, shrink film, clarity shrink film, lamination film, extrusion coating, liners, clarity liners, overwrap film, agricultural film, high strength foam, soft foam, rigid foam, cross-linked foam, high strength foam for cushioning applications, sound insulation foam, blow molded bottles, wire and cable jacketing, including medium and high voltage cable jacketing, wire and cable insulation, especially medium and high voltage cable insulation, telecommunications cable jackets, optical fiber jackets, and frozen food packages. Additionally, the polymers disclosed herein may replace one or more of those used in the compositions and structures described in U.S. Pat. Nos. 6,270,856, 5,674,613, 5,462,807, 5,246,783, and 4,508,771, each of which is incorporated herein by reference in its entirety. The skilled artisan will appreciate other uses for the novel polymers and compositions disclosed herein.

Useful compositions are also suitably prepared comprising the polymers according to embodiments of the invention and at least one other natural or synthetic polymer. Preferred other polymers include, but are not limited to, thermoplastics, such as styrene butadiene block copolymers, polystyrene (including high impact polystyrene), ethylene vinyl alcohol copolymers, ethylene acrylic acid copolymers, other olefin copolymers (especially polyethylene copolymers) and homopolymers (e.g., those made using conventional heterogeneous catalysts). Examples include polymers made by the process of U.S. Pat. No. 4,076,698, incorporated herein by reference, other linear or substantially linear polymers as described in U.S. Pat. No. 5,272,236, and mixtures thereof. Other substantially linear polymers and conventional HDPE and/or LDPE may also be used in the thermoplastic compositions.

EXAMPLES

The following examples are given to illustrate various embodiments of the invention. They do not intend to limit the invention as otherwise described and claimed herein. All numerical values are approximate. When a numerical range is given, it should be understood that embodiments outside the range are still within the scope of the invention unless otherwise indicated. In the following examples, various polymers were characterized by a number of methods. Performance data of these polymers were also obtained. Most of the methods or tests were performed in accordance with an ASTM standard, if applicable, or known procedures.

Differential Scanning Calorimetry (DSC) measurements were carried out on a TA (Dupont) DSC. Each sample was melted at 100 C/min., cooled at 10 C/min., and the conventional DSC endotherm was recorded by scanning from −30 C to 140 C at 10 C/min. Gel Permeation Chromatography (GPC) data were generated using a Waters 150 C high temperature GPC chromatograph using trichlorobenzene as the solvent at the standard operating conditions. Low shear rheology data were obtained at 190 C using an RMS 800 analyzer. Blown-film was fabricated on an Egan blown film line.

Gel Permeation Chromatography (GPC) data were generated using either a Waters 150C/ALC, a Polymer Laboratories Model PL-210 or a Polymer Laboratories Model PL-220. The column and carousel compartments were operated at 140° C. The columns used were 3 Polymer Laboratories 10 micron Mixed-B columns. The samples were prepared at a concentration of 0.1 grams of polymer in 50 milliliters of 1,2,4 trichlorobenzene. The 1,2,4 trichlorobenzene used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute. Calibration of the GPC was performed with narrow molecular weight distribution polystyrene standards purchased from Polymer Laboratories. These polystyrene standard peak molecular weights were converted to polyethylene molecular weights using the following equation (as described in Williams and Ward, J. Polym. Sci., Polym. Let., 6, 621 (1968).:

$$M_{polyethylene} = A \times (M_{polystyrene})^B$$

where M is the molecular weight, A has a value of 0.4316 and B is equal to 1.0. The molecular weight calculations were performed with the Viscotek TriSEC software.

The GPC data were then deconvoluted to give the most probable fit for two molecular weight components. There are a number of deconvolution algorithms available both commercially and in the literature. These may lead to different answers depending upon the assumptions used. The algorithm summarized here is optimized for the deconvolution problem of the two most probable molecular weight distributions (plus an adjustable error term). In order to allow for the variations in the underlying distributions due to the macromer incorporation and small fluctuations in the reactor conditions (i.e. temperature, concentration) the basis functions were modified to incorporate a normal distribution term. This term allows the basis function for each component to be "smeared" to varying degrees along the molecular weight axis. The advantage is that in the limit (low LCB, perfect concentration and temperature control) the basis function will become a simple, most probable, Flory distribution.

Three components (j=1,2,3) are derived with the third component (j=3) being an adjustable error term. The GPC data must be normalized and properly transformed into weight fraction versus $Log_{10}$ molecular weight vectors. In other words, each potential curve for deconvolution should consist of a height vector, $h_i$, where the heights are reported at known intervals of $Log_{10}$ molecular weight, the $h_i$ have been properly transformed from the elution volume domain to the $Log_{10}$ molecular weight domain, and the $h_i$ are normalized. Additionally, these data should be made available for the EXCEL application.

Several assumption are made in the deconvolution. Each component, j, consists of a most probable, Flory, distribution which has been convoluted with a normal or Gaussian spreading function using a parameter, $\sigma_j$. The resulting, three basis functions are used in a Chi-square, $X^2$, minimization routine to locate the parameters that best fit the n points in $h_i$, the GPC data vector.

$$X^2(\mu_j, \sigma_j, w_j) = \sum_{i=1}^{n} [\sum_{j=1}^{3} \cdot \sum_{k=1}^{20} w_j \cdot M_i^2 \cdot \lambda_{j,k}^2 \cdot CumND_{j,k} \cdot e^{-\lambda_{j,k} \cdot M_i} \cdot \Delta Log_{10} M - h_i]^2$$

$$\lambda_{j,k} = 10^{\mu_j + \frac{k-10}{3} \cdot \sigma_j}$$

The variable, $CumND_{j,k}$, is calculated using the EXCEL function "NORMDIST(x, mean, standard_dev, cumulative)" with the parameters set as follows:

$x = \mu_j + (k-10) * \sigma_j / 3$ mean = $\mu_j$ standard dev = $\sigma_j$ cumulative = TRUE Table I below summarizes these variables and their definitions. The use of the Microsoft® EXCEL software application, Solver, is adequate for this task. Constraints are added to Solver insure proper minimization.

TABLE I

Variable Definitions

| Variable Name | Definition |
|---|---|
| $\lambda_{j,k}$ | Reciprocal of the number average molecular weight of most probable (Flory) distribution for component j, normal distribution slice k |
| $\sigma_j$ | Sigma (square root of variance) for normal (Gaussian) spreading function for component j. |
| $w_j$ | Weight fraction of component j |
| K | Normalization term (1.0/Log$_e$10) |
| $M_i$ | Molecular weight at elution volume slice i |
| $h_i$ | Height of log$_{10}$ (molecular weight) plot at slice i |
| n | Number of slices in Log molecular weight plot |
| i | Log molecular weight slice index (1 to n) |
| j | Component index (1 to 3) |
| l. | Normal distribution slice index |
| $\Delta$log$_{10}$M | Average difference between log$_{10}$M$_i$ and log$_{10}$M$_{i-1}$ in height vs. log$_{10}$M plot |

The 8 parameters that are derived from the Chi-square minimization are $\mu_1, \mu_2, \mu_3, \sigma_1, \sigma_2, \sigma_3, w_1$, and $w_2$. The term $w_3$ is subsequently derived from $w_1$ and $w_2$ since the sum of the 3 components must equal 1. Table II is a summary of the Solver constraints used in the EXCEL program.

TABLE II

Constraint Summary

| Description | Constraint |
|---|---|
| Maximum of fraction 1 | $w_1$ < 0.95 (User adjustable) |
| Lower limit of spreading function | $\sigma_1, \sigma_2, \sigma_3$ > 0.001 (must be positive) |
| Upper limit of spreading function | $\sigma_1, \sigma_2, \sigma_3$ < 0.2 (User adjustable) |
| Normalized fractions | $w_1 + w_2 + w_3 = 1.0$ |

Additional constraints that are to be understood include the limitation that only $\mu_j$>0 are allowed, although if solver is properly initialized, this constraint need not be entered, as the solver routine will not move any of the $\mu_j$ to values less than about 0.005. Also, the $w_j$ are all understood to be positive. This constraint can be handled outside of solver. If the $w_j$ are understood to arise from the selection of two points along the interval 0.0<P$_1$<P$_2$<1.0; whereby $w_1$=P$_1$, $w_2$=P$_2$−P$_1$ and $w_3$=1.0−P$_2$; then constraining P1 and P2 are equivalent to the constraints required above for the $w_j$.

Table III is a summary of the Solver settings under the Options tab.

TABLE III

Solver Settings

| Label | Value or selection |
|---|---|
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first guess for the values of $\mu_1, \mu_2, w_1$, and $w_2$ can be obtained by assuming two ideal Flory components that give the observed weight average, number average, and z-average molecular weights for the observed GPC distribution.

$$M_{n,GPC} = \left[ w_1 \cdot \frac{1}{10^{\mu_1}} + w_2 \cdot \frac{1}{10^{\mu_2}} \right]^{-1}$$

$$M_{w,GPC} = [w_1 \cdot 2 \cdot 10^{\mu_1} + w_2 \cdot 2 \cdot 10^{\mu_2}] / M_{n,GPC}$$

$$M_{z,GPC} = [w_1 \cdot 6 \cdot 10^{\mu_1} + w_2 \cdot 6 \cdot 10^{\mu_2}] / M_{w,GPC}$$

$$w_1 + w_2 = 1$$

The values of $\mu_1, \mu_2, w_1$, and $w_2$ are then calculated. These should be adjusted carefully to allow for a small error term, $w_3$, and to meet the constraints in Table II before entering into Solver for the minimization step. Starting values for $\sigma_j$ are all set to 0.05.

Preparative GPC for collecting selected fractions of polymers was performed on a Waters 150C/ALC equipped with preparative pump heads and modified with a 3000 microliter injection loop and 14 milliliter sample vials. The column and carousel compartments were operated at 140° C. The preparative GPC column used was 1 Jordi Associates 5 micron divinylbenzene (DVB) column catalog number 15105. The column dimensions were 500 mm in length and 22 mm inner diameter. 1,2,4 trichlorobenzene was used for both sample preparation and as the chromatographic mobile phase. The samples were prepared at a concentration of 0.1 grams of polymer in 50 milliliters of solvent. The solvent used to prepare the samples contained 200 ppm of butylated hydroxytoluene (BHT). Samples were prepared by agitating lightly for 2 hours at 160° C. The injection volume used was 2,500 microliters and the flow rate was 5.0 milliliters/minute.

Approximately 200–300 injections were made to collect appropriate sample amounts for off-line analysis. 16 fractions were collected spanning the full column elution range, with 8–12 fractions typically spanning the sample elution range. Elution range was verified by refractive index analysis during start-up. The collected solvent fractions were evaporated to approximately 50–60 milliliter volumes with a Buchi Rotovapor R-205 unit equipped with a vacuum controller module V-805 and a heating bath module B409. The fractions were then allowed to cool to room temperature and the polyethylene material was precipitated by adding approximately 200 milliliters of methanol. Verification of molecular weight fractionation was done via high temperature GPC analysis with refractive index detection. Typical polydispersities of the fractions as measured by GPC analysis were approximately 1.1 to 1.4.

The weight average branching index for selected fractions was obtained from direct determination of intrinsic viscosity and molecular weight at each chromatographic data slice. The chromatographic system consisted of either a Polymer Laboratories Model PL-210 or a Polymer Laboratories Model PL-220 equipped with a Viscotek differential viscometer Model 210R, and a Precision Detectors 2-angle laser light scattering detector Model 2040. The 15-degree angle of the light scattering detector was used for the calculation of molecular weights.

The column and carousel compartments were operated at 140° C. The columns used were 3 Polymer Laboratories 10-micron Mixed-B columns. The solvent used was 1,2,4 trichlorobenzene. The samples were prepared at a concentration of 0.1 grams of polymer in 50 milliliters of solvent.

The solvent used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute.

Calibration of the GPC column set was performed with narrow molecular weight distribution polystyrene standards purchased from Polymer Laboratories. The calibration of the detectors was performed in a manner traceable to NBS 1475 using a linear polyethylene homopolymer. $^{13}$C NMR was used to verify the linearity and composition of the homopolymer standard. The refractometer was calibrated for mass verification purposes based on the known concentration and injection volume. The viscometer was calibrated with NBS 1475 using a value of 1.01 deciliters/gram and the light scattering detector was calibrated using NBS 1475 using a molecular weight of 52,000 Daltons.

The Systematic Approach for the determination of multi-detector offsets was done in a manner consistent with that published by Mourey and Balke, Chromatography of Polymers: T. Provder, Ed.; ACS Symposium Series 521; American Chemical Society: Washington, D.C., (1993) pp 180–198 and Balke, et al., ; T. Provder, Ed.; ACS Symposium Series 521; American Chemical Society: Washington, D.C., (1993): pp 199–219., both of which are incorporated herein by reference in their entirety. The triple detector results were with polystyrene standard reference material NBS 706 (National Bureau of Standards), or DOW chemical polystyrene resin 1683 to the polystyrene column calibration results from the polystyrene narrow standards calibration curve.

Verification of detector alignment and calibration was made by analyzing a linear polyethylene homopolymer with a polydispersity of approximately 3 and a molecular weight of 115,000. The slope of the resultant Mark-Houwink plot of the linear homopolymer was verified to be within the range of 0.725 to 0.730 between 30,000 and 600,000 molecular weight. The verification procedure included analyzing a minimum of 3 injections to ensure reliability. The polystyrene standard peak molecular weights were converted to polyethylene molecular weights using the method of Williams and Ward described previously. The agreement for $M_w$ and $M_n$ between the polystyrene calibration method and the absolute triple detector method were verified to be within 5% for the polyethylene homopolymer.

The intrinsic viscosity data was obtained in a manner consistent with the Haney 4-capillary viscometer described in U.S. Pat. 4,463,598, incorporated herein by reference. The molecular weight data was obtained in a manner consistent with that published by Zimm (Zimm, B. H., J. Chem. Phys., 16, 1099 (1948)) and Kratochvil (Kratochvil, P., *Classical Light Scattering from Polymer Solutions,* Elsevier, Oxford, N.Y. (1987)). The overall injected concentration used for the determination of the intrinsic viscosity and molecular weight were obtained from the sample refractive index area and the refractive index detector calibration from the linear polyethylene homopolymer and all samples were found to be within experimental error of the nominal concentration. The chromatographic concentrations were assumed low enough to eliminate the need for a Huggin's constant (concentration effects on intrinsic viscosity) and second virial coefficient effects (concentration effects on molecular weight).

For samples that contain comonomer, the measured g' represents effects of both long chain branching as well as short chain branching due to comonomer. For samples that have copolymer component(s), the contribution from short chain branching structure should be removed as taught in Scholte et al., discussed above. If the comonomer is incorporated in such a manner that the short chain branching structure is proven both equivalent and constant across both the low and high molecular weight components, then the difference in long chain branching index between 100,000 and 500,000 may be directly calculated from the copolymer sample. For cases where the comonomer incorporation cannot be proven both equivalent and constant across both the high and low molecular weight components, then preparative GPC fractionation is required in order to isolate narrow molecular weight fractions with polydispersity lower than 1.4. $^{13}$C NMR is used to determine the comonomer content of the preparative fractions.

Alternatively, a calibration of g' against comonomer type for a series of linear copolymers of the same comonomer is established in order to correct for comonomer content, in cases where comonomer incorporation cannot be shown to be both equivalent and constant across both the high and low molecular weight components. The g' value is then analyzed for the isolated fraction corresponding to the desired molecular weight region of interest and corrected via the comonomer calibration function to remove comonomer effects from g'. Estimation of number of branches per molecule on the high molecular weight species.

The number of long chain branches per molecule was also determined by GPC methods. High temperature GPC results (HTGPC) were compared with high temperature GPC light scattering results (HTGPC-LS). Such measurements can be conveniently recorded on a calibrated GPC system containing both light scattering and concentrations detectors which allows the necessary data to be collected from a single chromatographic system and injection. These measurements assume that the separation mechanism by HTGPC is due to the longest contiguous backbone segment through a polymer molecule (i.e. the backbone). Therefore, it assumes that the molecular weight obtained by HTGPC produces the backbone molecular weight (linear equivalent molecular weight) of the polymer. The average sum of the molecular weight of long chain branches added to the backbone at any chromatographic data slice is obtained by subtracting the backbone molecular weight estimate from the absolute molecular weight obtained by HTGPC-LS. If there is a significant comonomer content differential between the high and low molecular weight species in the polymer, it is necessary to subtract the weight of the comonomer from the HTGPC-LS results using knowledge of the high molecular weight catalyst.

The average molecular weight of the long chain branches that are added to the high molecular weight polymer is assumed to be equivalent to the number-average molecular weight of the bulk polymer (considering both high and low molecular weight species). Alternatively, an estimate of the average molecular weight of a long chain branch can be obtained by dividing the weight-average molecular weight of the low molecular weight species (obtained through de-convolution techniques) by a polydispersity estimate of the low molecular weight species. If there is a significant comonomer content differential between the high and low molecular weight species in the polymer, it is necessary to add or subtract the differential total weight of comonomer from the number average molecular weight results first using knowledge of the comonomer incorporation for the low molecular weight catalyst.

The number of long chain branches at any chromatographic slice is estimated by dividing the sum of the molecular weight of the total long chain branches by the average molecular weight of the long chain branch. By averaging this number of long chain branches weighted by the deconvoluted high molecular weight peak, the average amount of long chain branching for the high molecular weight species is determined. Although assumptions are made in regard to GPC separation and the fact that the polymer backbone can be extended due to a long chain branch incorporating near to the chain ends of the backbone segment, we have found this measure of number of branches to be very useful in predicting resin performance.

Additional properties of embodiments of polymers described herein are disclosed in contemporaneously files U.S. patent application filed Mar. 15, 2002, by Alexander W. DeGroot, et al., entitled "High Melt Strength Polymers and Method of Making Same," incorporated herein by reference in its entirety.

Tetrahydrofuran (THF), diethyl ether, toluene, hexane, and ISOPAR E (obtainable from Exxon Chemicals) were used following purging with pure, dry nitrogen and passage through double columns charged with activated alumina and alumina supported mixed metal oxide catalyst (Q-5 catalyst, available from Engelhard Corp). All syntheses and handling of catalyst components were performed using rigorously dried and deoxygenated solvents under inert atmospheres of nitrogen or argon, using either glove box, high vacuum, or Schlenk techniques, unless otherwise noted. Rac-(dimethylsilylbis(indenyl)hafnium dimethyl was purchased from Albemarle Corporation.

Synthesis of $(C_5Me_4SiMe_2N^tBu)Ti(\eta^4$-1,3-pentadiene) (Catalyst A)

Catalyst A can be synthesized according to Example 17 of U.S. Pat. No. 5,556,928, the entire disclosure of which patent is incorporated herein by reference.

Synthesis of dimethylsilyl(2-methyl-s-indacenyl)(t-butylamido) titanium 1,3-pentadiene (Catalyst B)

Catalyst B can be synthesized according to Example 23 of U.S. Pat. No. 5,965,756, the entire disclosure of which patent is incorporated herein by reference.

Synthesis of (N-(1,1-dimethylethyl)-1,1-di-p-tolyl-1-((1,2,3,3a,7a-η)-3-(1,3-dihydro-2H-isoindol-2-yl)-H-inden-1-yl)silanaminato-(2-)-N-)dimethyltitanium (Catalyst C)

(1) Preparation of dichloro(N-(1,1-dimethylethyl)-1,1-di(p-tolyl)-1-((1,2,3,3a,7a-,η)-3-(1,3-dihydro-2H-isoindol-2-yl)-1H-inden-1-yl)silanaminato-(2-)-N-)-titanium

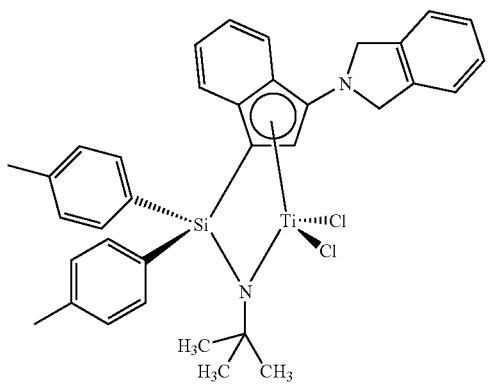

(A), Preparation of N-(tert-butyl)-N-(1,1-p-tolyl)-1-(3-(1,3-dihydro-2H-isoindol-2-yl)-1H-indenyl)silyl) amine

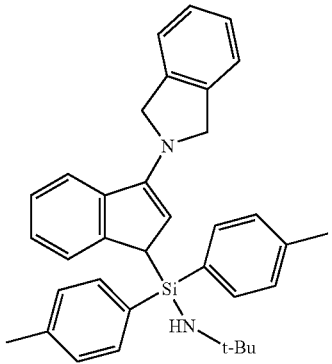

To a 1.70 g (5.35 mmol) of N-(tert-butyl)-N-(1-chloro-1,1-di(3-p-tolyl)silylamine dissolved in 20 mL of THF was added 1.279 g (5.35 mmol) of 1-(1H-3-indenyl)-1-(2,3-dihydro-1H-isoindolinyl) lithium salt dissolved in 20 mL of THF. After the addition, the reaction mixture was stirred for 9 h and then solvent was removed under reduced pressure. The residue was extracted wit 40 mL of hexane and filtered. Solvent was removed under reduced pressure giving 2.806 of product as a gray solid.

$^1$H ($C_6D_6$) δ: 1.10 (s, 9H), 2.01 (s, 3H), 2.08 (s, 3H), 4.12 (d, 1H, $^3J_{H-H}$=1.5 Hz), 4.39 (d, 1H, $^2J_{H-H}$=11.1 Hz), 4.57 (d, 1H, $^2J_{H-H}$=11.7 Hz), 5.55 (d, 1H, $^3J_{H-H}$=2.1 Hz), 6.9–7.22 (m, 10H), 7.56 (d, 1H, $^3J_{H-H}$=7.8 Hz), 7.62 (d, 1H, $^3J_{H-H}$=6.9 Hz), 7.67 (d, 1H, $^3J_{H-H}$=7.8 Hz), 7.83 (d, 1H, $^3J_{H-H}$=7.8 Hz).
$^{13}$C{$^1$H} ($C_6D_6$) δ: 21.37, 21.43, 33.78, 41.09, 50.05, 56.56, 104.28, 120.98, 122.46, 123.84, 124.71, 124.84, 126.98, 128.29, 128.52, 129.05, 132.99, 133.68, 135.08, 135.90, 136.01, 138.89, 139.05, 139.09, 141.27, 146.39, 148.48.

(B) Preparation of N-(tert-butyl)-N-(1,1-p-tolyl)-1-(1,3-dihydro-2H-isoindol-2-yl)-1H-indenyl)silyl) amine, dilithium salt To a 50 mL hexane solution containing 2.726 g (5.61 mmol) of the N-(tert-butyl)-N-(1,1-p-tolyl)-1-(3-(1,3-dihydro-2H-isoindol-2-yl)-1H-indenyl)silyl)amine was added 7.4 mL of 1.6 M n-BuLi solution. During addition of the n-BuLi, a yellow precipitate appeared. After stirring for 6 h, the yellow precipitate was collected on a frit, washed with 2×25 mL of hexane, and dried under reduced pressure to give 2.262 g of the product as a yellow powder.

$^1$H ($C_6D_6$) δ: 1.17 (s, 9H), 2.30 (s, 6H), 4.51 (s, 4H), 6.21 (s, 1H), 6.47 (m, 2H), 6.97 (d, 4H, $^3J_{H-H}$=8.1 Hz), 7.15 (m, 2H), 7.23 (m, 2H), 7.50 (m, 1H), 7.81 (d, 4H, $^3J_{H-H}$=7.8 Hz), 8.07 (d, 1H, $^3J_{H-H}$=7.2 Hz). $^{13}$C{$^1$H} ($C_6D_6$) δ: 21.65, 38.83, 52.46, 59.82, 95.33, 112.93, 114.15, 115.78, 118.29, 122.05, 122.60, 124.16, 124.78, 126.94, 127.30, 133.06, 134.75, 137.30, 141.98, 148.17.

(C) Preparation of dichloro(N-(1,1-dimethylethyl)-1,1-di-p-tolyl-1-((1,2,3,3a,7a-η)-3-(1,3-dihydro-2H-isoindol-2-yl)-1H-inden-1-yl)silanaminato-(2-)-N-) titanium In the drybox 1.552 g (4.19 mmol) of TiCl$_3$(THF)$_3$ was suspended in 20 mL of THF. To this solution, 2.206 g (4.19 mmol) of N-(tert-butyl)-N-(1,1-p-tolyl)-1-(1,3-dihydro-2H- isoindol-2-yl)-1H-indenyl)silyl)amine, dilithium salt dissolved in 30 mL of THF was added within 1 min. The solution was then stirred for 60 min. After this time, 0.76 g of $PbCl_2$ (2.75 mmol) was added and the solution was stirred for 60 min. The THF was then removed under reduced pressure. The residue was first extracted with 60 mL of methylene chloride and filtered. Solvent was removed under reduced pressure leaving a black crystalline solid. Hexane was added (30 mL) and the black suspension was stirred for 10 hour. The solids were collected on a frit, washed with 30 mL of hexane and dried under reduced pressure to give 2.23 g of the desired product as a deep purple solid.

$^1$H (THF-$d_8$) δ: 1.40 (s, 9H), 2.46 (s, 3H), 2.48 (s, 3H), 5.07 (d, 2H, $^2J_{H-H}$=12.3 Hz), 5.45 (d, 2H, $^2J_{H-H}$=12.6 Hz), 5.93 (s, 1H), 6.95 (d, 1H, $^3J_{H-H}$=9.0 Hz), 7.08 (d, 1H, $^3J_{H-H}$=7.8 Hz), 7.15–7.4 (m, 9H), 7.76 (d, 1H, $^3J_{H-H}$=7.8 Hz), 7.82 (d, 1H, $^3J_{H-H}$=7.5 Hz), 8.05 (d, 1H, $^3J_{H-H}$=8.7 Hz). $^{13}$C{$^1$H} (THF-$d_8$) δ: 21.71, 21.76, 33.38, 56.87, 61.41, 94.5, 107.95, 122.86, 125.77, 126.68, 127.84, 127.92, 128.40, 128.49, 129.36, 129.79, 131.23, 131.29, 135.79, 136.43, 136.73, 141.02, 141.22, 150.14.

(2) Preparation of (N-(1,1-dimethylethyl)-1,1-di-p-tolyl-1-((1,2,3,3a,7a-η)-3-(1,3-dihydro-2H-isoindol-2-yl)-1H-inden-1-yl)silanaminato-(2-)-N-)dimethyltitanium

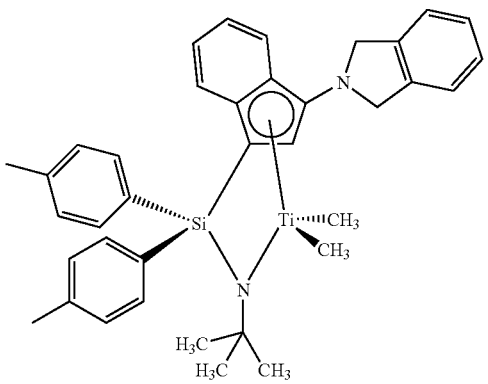

In the drybox 0.50 g of dichloro(N-(1,1-dimethylethyl)-1,1-di-p-tolyl-1-((1,2,3,3a,7a-η)-3-(1,3-dihydro-2H-isoindol-2-yl)-1H-inden-1yl-)silanaminato-(2-)-N-)titanium complex (0.79 mmol) was dissolved in 30 mL of diethyl ether. To this solution, 1.14 mL (1.6 mmol) of MeLi (1.6 M in ether) was added dropwise while stirring over a 1 minute period. After the addition of MeLi was completed, the solution was stirred for 1.5 hour. Diethyl ether was removed under reduced pressure and the residue extracted with 45 mL of hexane. Hexane was removed under reduced pressure giving a red crystalline material. This solid was dissolved in about 7 mL of toluene and 25 mL of hexane, filtered, and the solution was put into the freezer (–27° C.) for 2 days. The solvent was then decanted and the resulting crystals were washed with cold hexane and dried under reduced pressure to give 156 mg of product.

$^1$H ($C_6D_6$) δ: 0.25 (s, 3H), 0.99 (3H), 1.72 (s, 9H), 2.12 (s, 3H), 2.15 (s, 3H), 4.53 (d, 2H, $^2J_{H-H}$=11.7 Hz), 4.83 (d, 2H, $^2J_{H-H}$=11.7 Hz), 5.68 (s, 1H), 6.72 (dd, 1H, $^3J_{H-H}$=8.6 Hz, $^3J_{H-H}$=6.6 Hz), 6.9–7.2 (m, 11H), 7.30 (d, 1H, $^3J_{H-H}$=8.6 Hz).7.71 (d, 1H, $^3J_{H-H}$=8.5 Hz), 7.93 (d, 1H, $^3J_{H-H}$=7.8 Hz), 8.11 (d, 1H, $^3J_{H-H}$=7.8 Hz). $^{13}$C{$^1$H} ($C_6D_6$) δ: 21.45, 21.52, 35.30, 50.83 56.03, 56.66, 57.65, 83.80, 105.64, 122.69, 124.51, 124.56, 125.06, 125.35, 127.33, 128.98, 129.06, 129.22, 133.51, 134.02, 134.62, 136.49, 136.84, 137.69, 139.72, 139.87, 143.84.

Synthesis of (1H-cyclopenta[1]phenanthrene-2-yl) dimethyl(t-butylamido)silane titanium dimethyl (Catalyst D)

Catalyst D can be synthesized according to Example 2 of U.S. Pat. No. 6,150,297, the entire disclosure of which patent is incorporated herein by reference.

Synthesis of rac-[dimethylsilylbis(1-(2-methyl4-phenyl)indenyl)]zirconium (1,4-diphenyl-1,3-butadiene) (Catalyst E)

Catalyst E can be synthesized according to Example 15 of U.S. Pat. No. 5,616,664, the entire disclosure of which patent is incorporated herein by reference.

Synthesis of rac-[1,2-ethanediylbis(1-indenyl)]zirconium (1,4-diphenyl-1,3-butadiene) (Catalyst F)

Catalyst F can be synthesized according to Example 11 of U.S. Pat. No. 5,616,664.

Synthesis of bis(n-butylcyclopentadienyl)zirconium dimethyl

Bis(n-butylcyclopentadienylzirconium dichloride can be purchased from Boulder Scientific. In a drybox, 12.00 g of bis(n-butylcyclopentadienylzirconium dichloride was dissolved in 100 mL of diethyl ether in an 8 oz jar. 20.765 mL of 3.0 M methyl magnesium chloride in THF (available from Aldrich Chemical Company) was added dropwise via syringe with stirring. After stirring for 30 minutes, the volatiles were removed under vacuum. The residue was extracted with hexane, and filtered through Celite. The hexane was stripped under vacuum to afford a brown liquid, which was identified by $^1$H and $^{13}$C NMR spectroscopy. The yield was 7.6 g.

Synthesis of (N-(1,1-dimethylethyl)-1,1-dimethyl-1-((1,2,3,3a,7a-η)-3-(1-pyrrolidinyl)-1H-inden-1-yl) silanaminato(2-)-N)((2,3,4,5-η)-2,4-pentadiene)titanium (Catalyst G)

Catalyst G can be synthesized according to Example 21 of WO 98/06727, the entire disclosure of which patent is herein incorporated by reference.

Synthesis of Armeenium Borate [methylbis(hydrogenatedtallowalkyl)ammonium tetrakis (pentafluoro phenyl) borate]

Armeenium borate can be prepared from ARMEEN® M2HT (available from Akzo-Nobel), HCl, and Li [B($C_6F_5$)$_4$] according to Example 2 of U.S. Pat. No. 5,919,983, the entire disclosure of which is herein incorporated by reference.

Preparation of Antioxidant/Stabilizer Additive solution: The additive solution was prepared by dissolving 6.66 g of Irgaphos 168 and 3.33 g of Irganox 1010 in 500 mL of toluene. The concentration of this solution is therefore 20 mg of total additive per 1 mL of solution.

General 1 Gallon Solution Semi-Batch Reactor Ethylene/1-Octene Copolymerization Procedure Solution semi-batch reactor copolymerizations of ethylene and octene are carried out in a 1 gallon metal autoclave reactor equipped with a mechanical stirrer, a jacket with circulating heat transfer fluid, which can be heated or cooled in order to control the internal reactor temperature, an internal thermocouple, pressure transducer, with a control computer and several inlet and output valves. Pressure and temperature are continuously monitored during the polymerization reaction. Measured amounts of 1-octene are added to the reactor containing about 1442 g Isopar E as solvent. The reactor is heated up to the reaction temperature with stirring (typically about 1,000 rpm or higher) and then pressurized with ethylene at the desired pressure until the solvent is saturated. The active catalyst is prepared in a drybox by syringing together solutions of the appropriate catalyst, cocatalyst, and any scavenger (if desired) components with additional solvent to give a total volume which can be conveniently added to the reactor (typically 10–20 mL total). If desired, a portion of the scavenger (typically an aluminum alkyl, alumoxane, or other alkyl-aluminum compound) may be added to the reactor separately prior to the addition on the active catalyst solution. The active catalyst solution is then transferred by syringe to a catalyst addition loop and injected into the reactor over approximately 4 minutes using a flow of high pressure solvent. The polymerization is allowed to proceed for the desired length of time while feeding ethylene on demand to maintain a constant pressure. The amount of ethylene consumed during the reaction is monitored using a mass flowmeter. Immediately following the desired polymerization time, the polymer solution is then dumped from the reactor using a bottom-valve through a heated transfer line into a nitrogen-purged glass kettle containing 10–20 mL of isopropanol, which acts as a catalyst kill. An aliquot of the additive solution described above is added to this kettle and the solution stirred thoroughly (the amount of additive used is chosen based on the total ethylene consumed during the polymerization, and is typically targeted at a level of about 1000–2000 ppm). The polymer solution is dumped into a tray, air dried overnight, then thoroughly dried in a vacuum oven for two days. The weights of the polymers are recorded and the efficiency calculated as grams of polymer per gram of transition metal. Because the polymerization of ethylene and alpha olefins is quite exothermic, there is usually an increase in the temperature (an exotherm) of the reaction solution which is observed after the active catalyst is added. The process control computer can be used to keep the reaction temperature relatively constant during the polymerization reaction by cooling the jacket of the reactor, but some deviation from the set point is usually observed, especially for catalysts having a relatively fast initial rate of polymerization. If too much active catalyst is added to the semi-batch reactor, the exotherm can be quite large, and the monomer concentrations, especially the ethylene concentration, can deviate significantly from the equilibrium concentration. Because the polymer molecular weight and the comonomer incorporation depend significantly on the ethylene concentration, it is important to control the exotherm. For the semi-batch reactor polymerizations reported herein, the exotherm was generally kept below 5° C. or less. Various catalysts differ significantly in their rates of polymerization and thus, the amount of exotherm. The exotherm can be controlled by adjusting the amount or rate of addition of the catalyst.

Example 1

Copolymerization of ethylene and 1-octene using Catalyst A

Using the general solution semi-batch reactor polymerization procedure described above, 25 g of 1-octene was added along with 1442 g of ISOPAR-E. This was heated to 165° C., and saturated with ethylene at about 169 psi total reactor pressure. A catalyst solution was prepared by combining solutions of Catalyst A, Armeenium borate, and MMAO-3A to give 6 μmoles of Ti, 7.2 μmoles of Armeenium borate, and 30 μmoles of Al. The catalyst solution was added to the reactor as described in the general procedure. After 1.7 minutes reaction time, the bottom valve was opened and the reactor contents transferred to the glass kettle which contained isopropanol. The additive solution was added and the polymer solution was stirred to mix well. The contents were poured into a glass pan, cooled and allowed to stand in a hood overnight, and dried in a vacuum oven for 2 days. The isolated polymer yield was 46.4 g. The product density was 0.9225 g/mL, the melt index was 48, the Mw was 36,900, and the Mn was 13,900. $^1$H NMR analysis indicated that there were 0.175 vinyl groups per 1,000 C, 0.402 cis & trans per 1,000 C, 0.610 vinylidene per 1,000 C, which means that $R_v$ is 0.18. The mole % octene was 4%.

Example 2

Copolymerization of ethylene and 1-octene using Catalyst B

Using the general solution semi-batch reactor polymerization procedure described above, 25 g of 1-octene was added along with 1442 g of ISOPAR-E. This was heated to 165° C., and saturated with ethylene at about 166 psi total reactor pressure. A catalyst solution was prepared by combining solutions of Catalyst B, Armeenium borate, and MMAO-3A to give 6 μmoles of Ti, 7.2 μmoles of Armeenium borate, and 30 μmoles of Al. The catalyst solution was added to the reactor as described in the general procedure. After 3 minutes reaction time, the bottom valve was opened and the reactor contents transferred to the glass kettle which contained isopropanol. The additive solution was added and the polymer solution was stirred to mix well. The contents were poured into a glass pan, cooled and allowed to stand in a hood overnight, and dried in a vacuum oven for 2 days. The isolated polymer yield was 38 g. The product density was 0.9168 g/mL, the melt index was 1.6, the Mw was 73,400, the Mn was 27,500. $^1$H NMR analysis indicated that there were 0.079 vinyl groups per 1,000 C, 0.2045 cis & trans per 1,000 C, 0.1337 vinylidene per 1,000 C, and $R_v$ is 0.19. The mole % octene was 3%.

Example 3

Copolymerization of ethylene and 1-octene using Catalyst C

Using the general solution semi-batch reactor polymerization procedure described above, 25 g of 1-octene was added along with 1442 g of ISOPAR-E. This was heated to 165° C., and saturated with ethylene at about 166 psi total reactor pressure. A catalyst solution was prepared by combining solutions of Catalyst C, Armeenium borate, and MMAO-3A to give 1.5 μmoles of Ti, 1.8 μmoles of Armeenium borate, and 7.5 μmoles of Al. The catalyst solution was added to the reactor as described in the general procedure. After 2.6 minutes reaction time, the bottom valve was opened and the reactor contents transferred to the glass kettle which contained isopropanol. The additive solution was added and the polymer solution was stirred to mix well. The contents were poured into a glass pan, cooled and allowed to stand in a hood overnight, and dried in a vacuum oven for 2 days. The isolated polymer yield was 31.3 g. The product density was 0.9109 g/mL, the melt index was 0.084, the Mw was 168,000, the Mn was 72,400. $^1$H NMR analysis indicated that there were 0.034 vinyl groups per 1,000 C, 0.0967 cis & trans per 1,000 C, 0.0464 vinylidene per 1,000 C, and $R_v$ is 0.19. The mole % octene was 3%.

The results from Examples 1, 2 and 3 indicate that, under the reaction conditions described in these examples, Catalysts A, B, and C all have substantially the same octene incorporation. The ratio of Mw of Catalyst C to Catalyst B ($M_{wH}/M_{wL}$) is 2.29. The ratio of Mw of Catalyst C to Catalyst A ($M_{wH}/M_{wL}$) is 4.55 at the reaction conditions described in these examples. The ratio of Mw of Catalyst B to Catalyst A ($M_{wH}/M_{wL}$) is 1.99. These examples demonstrate how a particular catalyst (Catalyst B in this case) can be either a low Mw catalyst or a high Mw catalyst, depending on the selection of the other catalyst.

Example 4

Copolymerization of ethylene and 1-octene using rac-(Dimethylsilylbis(indenyl))hafnium dimethyl Using the general solution semi-batch reactor polymerization procedure described above, 25 g of 1-octene was added along with 1442 g of ISOPAR-E. This was heated to 165° C., and saturated with ethylene at about 166 psi total reactor pressure. A catalyst solution was prepared by combining solutions of rac-dimethylsilylbis(indenyl)hafnium dimethyl, Armeenium borate, and MMAO-3A to give 4.5 μmoles of Hf, 5.4 μmoles of Armeenium borate, and 22.5 μmoles of Al. The catalyst solution was added to the reactor as described in the general procedure. After 2.1 minutes reaction time, the bottom valve was opened and the reactor contents transferred to the glass kettle which contained isopropanol. The additive solution was added and the polymer solution was stirred to mix well. The contents were poured into a glass pan, cooled and allowed to stand in a hood overnight, and dried in a vacuum oven for 2 days. The isolated polymer yield was 68.8 g. The product density was 0.9038 g/mL, the melt index was 246, the Mw was 25,300, the Mn was 8,900. $^1$H NMR analysis indicated that there were 0.171 vinyl groups per 1,000 C, 1.09 cis & trans per 1,000 C, 0.832 vinylidene per 1,000 C, and $R_v$ is 0.08. This example demonstrates the identification of a catalyst having a substantially lower $R_v$ than the catalysts in Examples 1–3.

Example 5

Copolymerization of ethylene and 1-octene using Catalyst D

Using the general solution semi-batch reactor polymerization procedure described above, 25 g of 1-octene was added along with 1442 g of ISOPAR-E. This was heated to 165° C., and saturated with ethylene at about 166 psi total reactor pressure. A catalyst solution was prepared by combining solutions of Catalyst D, Armeenium borate, and MMAO-3A to give 4.5 μmoles of Ti, 5.4 μmoles of Armeenium borate, and 22.5 μmoles of Al. The catalyst solution was added to the reactor as described in the general procedure. After 2.2 minutes reaction time, the bottom valve was opened and the reactor contents transferred to the glass kettle which contained isopropanol. The additive solution was added and the polymer solution was stirred to mix well. The contents were poured into a glass pan, cooled and allowed to stand in a hood overnight, and dried in a vacuum oven for 2 days. The isolated polymer yield was 50.6 g. The product density was 0.8865 g/mL, the melt index was 750, the Mw was 15,200, the Mn was 7,000. $^1$H NMR analysis indicated that there were 0.380 vinyl groups per 1,000 C, 0.972 cis & trans per 1,000 C, 0.955 vinylidene per 1,000 C, and $R_v$ is 0.16.

Example 6

General 1 Gallon Continuous Solution Ethylene/1-Octene Copolymerization Procedure Purified ISOPAR-E solvent, ethylene, hydrogen, and 1-octene are supplied to a 1 gallon reactor equipped with a jacket for temperature control and an internal thermocouple. The solvent feed to the reactor is measured by a mass-flow controller. A variable speed diaphragm pump controls the solvent flow rate and increases the solvent pressure to the reactor. The 1-octene feed is measured by a mass flow meter and the flow is controlled by a Research Control valve. The octene is mixed with the solvent stream at the suction of the solvent pump and are pumped to the reactor with the solvent. At the discharge of the pump, a side stream is taken to provide flush flows for the catalyst injection line and the reactor agitator. The remaining solvent is combined with ethylene and hydrogen and delivered to the reactor. The ethylene stream is measured with a mass flow meter and controlled with a Research Control valve. A mass flow controller is used to deliver hydrogen into the ethylene stream at the outlet of the ethylene control valve. The temperature of the solvent/monomer is controlled by use of a heat exchanger before entering the reactor. This stream enters the bottom of the reactor. The catalyst component solutions are metered using pumps and mass flow meters, and are combined with the catalyst flush solvent. This stream enters the bottom of the reactor, but in a different port than the monomer stream. The reactor is run liquid-full at 450 psig with vigorous stirring. The process flow is in from the bottom and out of the top. All exit lines from the reactor are steam traced and insulated. Polymerization is stopped with the addition of a small amount of water, and other additives and stabilizers can be added at this point. The stream flows through a static mixer and a heat exchanger in order to heat the solvent/polymer mixture. The solvent and unreacted monomers are removed at reduced pressure, and the product is recovered by extrusion using a devolatilizing extruder. The extruded strand is cooled under water and chopped into pellets. The operation of the reactor is controlled with a process control computer.

Ethylene/1-Octene Polymerization Using Catalyst A and Catalyst C

The general procedure for the 1 gallon continuous solution polymerization outlined above was employed. A catalyst solution containing 10.29 ppm Ti from Catalyst A and 1.71 ppm of Ti from Catalyst C was prepared and added to a 4 L catalyst-storage tank. This solution was combined in a continuous stream with a continuous stream of a solution containing Armeenium borate in ISOPAR E and a continuous stream of a solution of MMAO-3A in ISOPAR E to give a ratio of total Ti:B:Al of 1:1.2:6. The activated catalyst solution was fed continuously into the reactor at a rate sufficient to maintain the reactor temperature at approximately 160 degrees C. and an ethylene conversion of 95%. The polymer solution was continuously removed from the reactor exit and was contacted with a solution containing 100 ppm of water for each part of the polymer solution, and polymer stabilizers (i.e., 2333 ppm Irgaphos 168 and 1168 ppm Irganox 1010 per part of the polymer). The resulting exit stream was mixed, heated in a heat exchanger, and the mixture was introduced into a separator where the molten polymer was separated from the solvent and unreacted monomers. The resulting molten polymer was extruded and chopped into pellets after being cooled in a water bath. For this example, the ethylene concentration is about 0.8% of the total reactor contents by weight, the polymer concentration is about 16% of the reactor contents by weight, and the amount of hydrogen added to the reactor was 0.14 ppm by weight. Product samples were collected over 1 hour time periods, after which time the melt index and density was determined for each sample (generally about 5 pounds per hour). A total of 10 hourly samples were collected. A summary of the polymerization conditions and the physical properties of the resulting polymer are found in Table I. The values for efficiency, polymer density, $I_2$, and $I_{10}/I_2$ in Table I are the results of averaging the individual values for each of the 10 individual 1 hour samples.

Examples 7–9

Examples 7–9 were conducted similar to Example 6 except as otherwise noted in Table I below. For Example 7, 13 hourly samples were collected. For Example 8, 10 hourly samples were collected, and for Example 9, 7 hourly samples were collected.

TABLE I

Polymerization conditions and properties of resulting polymer

| Exmple | temperature, C. | ethylene flow, lb./hr | solvent. flow, lb/hr | octene flow, lb/hr | $H_2$ flow, sccm | ethylene conversion, % |
|---|---|---|---|---|---|---|
| 6 | 160.3 | 5.00 | 27.00 | 0.86 | 22.6 | 95.0 |
| 7 | 160.3 | 5.00 | 27.00 | 0.86 | 23.6 | 94.8 |
| 8 | 159.9 | 5.00 | 27.00 | 0.93 | 47.0 | 94.8 |
| 9 | 160.6 | 5.00 | 27.00 | 0.78 | 4.0 | 96.0 |

TABLE I-continued

Polymerization conditions and properties of resulting polymer

| Example | ppm Ti Cat A/ Cat C | efficiency, g/g Ti | production rate, lb/hr | polymer density, g/mL | $I_2$ | $I_{10}/I_2$ |
|---|---|---|---|---|---|---|
| 6 | 10.29/1.71 | 1,570,095 | 5.22 | 0.9221 | 0.61 | 18.3 |
| 7 | 10.29/1.71 | 1,505,411 | 5.20 | 0.9223 | 0.73 | 17.8 |
| 8 | 8.3/3.7 | 1,603,527 | 5.22 | 0.9214 | 0.65 | 15.0 |
| 9 | 11.0/1.0 | 966,089 | 5.02 | 0.9221 | 0.70 | 18.3 |

| Example | Wt % ethylene | Wt % polymer | ppm H2 of reactor feed | Mw | Mn |
|---|---|---|---|---|---|
| 6 | 0.76 | 15.89 | 0.14 | 83,600 | 19,200 |
| 7 | 0.79 | 15.82 | 0.14 | 85,300 | 19,700 |
| 8 | 0.79 | 15.85 | 0.28 | 84,100 | 17,600 |
| 9 | 0.61 | 15.31 | 0.02 | 79,800 | 20,300 |

Examples 10–13

For Example 10, the series of 10 continuous solution polymerization hourly samples from Example 6 were combined and mixed together to give a larger sample (approximately 50 pounds). Example 11 is the result of combining the hourly samples from Example 7. Example 12 is the result of combining the hourly samples from Example 8, and example 13 is the result of combining and mixing the hourly samples from Example 9. Prior to combining the individual samples, a GPC was obtained for each hourly sample. Each GPC was deconvoluted to give an estimate of the polymer split (the weight fraction of high $M_w$ polymer) and the $M_w$ for each polymer component. The average splits, and average deconvoluted $M_w$ and $M_n$ are shown below in Table II.

TABLE II

Deconvoluted Polymer Properties

| Example | Split | $M_w$ of High MW Fraction | $M_n$ of High MW Fraction | $M_w$ of Low MW Fraction | $M_n$ of Low MW Fraction | $M_{wH}/M_{wL}$ |
|---|---|---|---|---|---|---|
| 10 | 0.34 | 201,000 | 84,500 | 39,700 | 16,400 | 5.06 |
| 11 | 0.31 | 205,000 | 88,100 | 39,500 | 15,300 | 5.19 |
| 12 | 0.50 | 158,000 | 68,400 | 27,100 | 10,600 | 5.83 |
| 13 | 0.17 | 254,000 | 116,000 | 52,500 | 17,600 | 4.84 |

The ethylene/1-octene interpolymers from Examples 10–13 were characterized by numerous techniques. Table III summarizes the physical properties of the four polymers obtained in this study. Also included in Table III for comparison are data for LDPE 682I and LDPE 170A, which are commercial free-radical LDPE resins available from The Dow Chemical Company.

TABLE III

Polymer Characterization Data

| Resin | | Example 11 | Example 12 | Example 13 | Example 10 | LDPE 682I | LDPE 170 |
|---|---|---|---|---|---|---|---|
| Density | grams/cc | 0.9227 | 0.9218 | 0.9224 | 0.9226 | 0.9211 | 0.9225 |
| $I_5$ | | 3.53 | 2.49 | 3.64 | 2.70 | 2.38 | 2.96 |
| $I_{10}$ | g/10 min | 12.63 | 9.31 | 12.85 | 11.05 | 8.25 | 9.86 |

TABLE III-continued

Polymer Characterization Data

| Resin | | Example 11 | Example 12 | Example 13 | Example 10 | LDPE 682I | LDPE 170 |
|---|---|---|---|---|---|---|---|
| $I_2$ | g/10 min | 0.7287 | 0.6758 | 0.6714 | 0.6805 | 0.6923 | 0.5643 |
| $I_{10}/I_2$ | — | 17.3 | 13.8 | 19.1 | 16.2 | 11.9 | 17.5 |
| GPC Data | | | | | | | |
| Mw | — | 83,600 | 84,100 | 79,800 | 85,300 | 84,000 | 91,700 |
| Mp | — | 37,500 | 32,800 | 43,200 | 40,200 | 61,300 | 56,500 |
| Mn | — | 19,200 | 17,600 | 20,300 | 19,700 | 25,300 | 17,000 |
| Mw/Mn | — | 4.35 | 4.78 | 3.93 | 4.33 | 3.32 | 5.39 |
| Unsaturation by FTIR | | | | | | | |
| Methyls per 1000 C (FTIR) | — | 8.59 | 8.99 | 8.37 | 8.19 | 16.98 | 19.13 |
| Trans per 1000 C (FTIR) | — | 0.239 | 0.152 | 0.306 | 0.228 | 0.014 | 0.012 |
| Vinyls per 1000 C (FTIR) | — | 0.11 | 0.10 | 0.11 | 0.11 | 0.02 | 0.1850 |
| Weight % Comonomer | % | 7.74 | 8.02 | 7.50 | 7.36 | — | — |
| Melt Strength | cN | 5.0 | 5.0 | 5.0 | 5.0 | 18.0 | |
| DSC-Cool | | | | | | | |
| Peak | C | 102.40 | 101.00 | 102.55 | 102.48 | 96.99 | 96.55 |
| Heat fusion | J/g | 146.10 | 147.90 | 147.10 | 146.10 | 139.60 | 139.60 |
| DSC-Heat | | | | | | | |
| 1 Peak | C | 115.32 | 114.50 | 115.29 | 115.80 | 111.70 | 112.18 |
| Heat fusion | J/g | 150.40 | 152.30 | 152.90 | 146.60 | 146.30 | 146.20 |
| CRYSTAF | | | | | | | |
| Peak | C | 89.8 | 69.8 | 69.9 | 70.7 | 88.9 | 77.0 |
| Purge | % | 1.7 | 3.0 | 2.7 | 2.2 | 1.3 | 3.9 |
| High Density | % | 97.7 | 93.9 | 95.9 | 95.1 | 98.4 | 95.9 |
| ATREF | | | | | | | |
| 1 Peak | C | 88.0 | 87.0 | 85.0 | 88.0 | 84.0 | 80.0 |
| Purge | % | 12.4 | 12.9 | 8.1 | 9.6 | 14.0 | 9.6 |
| High Density | % | 82.9 | 82.7 | 64.5 | 81.9 | 80.5 | 63.3 |
| Shear Viscosity | | | | | | | |
| Eta (0.1000 Hz) | poise | 2.10E+05 | 1.51E+05 | 2.28E+05 | 1.68E+05 | 1.57E+05 | 2.04E+05 |
| Eta (0.1585 Hz) | poise | 1.80E+05 | 1.34E+05 | 1.94E+05 | 1.44E+05 | 1.44E+05 | 1.77E+05 |
| Eta (0.2512 Hz) | poise | 1.52E+05 | 1.16E+05 | 1.63E+05 | 1.21E+05 | 1.30E+05 | 1.52E+05 |
| Eta (0.3981 Hz) | poise | 1.27E+05 | 9.93E+04 | 1.36E+05 | 1.00E+05 | 1.16E+05 | 1.28E+05 |
| Eta (0.6310 Hz) | poise | 1.05E+05 | 8.37E+04 | 1.12E+05 | 8.27E+04 | 1.01E+05 | 1.06E+05 |
| Eta (1.0000 Hz) | poise | 8.62E+04 | 6.99E+04 | 9.22E+04 | 6.75E+04 | 8.68E+04 | 8.63E+04 |
| Eta (1.5850 Hz) | poise | 7.05E+04 | 5.80E+04 | 7.53E+04 | 5.50E+04 | 7.33E+04 | 6.96E+04 |
| Eta (2.5120 Hz) | poise | 5.74E+04 | 4.79E+04 | 6.11E+04 | 4.46E+04 | 6.10E+04 | 5.56E+04 |
| Eta (3.9813 Hz) | poise | 4.66E+04 | 3.94E+04 | 4.94E+04 | 3.60E+04 | 5.00E+04 | 4.39E+04 |
| Eta (6.3101 Hz) | poise | 3.78E+04 | 3.23E+04 | 3.96E+04 | 2.89E+04 | 4.04E+04 | 3.43E+04 |
| Eta (10.001 Hz) | poise | 3.02E+04 | 2.63E+04 | 3.17E+04 | 2.30E+04 | 3.22E+04 | 2.67E+04 |
| Density | grams/cc | 0.9227 | 0.9218 | 0.9224 | 0.9226 | 0.9211 | 0.9225 |
| $I_5$ | | 3.53 | 2.49 | 3.64 | 2.70 | 2.38 | 2.96 |
| $I_{10}$ | g/10 min | 12.63 | 9.31 | 12.85 | 11.05 | 8.25 | 9.86 |
| $I_2$ | g/10 min | 0.7287 | 0.6758 | 0.6714 | 0.6805 | 0.6923 | 0.5643 |
| $I_{10}/I_2$ | — | 17.3 | 13.8 | 19.1 | 16.2 | 11.9 | 17.5 |
| Eta (15.850 Hz) | poise | 2.41E+04 | 2.12E+04 | 2.52E+04 | 1.83E+04 | 2.54E+04 | 2.05E+04 |
| Eta (25.121 Hz) | poise | 1.91E+04 | 1.70E+04 | 2.00E+04 | 1.44E+04 | 1.98E+04 | 1.57E+04 |
| Eta (39.813 Hz) | poise | 1.51E+04 | 1.35E+04 | 1.58E+04 | 1.13E+04 | 1.52E+04 | 1.19E+04 |
| Eta (63.101 Hz) | poise | 1.18E+04 | 1.05E+04 | 1.25E+04 | 8.82E+03 | 1.16E+04 | 8.94E+03 |
| Eta (100.00 Hz) | poise | 9.22E+03 | 8.11E+03 | 9.79E+03 | 6.82E+03 | 8.75E+03 | 6.68E+03 |

Figure 2A:
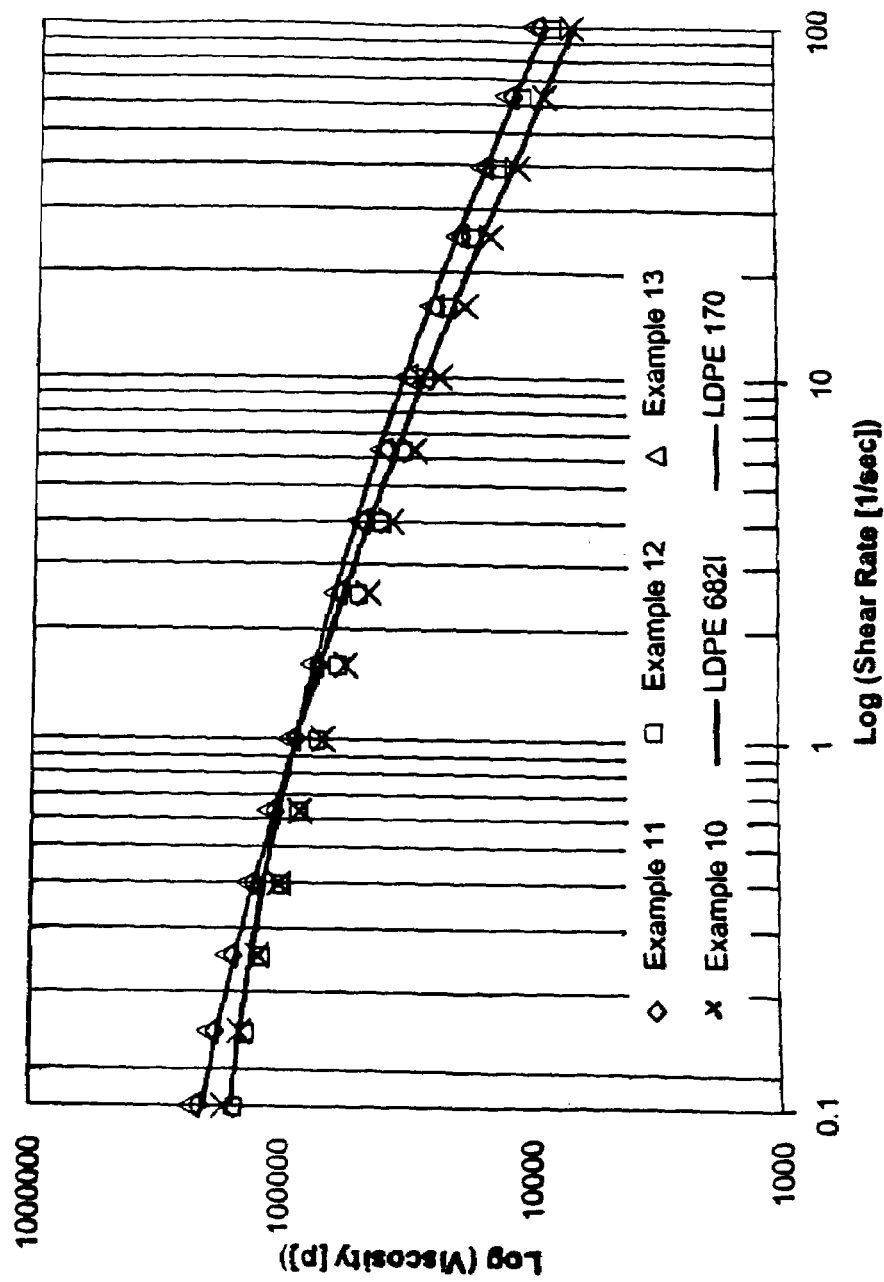
FIG. 2A is a plot of shear viscosity as a function of shear rate in the range of 0.1 to 100 l/sec.
Figure 2B:
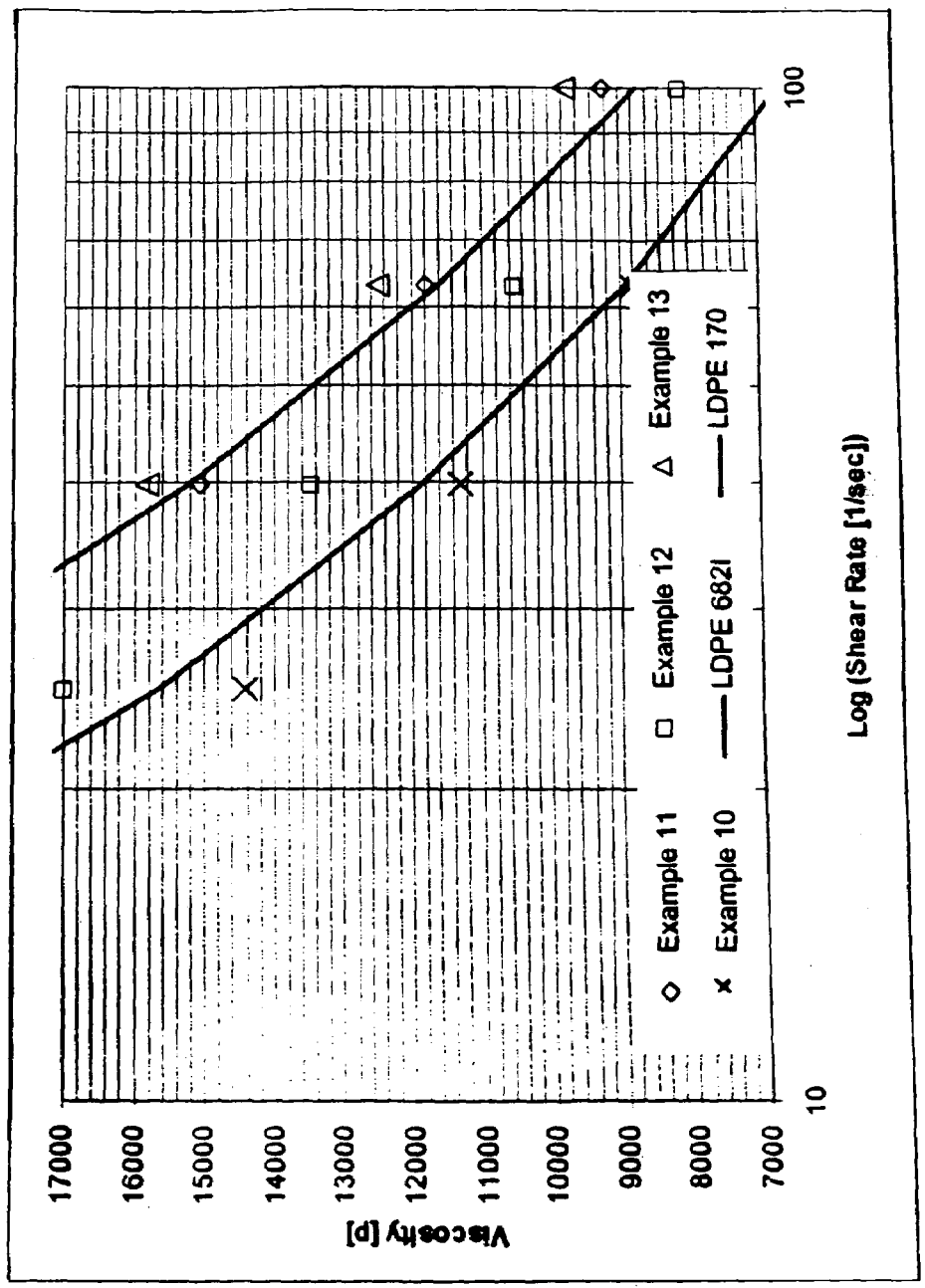
FIG. 2B is a plot of shear viscosity as a function of shear rate in the range of 10 to 100 l/sec.

FIGS. 2A and 2B are plots of shear viscosity data for each of the four ethylene interpolymers of Examples 10–13 as well as for LDPE 682I and LDPE 170. The shear viscosity data for each polymer were obtained from a Rheometrics mechanical spectrometer (model RMS 800). The dynamic shear viscosity for each sample was measured as a function of shear rate. The RMS 800 was used at 230° C. The percent strain was 10%, which is in the linear viscoelastic region, and a frequency sweep in the range of 0.1–100 rad/sec under a nitrogen purge was employed. The parallel plates were positioned such that they had a gap of about 1.5 to about 2 mm. As indicated by FIGS. 2A and 2B, the rheological behavior of the four polymers obtained from Runs 1–4 were substantially similar to LDPE 6821 and LDPE 170. This suggest that the interpolymers have processability characteristics substantially similar to low density polyethylene of similar melt index and density.

The melt strength of the ethylene interpolymers of Runs 11–13 were measured according to the procedure described below, along with LDPE 682I, LDPE 5271 and LDPE 5291 for comparison. Melt strength measurements were conducted on a Goettfert Rheotens attached to an Instron capillary rheometer. A polymer melt was extruded through a capillary die (flat die, 180 degree angle) with a capillary diameter of 2.1 mm and an aspect ratio (capillary length/capillary radius) of 20 at a constant plunger velocity. Therefore, the polymer melt was subjected to a constant apparent wall shear rate. The extruded melt was subsequently stretched by a pair of serrated wheels at a distance of 100 mm from the capillary exit. The rotational speed of the wheels was increased linearly with time while the draw down force is monitored. Melt strength was reported as the plateau force (cN) before the strand broke. The following conditions were used in the melt strength measurements.

Figure 3:
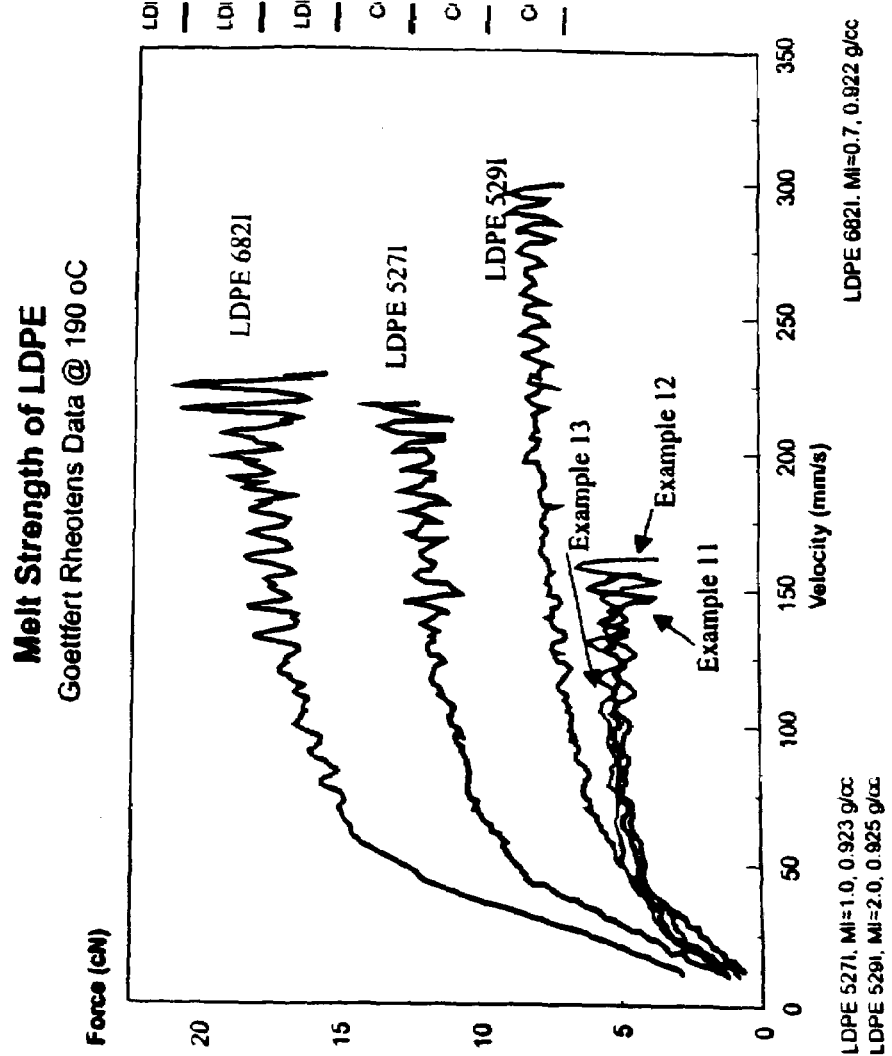
FIG. 3 is a plot of melt strength data for the polymers of FIG. 2.

Temperature=190° C.
plunger speed=0.423 mm/s
wheel acceleration=2.4 mm/s/s
capillary diameter=2.1 mm
capillary length=42 mm
barrel diameter=9.52 mm FIG. 3 shows the melt strength curves for the polymers. In this Figure, Run 1 Corresponds to Example 11, Run 2 corresponds to Example 12, and Run 3 corresponds to Example 13. As seen from FIG. 3, the melt strength of the ethylene interpolymers of Examples 11–13 are lower than that of low density polyethylene.

Blown films were made by simple bubble extrusion from the ethylene interpolymers as well as low density polyethylene for comparison. Conventional simple bubble extrusion (also known as hot blown film processes) are described, for example, in the Encyclopedia of Chemical Technology, Kirk-Othmer, 3rd. John Wiley and Sons, New York, 1981, Vol. 16, pp. 416–417 and Vol. 18, pp. 191–192, the disclosures of which are incorporated by reference herein. Table IV summarizes the film fabrication data obtained from the polymers.

TABLE IV

Film Fabrication Data

| Resin | | Example 11 | Example 12 | Example 13 | Example 10 | LDPE 6821 | LDPE 170 |
|---|---|---|---|---|---|---|---|
| Density | grams/cc | 0.9227 | 0.9218 | 0.9224 | 0.9226 | 0.9211 | 0.9225 |
| $I_5$ | | 3.53 | 2.49 | 3.64 | 2.70 | 2.38 | 2.96 |
| $I_{10}$ | g/10 min | 12.63 | 9.31 | 12.85 | 11.05 | 8.25 | 9.86 |
| $I_2$ | g/10 min | 0.7287 | 0.6758 | 0.6714 | 0.6805 | 0.6923 | 0.5643 |
| $I_{10}/I_2$ | — | 17.3 | 13.8 | 19.1 | 16.2 | 11.9 | 17.5 |
| Take-up Speed | | 50.2 | 50.3 | 50.4 | 50.3 | 45.4 | 50.3 |
| FLH | in | 11 | 11 | 11 | 11 | 11 | 11 |
| Extruder Setting | | 50 | 54 | 50 | 50 | 50 | 50 |
| Amps | | 29 | 27 | 28 | 30 | 30 | 22 |
| TPM | | 430 | 429 | 428 | 430 | 429 | 458 |
| Layflat | in | 12 | 12 | 12 | 12 | 12 | 12 |
| Thickness (gauge) | mil | 1.50 | 1.50 | 1.50 | 1.50 | 1.50 | 1.50 |
| Monolayer Film Data | | | | | | | |
| Clarity | % trans. | 96.5 | 95.7 | 96.6 | 93.5 | 88.1 | 87.2 |
| Gloss 20 | — | 52.23 | 53.02 | 51.85 | 43.95 | 47.74 | 30.48 |
| Gloss 45 | — | 60.51 | 60.21 | 61 | 58.29 | 70.57 | 59.57 |
| Haze | % | 8.67 | 8.80 | 8.22 | 9.193 | 5.803 | 9.577 |
| Dart A | grams | 194 | 232 | 176 | 190 | 132 | 104 |
| Dart B | grams | 126 | 134 | 112 | 114 | 100 | 100 |
| Elmendorf Tear A CD | grams | 625.6 | 758.4 | 579.2 | 596.8 | 254.4 | 148.8 |
| Elmendorf Tear A MD | grams | 201.6 | 305.6 | 132.8 | 190.4 | 128.0 | 124.8 |
| Elmendorf Tear B CD | grams | 704.0 | 760.0 | 622.4 | 728.0 | 190.4 | 107.2 |
| Elmendorf Tear B MD | grams | 225.6 | 254.4 | 142.4 | 164.8 | 120 | 97.6 |
| Density | grams/cc | 0.9227 | 0.9218 | 0.9224 | 0.9226 | 0.9211 | 0.9225 |
| $I_5$ | | 3.53 | 2.49 | 3.64 | 2.70 | 2.38 | 2.96 |
| $I_{10}$ | g/10 min | 12.63 | 9.31 | 12.85 | 11.05 | 8.25 | 9.86 |
| $I_2$ | g/10 min | 0.7287 | 0.6758 | 0.6714 | 0.6805 | 0.6923 | 0.5643 |
| $I_{10}/I_2$ | — | 17.3 | 13.8 | 19.1 | 16.2 | 11.9 | 17.5 |
| Norm. Elm. Tear A CD | grams/mil | 406.2 | 463.7 | 378.6 | 380.2 | 157.7 | 99.4 |
| Norm. Elm. Tear A MD | grams/mil | 127.9 | 204.8 | 89.8 | 116.1 | 74.7 | 86.1 |
| Norm. Elm. Tear B CD | grams/mil | 434.3 | 528.8 | 433.7 | 482.0 | 155.4 | 71.1 |
| Norm. Elm. Tear B MD | grams/mil | 145.0 | 254.4 | 92.19 | 104.13 | 69.47 | 67.0 |
| CD 1% Secant | psi | 36518.46 | 31697.12 | 35788.58 | 34909.26 | 30444.14 | 33276.52 |
| CD 2% Secant | psi | 30559.16 | 26707.56 | 29580.72 | 29388.9 | 26257.58 | 28666.24 |
| MD 1% Secant | psi | 33759.6 | 30164.16 | 33517.68 | 31673.16 | 25802.62 | 30126.68 |
| MD 2% Secant | psi | 28649.08 | 25965.7 | 28452.58 | 27587.1 | 22998.68 | 26521.04 |
| Break Load | lbs. | 15 | 16 | 13.64 | 15.3 | 12.82 | 8.26 |
| Elongation | in | 4.98 | 5.52 | 4.52 | 4.84 | 2.92 | 2.36 |
| Energy to Break | in-lbs. | 41.754 | 48.804 | 34.752 | 41.262 | 19.868 | 10.41 |
| Peak Load | lbs. | 14.994 | 15.994 | 13.634 | 15.296 | 12.806 | 8.248 |
| Puncture | ft.-lbs./cu. in. | 169.16 | 202.42 | 142.16 | 167.38 | 74.92 | 48.06 |
| Puncture Thickness | mil | 1.64 | 1.6 | 1.62 | 1.64 | 1.76 | 1.44 |
| CD % Elongation | % | 781.88 | 754.94 | 781.36 | 751.82 | 659.4 | 617.36 |
| CD Break Load | lbf. | 9.16 | 9.38 | 8.74 | 9.08 | 6.5 | 4.64 |
| CD Elongation @ Break | in. | 15.62 | 15.1 | 15.62 | 15.04 | 13.18 | 12.36 |

TABLE IV-continued

Film Fabrication Data

| Resin | | Example 11 | Example 12 | Example 13 | Example 10 | LDPE 6821 | LDPE 170 |
|---|---|---|---|---|---|---|---|
| CD Energy to Break | in.-lb. | 62.836 | 56.184 | 61.612 | 59.21 | 45.562 | 31.722 |
| CD Thickness | mil | 1.368 | 1.184 | 1.312 | 1.348 | 1.496 | 1.216 |
| CD Toughness | ft.-lbs./cu. in. | 3827.254 | 3953.284 | 3912.034 | 3660.764 | 2540.238 | 2176.178 |
| CD Ultimate Tensile | psi | 6711.9 | 7925.8 | 6658.36 | 6729.14 | 4352.1 | 3822.42 |
| CD Yield Load | lbf. | 2.52 | 2.1 | 2.44 | 2.48 | 2.4 | 2 |
| CD Yield Strength | psi | 1831.74 | 1778.2 | 1848.74 | 1836.4 | 1610.88 | 1640.52 |
| CD Yield Strain | % | 14.624 | 14.62 | 14.574 | 14.614 | 15.234 | 14.588 |
| MD % Elongation | % | 635.5 | 643.88 | 663.08 | 645.48 | 365.88 | 349.88 |
| MD Break Load | lbf. | 9.28 | 10.22 | 9.04 | 9.86 | 6.86 | 5.1 |
| MD Elongation @ Break | in. | 12.72 | 12.86 | 13.26 | 12.9 | 7.3 | 7 |
| MD Energy to Break | in.-lb. | 58.104 | 59.438 | 61.346 | 61.676 | 37.076 | 27.388 |
| MD Thickness | mil | 1.348 | 1.272 | 1.28 | 1.312 | 1.428 | 1.224 |
| MD Toughness | ft-lbs./cu. in. | 3594.442 | 3893.31 | 4000.144 | 3908.07 | 2165.65 | 1866.58 |
| DMD Ultimate Tensile | psi | 6889.28 | 8037.54 | 7076.54 | 7502.48 | 4786.9 | 4167.2 |
| MD Yield Load | lbf. | 2.36 | 2.22 | 2.28 | 2.34 | 2.5 | 2.12 |
| MD Yield Strength | psi | 1756.3 | 1746.26 | 1782.8 | 1783.28 | 1740.08 | 1738.36 |
| MD Yield Strain | % | 14.778 | 14.77 | 15.226 | 14.802 | 15.292 | 14.97 |
| Shrinkage | | | | | | | |
| MD (1) | % | 74.4 | 74.4 | 76.9 | 74.4 | 79.3 | 77.4 |
| MD (2) | % | 73.4 | 73.9 | 76.4 | 75.4 | 79.8 | 78.3 |
| CD (1) | % | 21.8 | 29.1 | 25.2 | 25.2 | 19.3 | 25.2 |
| CD (2) | % | 24.2 | 24.2 | 24.2 | 24.2 | 19.8 | 25.7 |
| Monolayer Heat Seal | | | | | | | |
| 110 | lbf. | 0.04 | 0.066 | 0.228 | 0.028 | 0.338 | 0.526 |
| 120 | lbf. | 3.518 | 3.574 | 3.494 | 4.126 | 4.292 | 3.524 |
| 130 | lbf. | 3.984 | 3.284 | 3.195 | 4.105 | 4.148 | 3.866 |
| 140 | lbf. | 3.706 | 2.896 | 3.196 | 3.212 | 4.872 | 3.532 |
| 150 | lbf. | 3.17 | 2.748 | 1.992 | 3.078 | 5.352 | 3.648 |
| HSIT (2 lb) | C | 107.47 | 106.92 | 115.28 | 109.39 | 104.23 | 105.11 |
| Density | grams/cc | 0.9227 | 0.9218 | 0.9224 | 0.9226 | 0.9211 | 0.9225 |
| $I_5$ | | 3.53 | 2.49 | 3.64 | 2.70 | 2.38 | 2.96 |
| $I_{10}$ | g/10 min | 12.63 | 9.31 | 12.85 | 11.05 | 8.25 | 9.86 |
| $I_2$ | g/10 min | 0.7287 | 0.6758 | 0.6714 | 0.6805 | 0.6923 | 0.5643 |
| $I_{10}/I_2$ | — | 17.3 | 13.8 | 19.1 | 16.2 | 11.9 | 17.5 |
| Hot Tack | | | | | | | |
| 110 | N | 0.151 | 0.183 | 0.162 | 0.173 | 0.188 | 0.25 |
| 120 | N | 0.478 | 1.512 | 0.733 | 0.844 | 1.195 | 0.798 |
| 130 | N | 2.436 | 2.731 | 2.695 | 2.727 | 1.361 | 1.075 |
| 140 | N | 3.307 | 3.455 | 1.857 | 1.994 | 1.313 | 0.959 |
| 150 | N | 1.602 | 1.571 | 1.362 | 1.434 | 1.198 | 0.702 |
| 160 | N | 2.413 | 1.692 | 1.369 | 0.495 | 1.166 | 0.524 |
| 170 | N | | | | | | |
| HTIT (2 N) | C | 127.77 | 124.00 | 126.46 | 126.14 | 168.49 | 163.39 |
| Ult HT | N | 3.307 | 3.455 | 2.695 | 2.727 | 1.361 | 1.075 |

Figure 4:
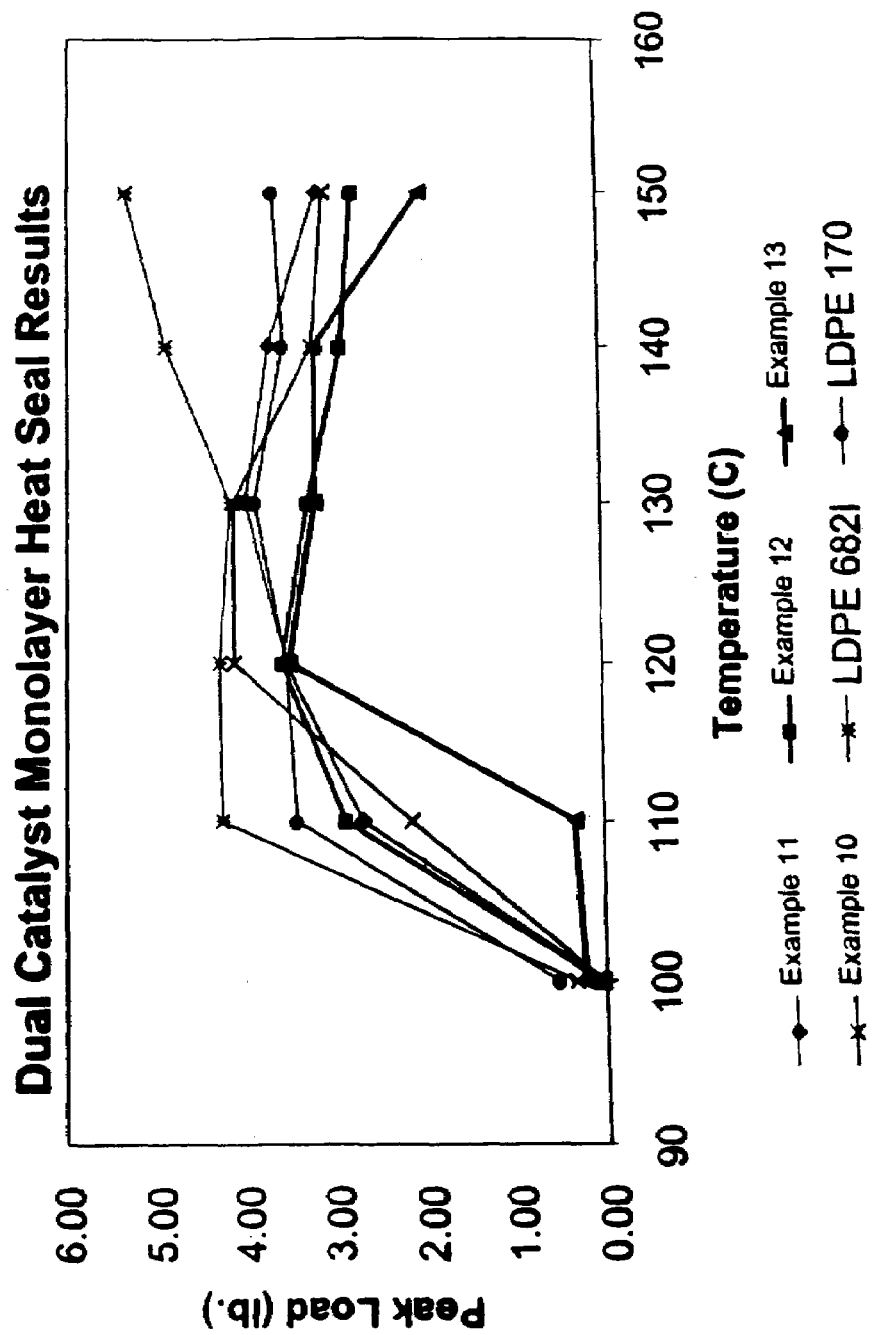
FIG. 4 is a plot of heat seal strength data for the polymers of FIG. 2.
Figure 5:
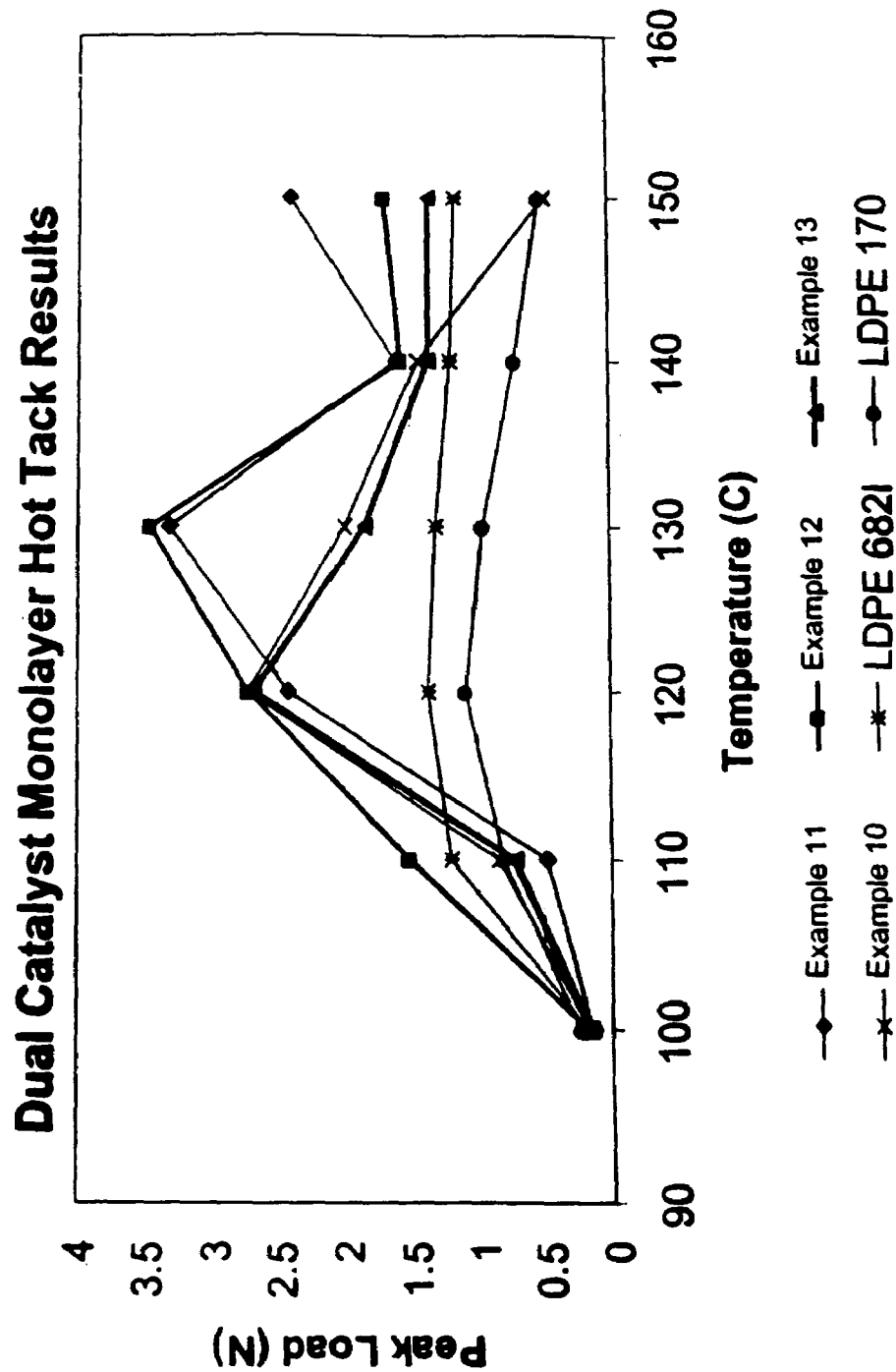
FIG. 5 is a plot of hot tack data for the polymers of FIG. 2.

FIG. 4 is a plot of heat seal strength as a function of temperature for the polymers. FIG. 5 is a plot of hot tack measured in terms of peak load as a function of temperature for the polymers. As shown in FIGS. 4 and 5, the ethylene interpolymers of Runs 1–4 have similar heat seal and hot tack properties to those of low density polyethylene. For the polymers of Examples 10–13, it was observed that good catalyst efficiency (1.6 MM gig at 160° C. and 95% ethylene conversion) was obtained, increasing with an increasing polymer split. Moreover, a melt flow ratio, $I_{10}/I_2$, in the range of 13.8–19.1 was obtained. The processability as indicated by the extruder amps and backpressure of each of the ethylene interpolymers was equivalent to or better than LDPE 682I or LDPE 170A. Bubble stability was very good even though melt strength was relatively lower than LDPE of equivalent density and melt index. Moreover, the optical properties of the ethylene interpolymer were excellent, whereas the Dart and tear properties significantly exceeded those of LDPE 6821 and LDPE 170A. Finally, the rheological behavior of the ethylene interpolymers were very similar to that of LDPE of similar melt index and density.

Example 14–19

A series of polymerization reactions were carried out to obtain ethylene/1-octene interpolymers from ethylene and 1-octene with a density of about 0.920 g/cc and $I_2$ of about 1.0. Moreover, the ethylene interpolymers were targeted to have a relatively lower level of the high molecular weight fraction. The general procedure of Example 6 was followed, except that the polymerization reaction was conducted at 140° C. with an ethylene conversion rate of 85%. Both Catalyst A and Catalyst C were used in the polymerization reactions. Six different polymers were obtained with a split ranging from 0 to about 0.17. The melt flow ratio, $I_{10}/I_2$ was measured for each polymer, and the results are summarized in Table V below.

TABLE V

Polymerization conditions and properties of resulting polymer

| Example | temperature, C. | ethylene flow, l./hr | solvent. flow, lb/hr | octene flow, lb/hr | $H_2$ flow, sccm | ethylene conversion, % |
|---|---|---|---|---|---|---|
| 14 | 140.3 | 5.4 | 35 | 1.00 | 20 | 85.4 |
| 15 | 140.0 | 5.4 | 35 | 1.01 | 20 | 85.1 |
| 16 | 140.0 | 5.4 | 35 | 1.00 | 28 | 85.3 |
| 17 | 140.1 | 5.4 | 35 | 0.98 | 22.4 | 85.7 |
| 18 | 140.0 | 5.4 | 35 | 1.05 | 33 | 85.3 |
| 19 | 140.3 | 5.4 | 35 | 1.10 | 37.4 | 85.5 |

| Example | ppm Ti Cat A/ ppm Cat C | efficiency, g/g Ti | Target split | polymer density, g/mL | $I_2$ |
|---|---|---|---|---|---|
| 14 | 4.1/0.00 | 4,600,000 | 0.00 | 0.9194 | 1.02 |
| 15 | 3.4/0.017 | 4,500,000 | 0.01 | 0.9195 | 0.95 |
| 16 | 2.14/0.107 | 4,900,000 | 0.09 | 0.9207 | 1.00 |
| 17 | 3.34/0.083 | 4,500,000 | 0.05 | 0.9197 | 1.01 |
| 18 | 2.09/0.157 | 5,500,000 | 0.13 | 0.9209 | 1.01 |
| 19 | 2.05/0.205 | 4,800,000 | 0.17 | 0.9203 | 1.05 |

| Example | $I_{10}/I_2$ | Polymer production rate Lb/hr | Wt % ethylene of reactor contents | Wt % polymer of reactor contents | ppm H2 of reactor feed |
|---|---|---|---|---|---|
| 14 | 9.28 | 5.13 | 1.90 | 12.39 | 0.10 |
| 15 | 9.44 | 5.11 | 1.94 | 12.34 | 0.09 |
| 16 | 11.04 | 5.09 | 1.92 | 12.29 | 0.13 |
| 17 | 10.10 | 5.14 | 1.87 | 12.42 | 0.11 |
| 18 | 12.04 | 5.09 | 1.92 | 12.28 | 0.16 |
| 19 | 13.1 | 5.11 | 1.89 | 12.31 | 0.18 |

The data in Table V indicate that the melt flow ratio ($I_{10}/I_2$) increases almost linearly as a function of the high molecular weight fraction between 0 to about 0.17. It was also observed that the increased processability did not come at the expense of decreased catalyst efficiency. In fact, the overall efficiency actually increased in these processes as the melt flow ratio increased

Example 20

This Example demonstrates the use of a catalyst with lower $R_v$ as the low Mw catalyst and a higher $R_v$ catalyst as the high Mw catalyst in a continuous solution polymerization.

Purified ISOPAR-E solvent, ethylene, hydrogen, and 1-octene are supplied to a 1 gallon jacketed reactor equipped with a jacket for temperature control and an internal thermocouple. The solvent feed to the reactor is measured by a mass-flow controller. A variable speed diaphragm pump controls the solvent flow rate and increases the solvent pressure to the reactor. The 1-octene feed is measured by a mass flow meter and the flow is controlled by a Research Control valve. The octene is mixed with the solvent stream at the suction of the solvent pump and are pumped to the reactor with the solvent. At the discharge of the pump, a side stream is taken to provide flush flows for the catalyst injection line and the reactor agitator. The remaining solvent is combined with ethylene and hydrogen and delivered to the reactor. The ethylene stream is measured with a mass flow meter and controlled with a Research Control valve. A mass flow controller is used to deliver hydrogen into the ethylene stream at the outlet of the ethylene control valve. The temperature of the solvent/monomer is controlled by use of a heat exchanger before entering the reactor. This stream enters the bottom of the reactor. The catalyst component solutions are metered using pumps and mass flow meters, and are combined with the catalyst flush solvent. This stream enters the bottom of the reactor, but in a different port than the monomer stream. The reactor is run liquid-full at 450 psig with vigorous stirring. The process flow is in from the bottom and out of the top. All exit lines from the reactor are steam traced and insulated. Polymerization is stopped with the addition of a small amount of water, and other additives and stabilizers can be added at this point. The stream flows through a static mixer and a heat exchanger in order to heat the solvent/polymer mixture. The solvent and unreacted monomers are removed at reduced pressure, and the product is recovered by extrusion using a devolatilizing extruder. The extruded strand is cooled under water and chopped into pellets. The operation of the reactor is controlled with a process control computer.

A 4 L catalyst tank is filled with an ISOPAR E solution of rac-dimethylsilane bis(indenyl)hafnium dimethyl at a concentration of 8.0 ppm Hf. A second 4 L catalyst tank is filled with a solution of Catalyst C at a concentration of 4.0 ppm Ti. Additional tanks are provided with a solution of N,N-dioctadecylanilinium tetrakis(pentafluorophenyl)borate in ISOPAR E at a concentration of 100 ppm B, and MMAO-3A in ISOPAR E at a concentration of 100 ppm Al. ISOPAR E is continuously fed into the reactor at 27.0 pounds per hour, and 1-octene at 0.50 pounds per hour. The two catalyst solutions are added initially at a 1:1 volume ratio, along with enough N,N-dioctadecylanilinium tetrakis(pentafluorophenyl)borate in ISOPAR E and MMAO-3A in ISOPAR E to maintain a total transition metal (Hf+Ti):B:Al molar ratio of 1:1.2:5 at a rate sufficient to maintain a 95% ethylene conversion and a reaction temperature of 165 degrees C. The flow rate of Catalyst C is adjusted to maintain a product melt index of 1.0, while maintaining 95% ethylene conversion and a reactor temperature of 165 degrees C. by adjusting the temperature of the reactor jacket. The molar ratio of aluminum can be adjusted in order to optimize the overall catalyst efficiency. The highly processable product is collected and can be used to produce blown film having an excellent balance of tear and modulus properties.

Example 21

The procedure of Example 20 is followed except that instead of 1-octene, 1-butene is fed into the reactor at 2.2 pounds per hour, the low molecular weight catalyst is Catalyst D at 6.0 ppm Ti, the high molecular weight catalyst is Catalyst B at 6.0 ppm Ti, the reactor temperature is 145 degrees C., and 1,7-octadiene is also fed into the reactor at a rate sufficient to maintain a 0.1 weight % 1,7-octadiene in the polymer product at an ethylene conversion of 92%. The addition rate of Catalyst B is adjusted to maintain a product melt index of 0.7, while maintaining the overall ethylene conversion and reactor temperature by controlling the temperature of the reactor jacket. The highly processable product is useful for a wide range of applications including wire and cable applications, films, molded articles and foams.

Example 22

The procedure of Example 21 is followed except that 1-butene is fed into the reactor at 3.6 pounds per hour, the low molecular weight catalyst is Catalyst D at 6.0 ppm Ti, the high molecular weight catalyst is Catalyst B at 6.0 ppm Ti, the reactor temperature is 140 degrees C., and norbornadiene is also fed into the reactor at a rate sufficient to maintain a 0.1 weight % norbornadiene in the polymer product at an ethylene conversion of 92%. The addition rate of Catalyst B is adjusted to maintain a product melt index of 1.0, while maintaining the overall ethylene conversion and reactor temperature by controlling the temperature of the reactor jacket. The highly processable product is useful for a wide variety of applications including wire and cable applications, films, molded articles and soft foams.

Example 23

A heterogeneous Ziegler-Natta catalyst is prepared substantially according to U.S. Pat. No. 4,612,300 (Example P) by sequentially adding to a volume of ISOPAR E a slurry of anhydrous magnesium chloride in ISOPAR E, a solution of EtAlCl$_2$ in hexane, and a solution of Ti(O-iPr)$_4$ in ISOPAR E, to yield a composition containing a magnesium concentration of 0.17 M and a ratio of Mg/Al/Ti of 40/12/3.

The procedure of Example 20 is followed except that a second reactor of 1 gallon size is connected in series after the first reactor, 1-octene is fed into the first reactor the low molecular weight catalyst is Catalyst A at 8.0 ppm Ti, the high molecular weight catalyst is Catalyst C at 4.0 ppm Ti, the reactor temperature is 150 degrees C., and the flows of the two catalysts and 1-octene are adjusted to produce a 0.908 density polymer with a 50% split at a melt index of 0.10 at an ethylene conversion of 90%. Additional ethylene and octene are added to the second reactor along with additional solvent. A titanium-based Ziegler/Natta catalyst (prepared as described above) is added to the second reactor (after being contacted with a solution of triethyl aluminum (TEA) at a Ti:TEA ratio of 1:8) at a rate sufficient to produce 55 weight % of the overall polymer product from the second reactor at a temperature of 195 degrees C., and an overall melt index of 1.6 and an overall density of 0.920 g/mL. Hydrogen is used in the first and second reactor as needed to control molecular weight. The highly processable product is useful for numerous applications including films, especially greenhouse and agricultural films, liners, and molded articles.

Example 24

The general procedure of Example 20 is followed except that instead of 1-octene, styrene is fed into the reactor at 2.37 pounds per hour, toluene is fed into the reactor instead of ISOPAR E as the solvent at a rate of 30.97 pounds/hr, ethylene is fed to the reactor at 4.00 pounds/hr, the catalyst solution is contained in a single tank containing a solution of 20 ppm Ti from Catalyst D and 10.0 ppm Ti from Catalyst A (both catalysts in toluene), hydrogen is fed into the reactor at 10 sccm, the reactor temperature is 120 degrees C., and the ethylene conversion is 92%. The highly processable product is isolated, and can be used in molding applications, foams, and a variety of other applications.

Example 25

The general procedure of Example 20 is followed except that 1-octene is fed into the reactor at a rate sufficient to produce a product at 0.940 density, the catalyst solution is contained in a single tank containing a solution of 10 ppm Ti from Catalyst D and 3 ppm Ti from Catalyst C (both catalysts in ISOPAR E), the reactor temperature is 150 degrees C., and the ethylene conversion is 95%. The product melt index is controlled with hydrogen to give a product melt index of 0.5. The highly processable product is isolated, and can be used in molding applications, foams, especially high modulus high strength foams for cushion packaging, and a variety of other applications.

Example 26

Propylene/1-Octene Polymerization Using Catalyst E and Catalyst F

The general procedure for the 1 gallon continuous solution polymerization outlined in Example 6 is employed, except that propylene and a small amount of ethylene are used instead of ethylene in order to prepare an isotactic propylene/1-octene/ethylene interpolymer. For this example, the reactor temperature is 55 degrees C., propylene is fed into the reactor at 19.97 pounds/hour, ethylene is metered into the reactor at 0.14 pounds per hour, octene is fed at 4.99 pounds/hour, and ISOPAR E solvent is fed at 24.27 pounds per hour. A catalyst solution containing 0.70 ppm Zr from Catalyst E and 0.80 ppm of Zr from Catalyst F was prepared and added to a 4 L catalyst storage tank. This solution was combined in a continuous stream with a continuous stream of a solution containing Armeenium borate in ISOPAR E and a continuous stream of a solution of MMAO-3A in ISOPAR E to give a ratio of total Zr:B:Al of 1:1.2:6. The activated catalyst solution is fed continuously into the reactor at a rate sufficient to maintain the reactor temperature at approximately 55 degrees C. Hydrogen is added as needed to control the molecular weight of the product. The polymer solution is continuously removed from the reactor exit and is contacted with a solution containing 100 ppm of water for each part of the polymer solution, and polymer stabilizers. The resulting exit stream is mixed, heated in a heat exchanger, and the mixture is introduced into a separator where the molten polymer is separated from the solvent and unreacted monomers. The resulting molten polymer is extruded and chopped into pellets after being cooled in a water bath. Product samples are collected over 1 hour time periods, after which time the melt index and density are determined for each sample. A propylene/1-octene/ethylene interpolymer is collected with a melting point of about 75 degrees C., and a melt index of about 2.

Example 27

Propylene/1-Octene/Ethylene Interpolymer

The general procedure for the 1 gallon continuous solution polymerization outlined in Example 6 is employed, except that propylene and a small amount of ethylene are used instead of ethylene in order to prepare an isotactic propylene/1-octene/ethylene interpolymer. For this example, the reactor temperature is 75 degrees C., propylene is fed into the reactor at 11.5 pounds/hour, ethylene is metered into the reactor at 0.15 pounds per hour, octene is fed at 1.17 pounds/hour, and ISOPAR E solvent is fed at 36.0 pounds per hour. A catalyst solution containing 0.70 ppm Zr from Catalyst E and 0.30 ppm of Zr from Catalyst F was prepared and added to a 4 L catalyst storage tank. This solution was combined in a continuous stream with a continuous stream of a solution containing Armeenium borate in ISOPAR E and a continuous stream of a solution of MMAO-3A in ISOPAR E to give a ratio of total Zr:B:Al of 1:1.2:6. The activated catalyst solution is fed continuously into the reactor at a rate sufficient to maintain the reactor temperature at approximately 75 degrees C. Hydrogen is added as needed to control the molecular weight of the product. The polymer solution is continuously removed from the reactor exit and was contacted with a solution containing 100 ppm of water for each part of the polymer solution, and polymer stabilizers. The resulting exit stream is mixed, heated in a heat exchanger, and the mixture is introduced into a separator where the molten polymer is separated from the solvent and unreacted monomers. The resulting molten polymer is extruded and chopped into pellets after being cooled in a water bath. Product samples are collected over 1 hour time periods, after which time the melt index and density are determined for each sample. A propylene/1-octene/ethylene interpolymer is collected with a melting point of about 110 degrees C., and a melt index of about 30.

Example 28

The general procedure for the 1 gallon continuous solution polymerization outlined in Example 6 was employed, except that an ethylene homopolymer was prepared. Accordingly, no comonomers were added to the reactor. For this example, the reactor temperature was 138.4 degrees C., ethylene was added to the reactor at 4.5 pounds per hour, and ISOPAR E solvent was fed at 33.9 pounds per hour. A catalyst solution containing 1.13 ppm Zr from bis(n-butyl-cyclopentadienyl)zirconium dimethyl and 0.510 ppm of Ti from Catalyst G was prepared and added to a 4 L catalyst storage tank. This solution was added in a continuous stream with a continuous stream of ISOPAR E into the reactor. In a separate continuous stream of ISOPAR E, a solution containing Armeenium borate in ISOPAR E and a continuous stream of a solution of MMAO-3A in ISOPAR E to give a ratio of total (Zr+Ti):B:Al of 1:2:17.9 was added to the reactor. The catalyst solution was fed continuously into the reactor at a rate sufficient to maintain the reactor temperature at approximately 138.4 degrees C., and an ethylene conversion of 77.6%. Hydrogen was added at 230 sccm to control the melt index of the product. the polymer solution was continuously removed from the reactor exit and was contacted with a solution containing 100 ppm of water for each part of the polymer solution, and polymer stabilizers. The resulting exit stream was mixed, heated in a heat exchanger, and the mixture was introduced into a separator where the molten polymer was separated from the solvent and unreacted monomers. The resulting molten polymer was extruded and chopped into pellets after being cooled in a water bath. Product samples are collected over 1 hour time periods, after which time the melt index and density are determined for each sample. An several hours production of an ethylene homopolymer was collected with a melt index of 0.9, and an $I_{10}/I_2$ of 7.4.

Figure 6:
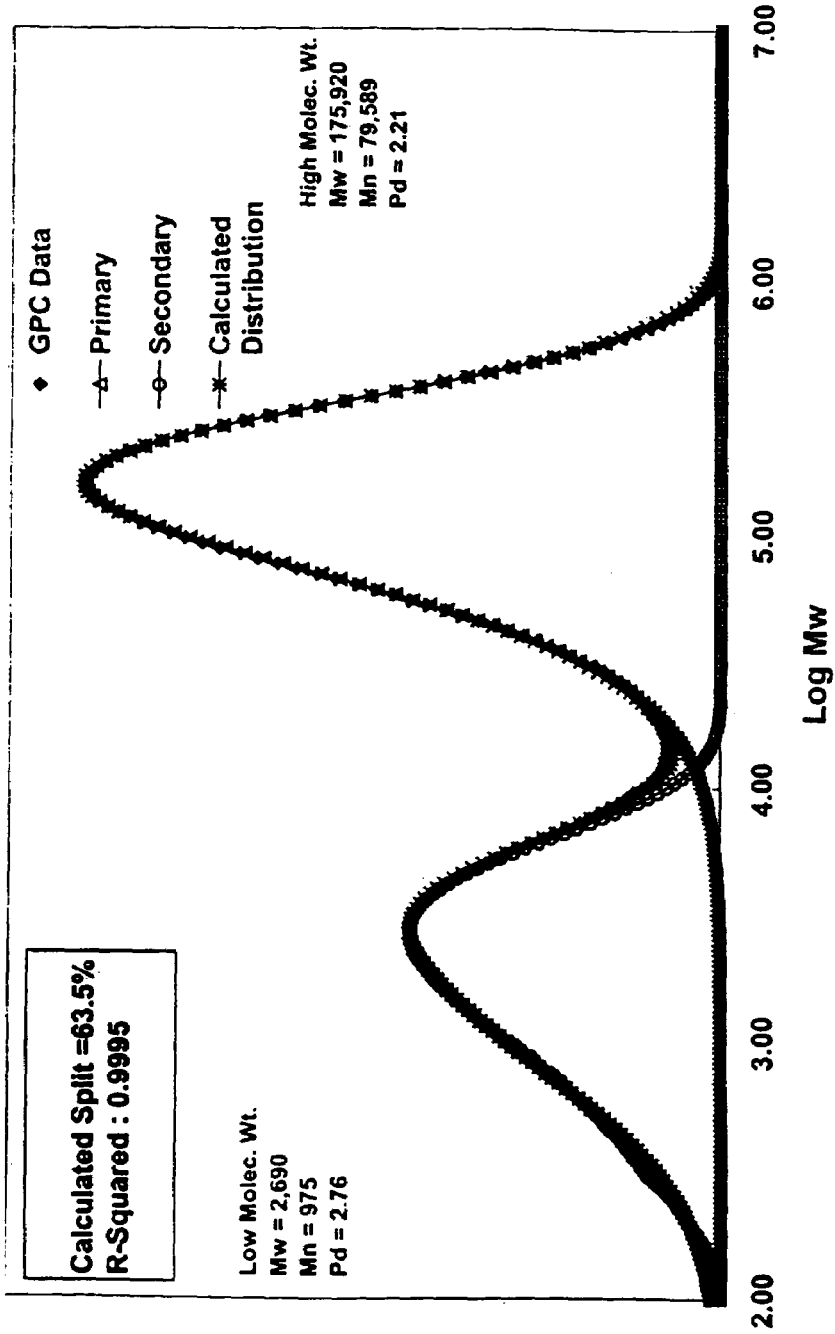
FIG. 6 shows a GPC spectrum and its deconvoluted peaks for an ethylene/1-octene interpolymer made in accordance with one embodiment of the invention.

GPC analysis of the polymer indicated a bimodal product ($M_w$=108,900, $M_n$ 2,980, MWD=36.54), which could be deconvoluted into two components. The GPC curve and the deconvolution into two separate peaks is shown in FIG. 6. The low $M_w$ component had a $M_w$ of 2,690, a $M_n$ of 975 and a MWD of 2.76, and the high $M_w$ component had a $M_w$ of 175,920, an $M_n$ of 79,589, and a MWD of 2.21. The ratio of the Mw of the high Mw component to the low Mw component was 175,920/2,690, which equals 65. This example demonstrates that operating ranges influence the physical properties of the resulting polymer.

Examples 29–31

Repeat of Example 28 with Different Splits

The procedure of Example 28 was followed except as noted in Table VI below. These further demonstrate the influence of the selected operating ranges on the polymers obtained.

TABLE VI

Polymerization conditions and properties of resulting polymer

| Example | temperature deg C. | ethylene flow, lb./hr | solvent. flow, lb/hr | $H_2$ flow, sccm | ethylene conversion, % | (Zr + Ti):B: Al mole ratio |
|---|---|---|---|---|---|---|
| 28 | 138.4 | 4.5 | 33.9 | 230 | 77.6 | 1:2:17.9 |
| 29 | 138.4 | 4.5 | 33.9 | 120 | 79.3 | 1:1.5:25 |
| 30 | 138.1 | 4.5 | 33.9 | 97 | 78.9 | 1:1.6:24.6 |
| 31 | 137.7 | 4.5 | 33.9 | 84 | 78.5 | 1:1.6:24.6 |

| Example | ppm Zr/ ppm Ti | efficiency, g/g Metal | production rate, lb/hr | Split From GPC deconvolution | $I_2$ | $I_{10}/I_2$ |
|---|---|---|---|---|---|---|
| 28 | 1.13/0.51 | 10,880,000 | 3.49 | 0.635 | 0.9 | 7.4 |
| 29 | 0.39/1.18 | 17,200,000 | 3.57 | 0.916 | 1.0 | 6.7 |
| 30 | 0.107/0.680 | 19,100,000 | 3.55 | 0.958 | 1.0 | 6.6 |
| 31 | 0.050/0.720 | 22,800,000 | 3.53 | 0.983 | 1.0 | 6.5 |

| Example | Mw | Mn | Mw of High Mw from deconvolution | Mn of High Mw from deconvolution | Mw of Low Mw from deconvolution | Mn of Low Mw from deconvolution |
|---|---|---|---|---|---|---|
| 28 | 108,900 | 2,980 | 175,920 | 79,589 | 2,690 | 975 |
| 29 | 107,700 | 7,870 | 121,011 | 55,272 | 1,702 | 677 |
| 30 | 110,700 | 14,300 | 118,012 | 53,516 | 1,760 | 685 |
| 31 | 111,400 | 19,700 | 117,204 | 53,559 | 1,768 | 673 |

| Example | Wt % ethylene of reactor contents | Wt % polymer of reactor contents | ppm $H_2$ of reactor contents | PPM IRGANOX 1010 | PPM IRGAFOS 168 | $M_{wH}/M_{wL}$ From deconvolution |
|---|---|---|---|---|---|---|
| 28 | 2.63 | 9.09 | 1.18 | 669 | 1335 | 65.4 |
| 29 | 2.43 | 9.30 | 0.61 | 655 | 1307 | 71.1 |
| 30 | 2.47 | 9.24 | 0.50 | 658 | 1314 | 67.0 |
| 31 | 2.52 | 9.19 | 0.43 | 661 | 1320 | 66.3 |

Example 32

The procedure of Example 23 is followed except that a single catalyst solution of a mixture of Catalyst A and Catalyst C (at 8 ppm Ti and 2 ppm Ti, respectively) is used, the first reactor temperature is 150 degrees C., and the flow of the mixed catalyst solution and 1-octene is adjusted to produce a 0.920 density, 0.3 $I_2$ first reactor product at 95% ethylene conversion at a production rate of 3 pounds of polymer per hour. The solution from the first reactor, along with fresh solvent, 1-octene, and ethylene is flowed into the second reactor. The titanium-based Ziegler-Natta catalyst (prepared as described in Example 23) is added to the second reactor at a rate sufficient to produce 35 weight % of the overall polymer product from the second reactor at a temperature of 195 degrees C., and an overall melt index of 0.6 at an overall density of 0.920 g/mL. Hydrogen is used in the first and second reactor as needed to control the melt index. The product is useful for blown shrink film applications.

Example 33

The procedure of Example 23 is followed except that a single catalyst solution of a mixture of Catalyst A and Catalyst C (at 10 ppm Ti and 2 ppm Ti, respectively) is used, the first reactor temperature is 150 degrees C., and the flow of the mixed catalyst solution and 1-octene is adjusted to produce a 0.918 density, 0.5 $I_2$ first reactor product at 95% ethylene conversion at a production rate of 3 pounds of polymer per hour. The solution from the first reactor, along with fresh solvent, 1-octene, and ethylene is flowed into the second reactor. The titanium-based Ziegler-Natta catalyst (prepared as described in Example 23) is added to the second reactor at a rate sufficient to produce 50 weight % of the overall polymer product from the second reactor at a temperature of 195 degrees C., and an overall melt index of 5 at an overall density of 0.918 g/mL. Hydrogen is used in the first and second reactor as needed to control the melt index. The product is useful for extrusion coating applications.

Example 34

The procedure of Example 23 is followed except that a single catalyst solution of a mixture of Catalyst A and Catalyst C (at 5 ppm Ti and 4 ppm Ti, respectively) is used, the first reactor temperature is 155 degrees C., and the flow of the mixed catalyst solution and 1-octene is adjusted to produce a 0.908 density, 1.0 $I_2$ first reactor product at 95% ethylene conversion at a production rate of 3 pounds of polymer per hour. The solution from the first reactor, along with fresh solvent, 1-octene, and ethylene is flowed into the second reactor. The titanium-based Ziegler-Natta catalyst (prepared as described in Example 23) is added to the second reactor at a rate sufficient to produce 35 weight % of the overall polymer product from the second reactor at a temperature of 195 degrees C., and an overall melt index of 1.5 at an overall density of 0.924 g/mL. Hydrogen is used in the first and second reactor as needed to control the melt index. The product is useful for blown film applications.

As demonstrated above, embodiments of the invention provide a new process for making olefin polymers. The novel process may offer one or more of the following advantages. First, the costs associated with this process are similar to those for metallocene catalyzed processes. Good catalyst efficiency is obtained in such a process. The processability of the polymer produced by the process is often better than that of a metallocene catalyzed polymer produced with a single catalyst. Therefore, it is now possible to produce an interpolymer with better processability without sacrificing efficiency and thus incurring higher costs. Because at least two catalysts are used in the polymerization process, it is possible to adjust the density split and the polymer split by selecting the proper catalysts, if desired. By controlling the density split and/or the polymer split, one may design a series of polymers with desired characteristics and properties. With such a process, it is possible to adjust the density split and the polymer split from 0 to 100%. By proper selection of catalysts, it is also possible to increase the level of long chain branching substantially. Moreover, a comb-like long chain branching structure is obtained.

The polymers produced in accordance with embodiments of the invention may offer one or more of the following advantages. First, the processability and optical properties of certain of the interpolymers are similar to LDPE, while the mechanical properties of certain of the interpolymers are better than LDPE. Moreover, the improved processability is not obtained at the expense of excessive broadening of the molecular weight distribution. The interpolymers also retain many of the desired characteristics and properties of a metallocene catalyzed polymer. In essence, some interpolymers prepared in accordance with embodiments of the invention combines the desired attributes of LDPE and metallocene catalyzed polymers. Additional advantages are apparent to those skilled in the art.

While the invention has been described with a limited number of embodiments, these specific embodiments are not intended to limit the scope of the invention as otherwise described and claimed herein. Modification and variations from the described embodiments exist. For example, while the high molecular weight catalysts and the low molecular weight catalysts are described with reference to a single site or metallocene catalyst, suitable catalysts are not so limited. It is possible to combine a Ziegler-Natta catalyst with a single site or metallocene catalyst, provided that the catalyst meet the selection criteria for producing a desired polymer. A person of ordinary skill in the art recognizes that catalyst activities may vary, depending on the temperature, pressure, monomer concentration, polymer concentration, hydrogen partial pressure and so on. It should also be recognized that co-catalysts may impact the catalyst's ability to produce interpolymers and the capability to incorporate comonomers. Therefore, one pair of catalysts which does not fulfill the selection criteria under one set of reaction conditions may nevertheless be used in embodiments of the invention under another set of reaction conditions. While all of the embodiments are described with reference to a pair of catalysts, it by no means precludes the use of three, four, five, or more catalysts simultaneously in a single reactor with similar or different capability for molecular weight and/or comonomer incorporation. Although the process is described with reference to the production of interpolymers, homopolymers, such as homopolyethylene, homopolypropylene, homopolybutylene, etc. may also be produced by the process described herein. These homopolymers are expected to have a high level of long chain branching and thus exhibit improved processability while maintaining the desired characteristics possessed by the homopolymers produced by one metallocene catalyst. It should be recognized that the process described herein may be used to make terpolymers, tetrapolymers, or polymers with five or more comonomers. The incorporation of additional comonomers may result in beneficial properties which are not available to copolymers. While the processes are described as comprising one or more steps, it should be understood that these steps may be practiced in any order or sequence unless otherwise indicated. These steps may be combined or separated. Finally, any number disclosed herein should be construed to mean approximate, regardless of whether the word "about" or "approximate" is used in describing the number. The appended claims intend to cover all such variations and modifications as falling within the scope of the invention.

What is claimed is:

1. An olefin polymer characterized by a comb-like structure and having at least 0.03 long chain branches per 1000 carbons,
wherein the polymer comprises a high molecular weight component and a low molecular weight component and wherein the high molecular weight component and the low molecular weight component have a substantially similar amount of comonomers.

2. The olefin polymer of claim 1 having a melt strength of about 5 cN at 190° C., and when the polymer is made into a film, the film has a CD shrink of at least 20%.

3. The olefin polymer of claim 1 having an $R_v$ of about 0.12 or higher, where $R_v$ is defined as:

$$R_v = \frac{[vinyl]}{[vinyl] + [vinylidene] + [cis] + [trans]}$$

wherein [vinyl] is the concentration of vinyl groups in the olefin polymer expressed in vinyls/1,000 carbon atoms; [vinylidene], [cis] and [trans] are the concentration of vinylidene, cis and trans groups in the olefin polymer expressed in the number of the respective groups per 1,000 carbon atoms.

4. The olefin polymer of claim 1, wherein the polymer includes a high molecular weight fraction and a low molecular weight fraction.

5. The olefin polymer of claim 1, wherein the ratio of the molecular weight of the high molecular weight fraction to the molecular weight of the low molecular weight fraction is greater than about 1.3.

6. The olefin polymer of claim 1, wherein the ratio of the molecular weight of the high molecular weight fraction to the molecular weight of the low molecular weight fraction is greater than about 2.

7. The olefin polymer of claim 1, wherein the ratio of the molecular weight of the high molecular weight fraction to the molecular weight of the low molecular weight fraction is between about 2 and about 40.

8. The olefin polymer of claim 1, wherein the ratio of the molecular weight of the high molecular weight fraction to the molecular weight of the low molecular weight fraction is between about 1.5 and about 8.5.

9. The olefin polymer of claim 1, wherein the ratio of the molecular weight of the high molecular weight fraction to the molecular weight of the low molecular weight fraction is between about 2.0 and about 7.0.

10. The olefin polymer of claim 1, wherein the ratio of the molecular weight of the high molecular weight fraction to the molecular weight of the low molecular weight fraction is between about 3.0 and about 6.0.

11. The olefin polymer of claim 1, wherein the olefin polymer comprises ethylene and at least one α-olefin.

12. The olefin polymer of claim 1, wherein the olefin polymer comprises ethylene and at least one vinylidene olefin.

13. The olefin polymer of claim 1, wherein the olefin polymer comprises ethylene and at least one diolefin.

14. The olefin polymer of claim 1, wherein the polymer is an ethylene/propylene copolymer, ethylene/1-butene copolymer, ethylene/1-hexene, ethylene/styrene, ethylene/1-octene copolymers, or ethylene/propylene/diene terpolymer.

* * * * *